US010574986B2

(12) United States Patent
Park et al.

(10) Patent No.: US 10,574,986 B2
(45) Date of Patent: Feb. 25, 2020

(54) INTERLAYER VIDEO DECODING METHOD FOR PERFORMING SUB-BLOCK-BASED PREDICTION AND APPARATUS THEREFOR, AND INTERLAYER VIDEO ENCODING METHOD FOR PERFORMING SUB-BLOCK-BASED PREDICTION AND APPARATUS THEREFOR

(71) Applicant: SAMSUNG ELECTRONICS CO., LTD., Suwon-si (KR)

(72) Inventors: Min-woo Park, Yongin-si (KR); Jin-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 130 days.

(21) Appl. No.: 15/300,571

(22) PCT Filed: Mar. 31, 2015

(86) PCT No.: PCT/KR2015/003174
§ 371 (c)(1),
(2) Date: Sep. 29, 2016

(87) PCT Pub. No.: WO2015/152608
PCT Pub. Date: Oct. 8, 2015

(65) Prior Publication Data
US 2017/0188028 A1 Jun. 29, 2017

Related U.S. Application Data

(60) Provisional application No. 61/972,716, filed on Mar. 31, 2014.

(51) Int. Cl.
*H04N 19/119* (2014.01)
*H04N 19/30* (2014.01)
(Continued)

(52) U.S. Cl.
CPC ......... *H04N 19/119* (2014.11); *H04N 19/139* (2014.11); *H04N 19/157* (2014.11);
(Continued)

(58) Field of Classification Search
None
See application file for complete search history.

(56) References Cited

U.S. PATENT DOCUMENTS 8,995,527 B2   3/2015  Panchal et al.
2006/0012719 A1*  1/2006  Karczewicz ........... H04N 19/56
                                                        348/699
(Continued)

FOREIGN PATENT DOCUMENTS

KR      10-1039204 B1       6/2011
KR    10-2012-0118507 A    10/2012
WO      2014/008817 A1      1/2014

OTHER PUBLICATIONS

International Search Report for PCT/KR2015/003174 dated Jun. 22, 2015 [PCT/ISA/210].
(Continued)

*Primary Examiner* — Christopher G Findley
(74) *Attorney, Agent, or Firm* — Sughrue Mion, PLLC

(57) ABSTRACT

Provided is an inter-layer video decoding method including determining a size of a subblock of a current block by comparing at least one of a height and a width of a predetermined minimum size of the subblock with at least one of a height and a width of the current block of a first layer image; determining at least one subblock from the current block according to the size of the subblock of the current block; determining a candidate block that corresponds to the current block and is included in an encoded second layer image; determining a candidate subblock from the candidate block of the second layer image by using the subblock of the current block; determining motion information of the subblock included in the current block by using motion information of the candidate subblock included in the candidate block; and generating a prediction block of the
(Continued)

current block by using the motion information of the sub-block included in the current block.

11 Claims, 43 Drawing Sheets

(51) Int. Cl.
*H04N 19/176* (2014.01)
*H04N 19/52* (2014.01)
*H04N 19/139* (2014.01)
*H04N 19/157* (2014.01)
*H04N 19/187* (2014.01)
*H04N 19/169* (2014.01)
*H04N 19/513* (2014.01)
*H04N 19/577* (2014.01)
*H04N 19/503* (2014.01)

(52) U.S. Cl.
CPC ......... *H04N 19/176* (2014.11); *H04N 19/187* (2014.11); *H04N 19/188* (2014.11); *H04N 19/30* (2014.11); *H04N 19/52* (2014.11); *H04N 19/521* (2014.11); *H04N 19/577* (2014.11); *H04N 19/503* (2014.11)

(56) References Cited

U.S. PATENT DOCUMENTS

| | | | |
|---|---|---|---|
| 2006/0013309 A1* | 1/2006 | Ha | H04N 19/147 375/240.16 |
| 2009/0103615 A1* | 4/2009 | Francois | H04N 19/70 375/240.12 |
| 2014/0177721 A1* | 6/2014 | Onno | H04N 19/105 375/240.16 |
| 2015/0195566 A1* | 7/2015 | Hinz | H04N 19/105 375/240.13 |

OTHER PUBLICATIONS

Written Opinion for PCT/KR2015/003174 dated Jun. 22, 2015 [PCT/ISA/237].

Yulin Chang et al., "3D-CE3.h related: Sub-PU level inter-view motion prediction", Joint Collaborative Team on 3D Video Coding Extensions of ITU-T SG 16 WP 3 and ISO/IEC JTC 1/SC 29/WG 11, 5th Meeting: Vienna, JCT3V-E0184, Jul. 27-Aug. 2, 2013, total 6 pages.

Ying Chen et al., "Inter-view motion vector prediction for depth coding", Joint Collaborative Team on 3D Video Coding Extensions of ITU-T SG 16 WP 3 and ISO/IEC JTC 1/SC 29/WG 11, 5th Meeting: Vienna, JCT3V-E0133, Jul. 27-Aug. 2, 2013, total 8 pages.

Shinya Shimizu et al., "CE1-related: Sub-PU partitioning for VSP with AMP", Joint Collaborative Team on 3D Video Coding Extensions of ITU-T SG 16 WP 3 and ISO/IEC JTC 1/SC 29/WG 11, 6th Meeting: Geneva, JCT3V-F0175, Oct. 25-Nov. 1, 2013, total 5 pages.

Communication dated Oct. 27, 2017, from the European Patent Office in counterpart European Application No. 15774466.5.

Gerhard Tech et al. "3D-HEVC Draft Text 3" Joint Collaborative Team on 3D Video Coding Extension Development of ITU-T SG 16 WP 3 and ISO/IEC JTC 1/SC 29/WG 11, 7th Meeting: San Jose, USA, Jan. 9-Jan. 17, 2014 (94 pages total) XP 030132038, Document: JCT3V-G1001-v3.

Hongbin Liu et al. "CE1: Simplifications to sub-PU level inter-view motion prediction" Joint Collaborative Team on 3D Video Coding Extensions of ITU-T SG 16 WP 3 and ISO/IEC JTC 1/SC 29/WG 11, 7th Meeting: San Jose, US, Jan. 11-17, 2014 (4 pages total) XP030131894, Document: JCT3V-G0120.

Min Woo Park et al. "Proposed text of 3D-HEVC Working Draft for JCT3V-G0077" Joint Collaborative Team on 3D Video Coding Extensions of ITU-T SG 16 WP 3 and ISO/IEC JTC 1/SC 29/WG 11, 7th Meeting: San Jose, US, Jan. 11-17, 2014 (2 pages total) XP030131835, Document: JCT3V-G0077 WD2.

Notice of Allowance issued by the Korean Patent Office dated Dec. 31, 2019 in Korean Patent Application No. 10-2016-7027375.

M-W. Park, et al., 3D-CE1 related: MCP Size and DV for Sub-PU Prediction, JCT-3V of ITU-T SG 16 WP 3 and ISO/IEC JTC 1/SC 29/WG11 7th Meeting San Jose US, JCT3V-G0077 Ver. 2, Jan. 11, 2014, pp. 1-5.

M-W. Park, et al., 3D-CE1 related: Sub-PU Size for MPI, JCT-3V of ITU-T SH 16 WP 3and ISO/IEC JTC 1/SC 29/WG11 *th Meeting: Valencia ES, JCT3V-H0066 Ver. 2, Mar. 29, 2014, pp. 1-3.

* cited by examiner

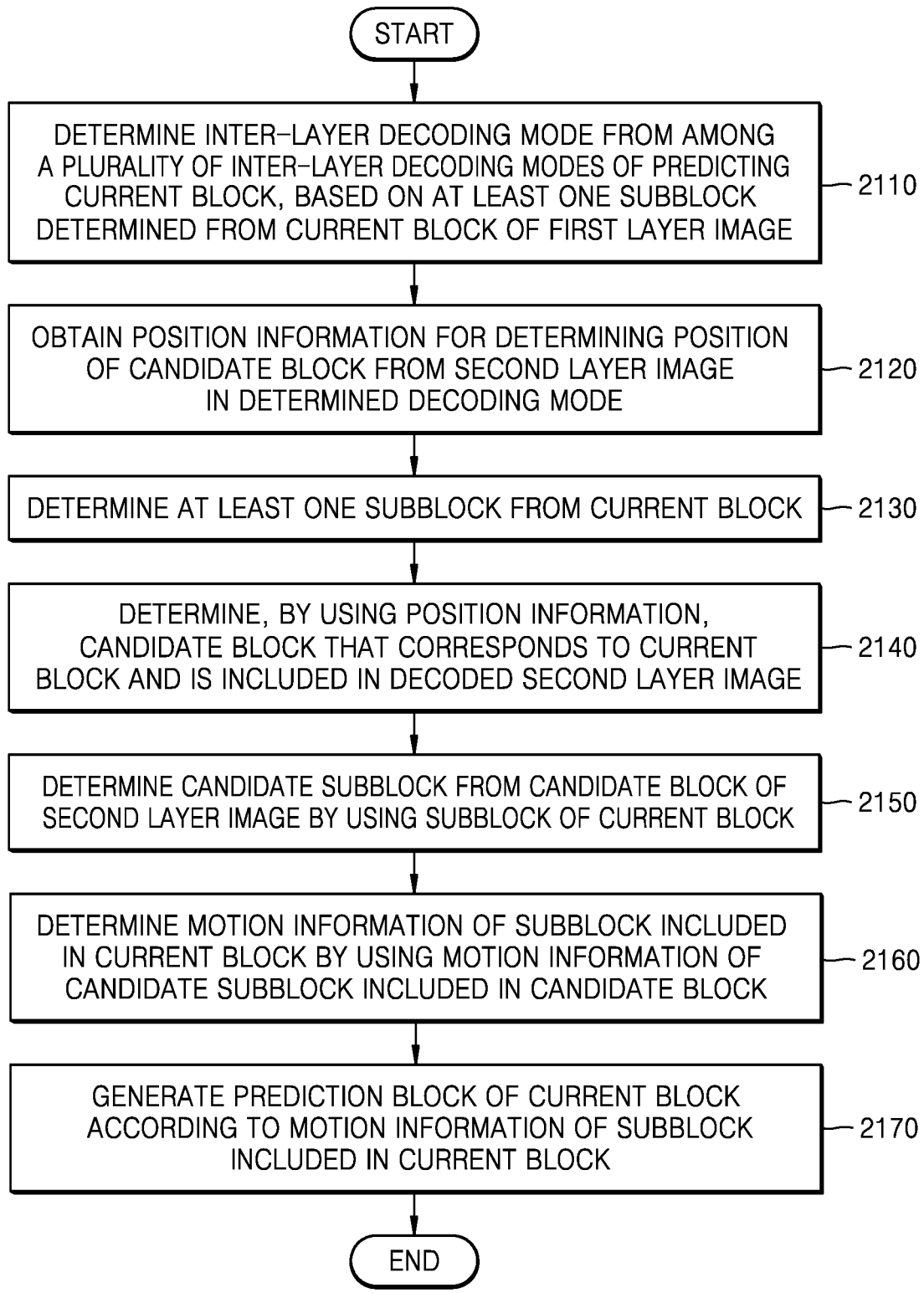

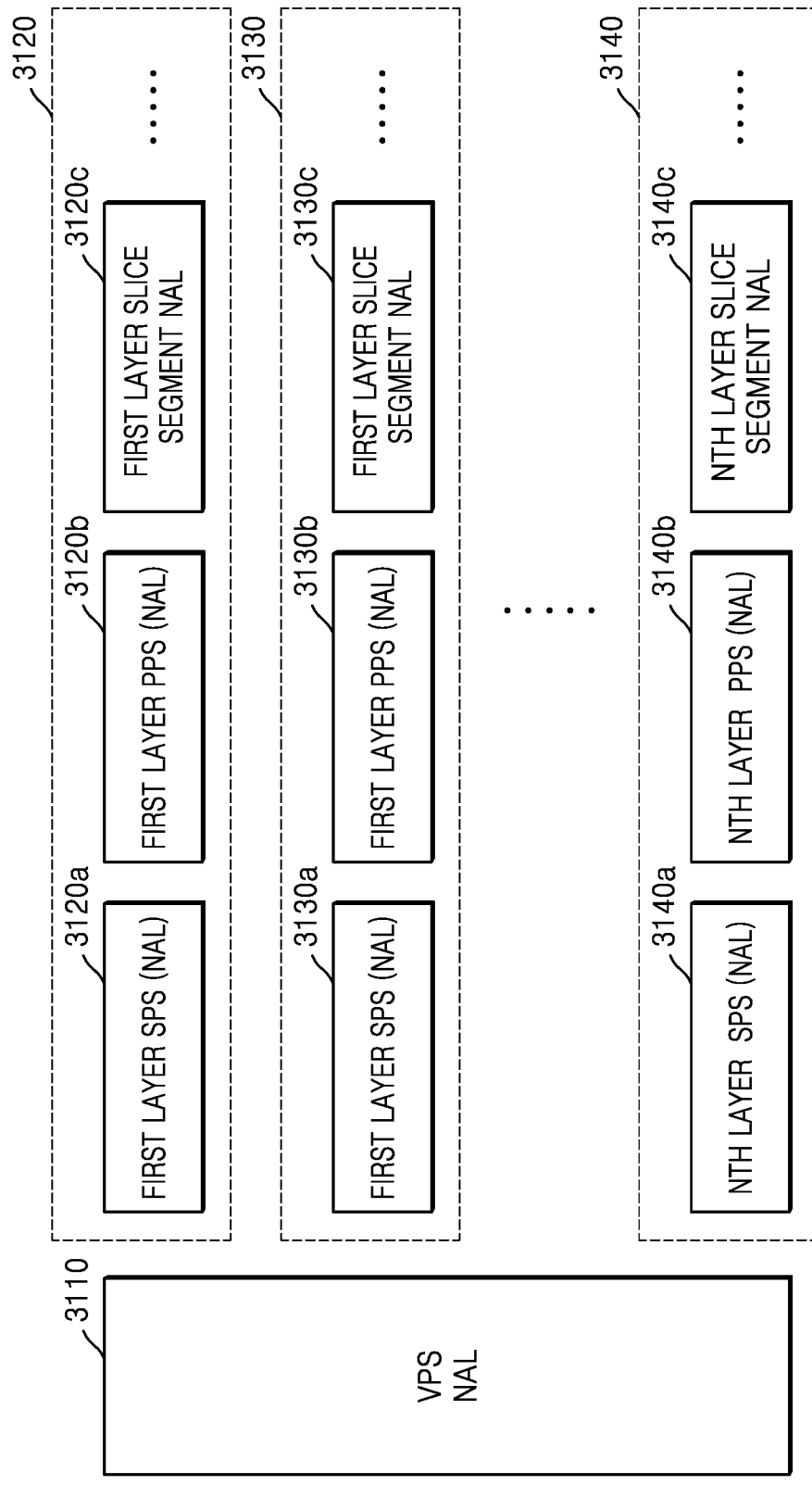

PART_nLX2N

PART_nRX2N

PART_2NXnU

PART_2NXnD

INTERLAYER VIDEO DECODING METHOD FOR PERFORMING SUB-BLOCK-BASED PREDICTION AND APPARATUS THEREFOR, AND INTERLAYER VIDEO ENCODING METHOD FOR PERFORMING SUB-BLOCK-BASED PREDICTION AND APPARATUS THEREFOR

CROSS-REFERENCE TO RELATED APPLICATION

This is a National Stage Entry of International Application No. PCT/KR2015/003174 filed Mar. 31, 2015, claiming priority based on U.S. Provisional Application No. 61/972,716 filed Mar. 31, 2014, the contents of all of which are incorporated herein by reference in their entirety.

TECHNICAL FIELD

The present disclosure relates to an inter-layer video encoding method and an inter-layer video decoding method, and more particularly, to an inter-layer video encoding method and decoding method of performing prediction based on a subblock.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial region is transformed into coefficients of a frequency region via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multilayer video codec encodes and decodes a first layer video and at least one second layer video. Amounts of data of the first layer video and the second layer video may be reduced by removing temporal/spatial redundancy and layer redundancy of the first layer video and the second layer video.

For a current block to be predicted, subblock-based prediction using a subblock of which size is equal to or less than that of the current block may be performed. Since the subblock-based prediction is performed, a prediction error may be further decreased, and since lots of data which were transformed with the prediction error become 0, a data mount of a video may be reduced.

DETAILED DESCRIPTION OF THE INVENTION

Technical Problem

According to various embodiments, in a same manner with respect to a plurality of subblock-based inter-layer decoding modes, a subblock is determined from a current block to be predicted, and inter-layer prediction is performed by using motion information of a corresponding subblock located in a corresponding layer image, so that realization/operation complexity of encoding and decoding apparatuses may be reduced.

In addition, according to various embodiments, when subblock-based prediction is performed on a current block, inter-layer prediction is performed on the current block, without using a subblock of which size is smaller than a predetermined minimum size of a subblock, so that realization/operation complexity of encoding and decoding apparatuses may be reduced.

The technical problems of the present disclosure are not limited to the aforementioned features, and other unstated technical problems will be clearly understood by one of ordinary skill in the art in view of descriptions below.

Technical Solution

The technical problems of the present disclosure are not limited to the aforementioned features, and other unstated technical problems will be clearly understood by one of ordinary skill in the art in view of descriptions below.

According to an aspect of the present disclosure, there is provided an inter-layer video decoding method including determining a size of a subblock of a current block by comparing at least one of a height and a width of a predetermined minimum size of the subblock with at least one of a height and a width of the current block of a first layer image; determining at least one subblock from the current block according to the size of the subblock of the current block; determining a candidate block that corresponds to the current block and is included in an encoded second layer image; determining a candidate subblock from the candidate block of the second layer image by using the subblock of the current block; determining motion information of the subblock included in the current block by using motion information of the candidate subblock included in the candidate block; and generating a prediction block of the current block by using the motion information of the subblock included in the current block.

According to another aspect of the present disclosure, there is provided an inter-layer video decoding method including determining an inter-layer decoding mode from among a plurality of inter-layer decoding modes of predicting a current block, based on at least one subblock determined from the current block of a first layer image; obtaining position information for determining a position of a candidate block from a second layer image in the determined inter-layer decoding mode; determining the at least one subblock from the current block; determining, by using the position information, the candidate block that corresponds to the current block and is included in the decoded second layer image; determining a candidate subblock from the candidate block of the second layer image by using the subblock of the current block; determining motion information of the subblock included in the current block by using motion information of the candidate subblock included in the candidate block; and generating a prediction block of the current block according to the motion information of the subblock of the current block.

According to another aspect of the present disclosure, there is provided a non-transitory computer-readable recording medium having recorded thereon a program for performing the method according to various embodiments.

Advantageous Effects

According to various embodiments, in a same manner with respect to a plurality of subblock-based inter-layer decoding modes, a subblock is determined from a current block to be predicted, and inter-layer prediction is performed by using motion information of a corresponding subblock located in a corresponding layer image, so that realization/operation complexity of encoding and decoding apparatuses may be reduced.

In addition, according to various embodiments, when subblock-based prediction is performed on a current block, inter-layer prediction is performed on the current block, without using a subblock of which size is smaller than a predetermined minimum size of a subblock, so that realization/operation complexity of encoding and decoding apparatuses may be reduced.

DESCRIPTION OF THE DRAWINGS

FIG. 2D is a flowchart of an inter-layer video decoding method, according to various embodiments.

FIG. 3C is a diagram of network abstraction layer (NAL) units including encoded data of a multilayer video, according to various embodiments.

BEST MODE

Figure 1A:
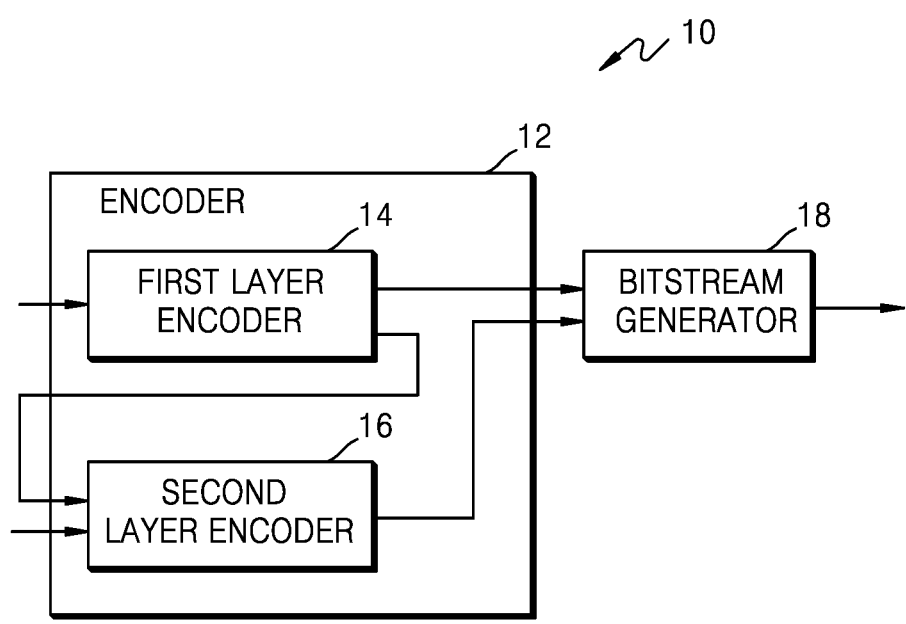
FIG. 1A is a block diagram of an inter-layer video encoding apparatus, according to various embodiments.

According to an aspect of the present disclosure, there is provided an inter-layer video decoding method including determining a size of a subblock of a current block by comparing at least one of a height and a width of a predetermined minimum size of the subblock with at least one of a height and a width of the current block of a first layer image; determining at least one subblock from the current block according to the size of the subblock of the current block; determining a candidate block that corresponds to the current block and is included in an encoded second layer image; determining a candidate subblock from the candidate block of the second layer image by using the subblock of the current block; determining motion information of the subblock included in the current block by using motion information of the candidate subblock included in the candidate block; and generating a prediction block of the current block by using the motion information of the subblock included in the current block.

The determining of the size of the subblock of the current block by comparing at least one of the height and the width of the predetermined minimum size of the subblock with at least one of the height and the width of the current block of the first layer image may include, when at least one of the height and the width of the current block is not an integer multiple of at least one of the height and the width of the predetermined minimum size of the subblock, determining the size of the subblock of the current block to be equal to the size of the current block.

The determining of the size of the subblock of the current block by comparing at least one of the height and the width of the predetermined minimum size of the subblock with at least one of the height and the width of the current block of the first layer image may include determining an inter-layer decoding mode from among a plurality of inter-layer decoding modes of predicting the current block, based on at least one subblock determined from the current block of the first layer image; and determining the size of the subblock of the current block by comparing at least one of a height and a width of a predetermined minimum size of the subblock in the determined inter-layer decoding mode with at least one of the height and the width of the current block of the first layer image.

The plurality of inter-layer decoding modes may include at least one of a motion parameter inheritance mode and an inter-view motion prediction mode.

The current block may be among one or more prediction units determined from a coding unit.

According to another aspect of the present disclosure, there is provided an inter-layer video encoding method including determining a size of a subblock of a current block by comparing at least one of a height and a width of a predetermined minimum size of the subblock with at least one of a height and a width of the current block of a first layer image; determining at least one subblock from the current block according to the size of the subblock of the current block; determining a candidate block that corresponds to the current block and is included in an encoded second layer image; determining a candidate subblock from the candidate block of the second layer image by using the subblock of the current block; determining motion information of the subblock included in the current block by using motion information of the candidate subblock included in the candidate block; generating a prediction block of the current block by using the motion information of the subblock included in the current block; and generating a bitstream including the current block encoded by using the prediction block of the current block.

The determining of the size of the subblock of the current block by comparing at least one of the height and the width of the predetermined minimum size of the subblock with at least one of the height and the width of the current block of the first layer image may include, when at least one of the height and the width of the current block is not an integer multiple of at least one of the height and the width of the predetermined minimum size of the subblock, determining the size of the subblock of the current block to be equal to the size of the current block.

The determining of the size of the subblock of the current block by comparing at least one of the height and the width of the predetermined minimum size of the subblock with at least one of the height and the width of the current block of the first layer image may include determining an inter-layer encoding mode from among a plurality of inter-layer encoding modes of predicting the current block, based on at least one subblock determined from the current block of the first layer image; and determining the size of the subblock of the current block by comparing at least one of a height and a width of a predetermined minimum size of the subblock in the determined inter-layer encoding mode with at least one of the height and the width of the current block of the first layer image.

The plurality of inter-layer encoding modes may include at least one of a motion parameter inheritance mode and an inter-view motion prediction mode.

The current block may be among one or more prediction units determined from a coding unit.

According to another aspect of the present disclosure, there is provided an inter-layer video decoding apparatus including a first layer decoder configured to obtain a decoded first layer image; and a second layer decoder configured to determine a size of a subblock of a current block by comparing at least one of a height and a width of a predetermined minimum size of the subblock with at least one of a height and a width of the current block of a second layer image, to determine at least one subblock from the current block according to the determined size of the subblock of the current block, to determine a candidate block that corresponds to the current block and is included in the decoded first layer image, to determine a candidate subblock from the candidate block of the first layer image by using the subblock of the current block, to determine motion information of the subblock included in the current block by using motion information of the candidate subblock included in the candidate block, and to generate a prediction block of the current block by using the motion information of the subblock included in the current block.

According to another aspect of the present disclosure, there is provided an inter-layer video encoding apparatus including a first layer encoder configured to encode a first layer image; a second layer encoder configured to determine a size of a subblock of a current block by comparing at least one of a height and a width of a predetermined minimum size of the subblock with at least one of a height and a width of the current block of a second layer image, to determine at least one subblock from the current block according to the size of the subblock of the current block, to determine a candidate block that corresponds to the current block and is included in the encoded first layer image, to determine a candidate subblock from the candidate block of the first layer image by using the subblock of the current block, to determine motion information of the subblock included in the current block by using motion information of the candidate subblock included in the candidate block, to generate a prediction block of the current block by using the motion information of the subblock included in the current block, and to encode the current block by using the prediction block of the current block; and a bitstream generator configured to generate a bitstream including the encoded current block.

According to another aspect of the present disclosure, there is provided an inter-layer video decoding method including determining an inter-layer decoding mode from among a plurality of inter-layer decoding modes of predicting a current block, based on at least one subblock determined from the current block of a first layer image; obtaining position information for determining a position of a candidate block from a second layer image in the determined inter-layer decoding mode; determining the at least one subblock from the current block; determining, by using the position information, the candidate block that corresponds to the current block and is included in the decoded second layer image; determining a candidate subblock from the candidate block of the second layer image by using the subblock of the current block; determining motion information of the subblock included in the current block by using motion information of the candidate subblock included in the candidate block; and generating a prediction block of the current block according to the motion information of the subblock of the current block.

According to another aspect of the present disclosure, there is provided an inter-layer video encoding method including determining an inter-layer decoding mode from among a plurality of inter-layer decoding modes of predicting a current block, based on at least one subblock determined from the current block of a first layer image; determining position information for determining a position of a candidate block from a second layer image in the determined inter-layer decoding mode; determining the at least one subblock from the current block; determining, by using the position information, the candidate block that corresponds to the current block and is included in the decoded second layer image; determining a candidate subblock from the candidate block of the second layer image by using the subblock of the current block; determining motion information of the subblock included in the current block by using motion information of the candidate subblock included in the candidate block; generating a prediction block of the current block according to the motion information of the subblock included in the current block; and generating a bitstream including the current block encoded by using the prediction block.

According to another aspect of the present disclosure, there is provided a non-transitory computer-readable recording medium having recorded thereon a program for performing the method according to various embodiments.

Mode of the Invention

Hereinafter, with reference to FIGS. 1A through 7C, an inter-layer video encoding technique and an inter-layer video decoding technique for performing subblock-based prediction will be described. Also, with reference to FIGS. 8 through 20, a video encoding technique and a video decoding technique, which are based on coding units having a tree structure, according to embodiments applicable to the inter-layer video encoding and decoding techniques will be described. Also, with reference to FIGS. 21 through 27, various embodiments to which the video encoding method and the video decoding method are applicable will be described.

Hereinafter, an 'image' may refer to a still image or a moving image of a video, or a video itself.

Hereinafter, a 'sample' refers to data that is assigned to a sampling location of an image and is to be processed. For example, pixels in an image of a spatial domain may be samples.

Hereinafter, a 'current block' may refer to a block of an image to be encoded or decoded.

Hereinafter, a 'neighboring block' refers to at least one encoded or decoded block adjacent to the current block. For example, a neighboring block may be located at the top, upper right, left, or upper left of a current block. Also, a neighboring block may be a spatially-neighboring block or a temporally-neighboring block. For example, the temporally-neighboring block may include a block of a reference picture, which is co-located with a current block, or a neighboring block of the co-located block.

First, with reference to FIGS. 1A through 7C, inter-layer video decoding and encoding apparatuses and methods of performing subblock-based prediction according to various embodiments will be described. FIG. 1A is a block diagram of an inter-layer video encoding apparatus 10 according to various embodiments.

Figure 1B:
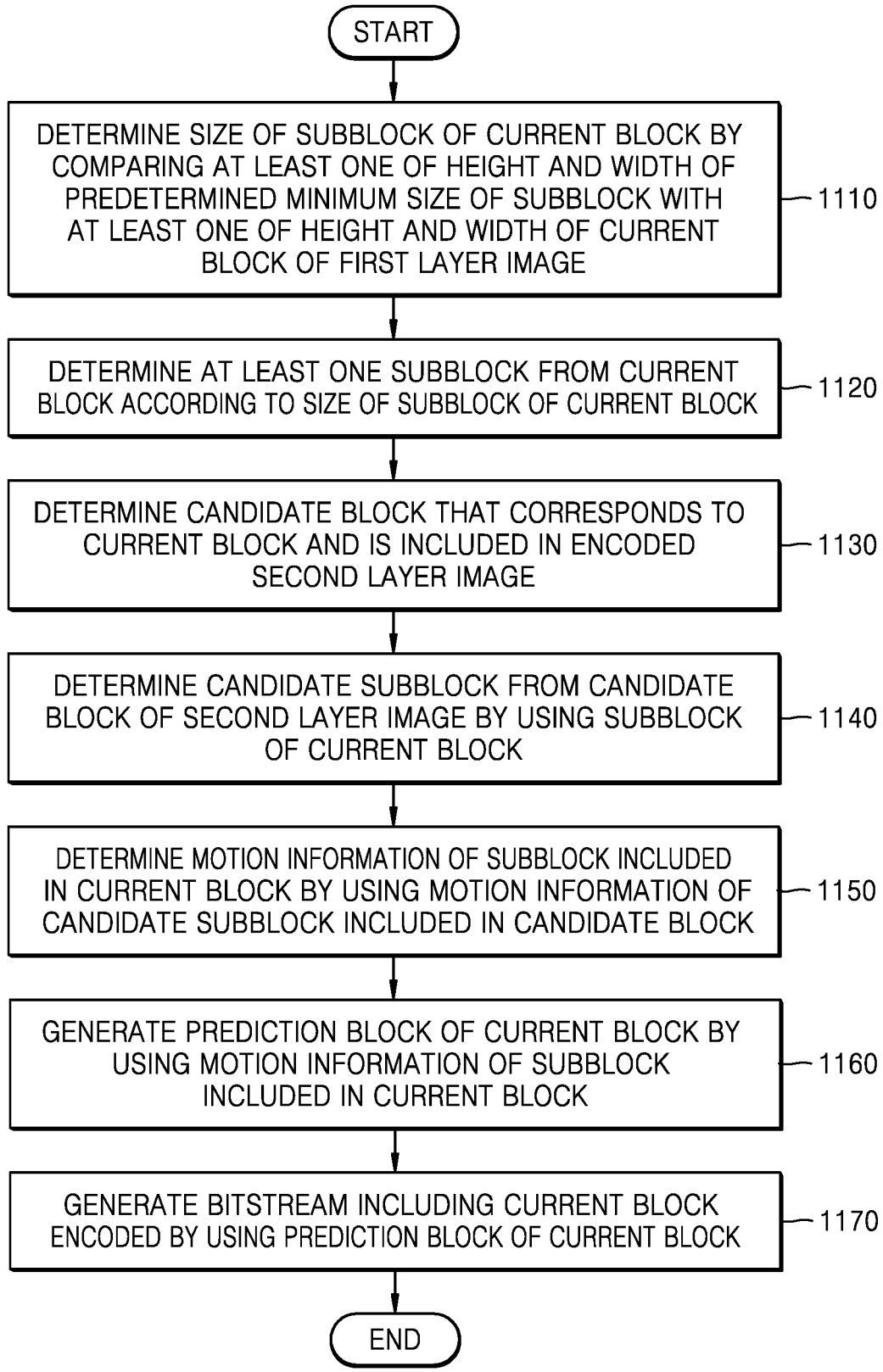
FIG. 1B is a flowchart of an inter-layer video encoding method, according to various embodiments.

FIG. 1B is a flowchart of an inter-layer video encoding method, according to various embodiments.

The inter-layer video encoding apparatus 10 according to various embodiments include an encoder 12 and a bitstream generator 18. The encoder 12 may include a first layer encoder 14 and a second layer encoder 16.

The inter-layer video encoding apparatus 10 according to various embodiments may classify a plurality of image sequences according to layers, may encode each of the image sequences according to a scalable video coding scheme, and may output separate streams including data encoded according to layers. The first layer encoder 12 may encode first layer images and may output a first layer stream including encoded data of the first layer images.

The second layer encoder 16 may encode second layer images and may output a second layer stream including encoding data of the second layer images.

The inter-layer video encoding apparatus 10 may express and encode the first layer stream and the second layer stream as one bitstream by using a multiplexer The inter-layer video encoding apparatus 10 may encode a first layer image sequence and a second layer image sequence to different layers.

For example, according to a scalable video coding scheme based on spatial scalability, low resolution images may be encoded as first layer images, and high resolution images may be encoded as second layer images. An encoding result of the first layer images is output as a first layer stream, and an encoding result of the second layer images is output as a second layer stream.

As another example, a multiview video may be encoded according to a scalable video coding scheme. Left-view images may be encoded as first layer images and right-view images may be encoded as second layer images. Alternatively, central-view images, left-view images, and right-view images may be each encoded, wherein the central-view images are encoded as first layer images, the left-view images are encoded as second layer images, and the right-view images are encoded as third layer images. Alternatively, a central-view color image, a central-view depth image, a left-view color image, a left-view depth image, a right-view color image, and a right-view depth image may be respectively encoded as a first layer image, a second layer image, a third layer image, a fourth layer image, a fifth layer image, and a sixth layer image. As another example, a central-view color image, a central-view depth image, a left-view depth image, a left-view color image, a right-view depth image, and a right-view color image may be respectively encoded as a first layer image, a second layer image, a third layer image, a fourth layer image, a fifth layer image, and a sixth layer image.

As another example, a scalable video coding method may be performed according to temporal hierarchical prediction based on temporal scalability. A first layer stream including encoding information generated by encoding base frame rate images may be output. Temporal levels may be classified according to frame rates and each temporal level may be encoded according to layers. A second layer stream including encoding information of a high frame rate may be output by further encoding higher frame rate images by referring to the base frame rate images.

As another example, a texture image may be encoded as first layer images, and a depth image may be encoded as second layer images. A result of encoding the first layer images may be output as a first layer stream, and a second layer stream may be output by encoding the second layer images by referring to the first layer image.

Also, scalable video coding may be performed on a first layer and a plurality of extension layers (a second layer through a K-th layer). When there are at least three extension layers, first layer images and K-th layer images may be encoded. Accordingly, an encoding result of the first layer images may be output as a first layer stream, and encoding results of the first through K-th layer images may be respectively output as first through K-th layer streams.

The inter-layer video encoding apparatus 10 according to various embodiment may perform inter prediction in which images of a single layer are referenced in order to predict a current image. By performing inter prediction, a motion vector indicating motion information between a current image and a reference image and a residual between the current image and the reference image may be predicted from a region corresponding to a first layer (base layer).

By performing inter-layer prediction, a displacement component between the current image and a reference image of a different layer, and a residual component between the current image and the reference image of the different layer may be generated.

Also, the inter-layer video encoding apparatus 10 may perform inter-layer prediction in which prediction information of second layer images is predicted by referring to prediction information of first layer images or a prediction image is generated. In this regard, the prediction information may include a motion vector, a disparity vector, a reference image index, and information indicating a prediction direction.

For example, in the inter-layer prediction, a disparity vector between the current image and the reference image of the different layer may be derived, and a residual component that is a difference component between the current image and a prediction image that is generated by using the reference image of the different layer may be generated.

Also, in the inter-layer prediction, a motion vector may be derived from a different layer image with respect to the current image, a reference image that is similar to the current image and is of a same layer as the current image may be determined by using the derived motion vector, and a residual component that is a difference component between the current image and a prediction image that is generated by using the reference image may be generated.

Also, when the inter-layer video encoding apparatus 10 according to an embodiment allows at least three layers, i.e., first through third layers, inter-layer prediction between a first layer image and a third layer image, and inter-layer prediction between a second layer image and a third layer image may be performed according to a multilayer prediction structure.

An inter-layer prediction structure will be described below with reference to FIG. 3A.

The inter-layer video encoding apparatus 10 according to various embodiments may perform encoding based on blocks of each image of a video, according to layers. A block may have a square shape, a rectangular shape, or an arbitrary geometrical shape, and is not limited to a data unit having a predetermined size. The block may be a maximum coding unit, a coding unit, a prediction unit, or a transformation unit, among coding units according to a tree structure. A largest coding unit including coding units of a tree structure may be called differently, such as a coding tree unit, a coding block tree, a block tree, a root block tree, a coding tree, a coding root, or a tree trunk. Video encoding and decoding methods based on coding units according to a tree structure will be described below with reference to FIGS. 8 through 20.

Inter prediction and inter-layer prediction may be performed based on a data unit, such as a coding unit, a prediction unit, or a transformation unit.

The first layer encoder 12 according to various embodiments may generate symbol data by performing source coding operations including inter prediction or intra prediction on first layer images. Symbol data indicates a value of each encoding parameter and a sample value of a residual.

For example, the first layer encoder 12 may generate symbol data by performing inter or intra prediction, transformation, and quantization on samples of a data unit of first layer images, and may generate a first layer stream by performing entropy encoding on the symbol data.

The second layer encoder 16 may encode second layer images based on coding units of a tree structure. The second layer encoder 16 may generate symbol data by performing inter/intra prediction, transformation, and quantization on samples of a coding unit of second layer images, and generate a second layer stream by performing entropy encoding on the symbol data.

The second layer encoder 16 according to various embodiments may perform inter-layer prediction in which a second layer image is predicted by using prediction information of a first layer image. In order to encode a second layer original image from a second layer image sequence through the inter-layer prediction structure, the second layer encoder 16 may determine prediction information of a second layer current image by using prediction information of a reconstructed first layer image corresponding to the second layer current image, and may encode a prediction error between the second layer original image and a second layer prediction image by generating the second layer prediction image based on the determined prediction information.

In addition, the second layer encoder 16 may determine a block of a first layer image to be referenced by a block of a second layer image by performing inter-layer prediction according to coding units or prediction units, on the second layer image. For example, a reconstructed block of the first layer image, which is located correspondingly to a location of a current block in the second layer image, may be determined. The second layer encoder 16 may determine a second layer prediction block by using a reconstructed first layer block corresponding to a second layer block. Here, the second layer encoder 16 may determine the second layer prediction block by using the reconstructed first layer block co-located with the second layer block. In this regard, when the second layer image indicates a view different from the first layer image, the second layer encoder 16 may determine a second layer prediction block by using the reconstructed first layer block located at a point corresponding to disparity information of the second layer block.

The second layer encoder 16 may use the second layer prediction block determined by using the reconstructed first layer block according to an inter-layer prediction structure, as a reference image for inter-layer prediction with respect to a second layer original block. The second layer encoder 16 may perform entropy encoding by transforming and quantizing an error, i.e., a residual according to inter-layer prediction, between a sample value of a second layer prediction block and a sample value of a second layer original block, by using a reconstructed first layer image.

When the inter-layer video encoding apparatus 10 described above encodes a multiview video, a first layer image to be encoded may be a first view video and a second layer image may be a second view video. Since such a multiview image is obtained at the same time, similarity between images according to views is high.

However, a multiview image may have a disparity since characteristics of photographing angles, lightings, and photographing devices (a camera and a lens) are different according to views. Accordingly, encoding efficiency may be increased by performing disparity-compensated prediction in which such a disparity is indicated as a disparity vector, and a region that is most similar to a block to be currently encoded is found and encoded from a different view image by using the disparity vector.

When the inter-layer video encoding apparatus 10 encodes texture-depth images, the first layer image may be the texture image, and the second layer image may be the depth image. Since the texture-depth images are obtained at the same time, similarity in prediction techniques of images is very high.

Therefore, encoding efficiency may be increased by performing motion-compensated prediction or disparity-compensated prediction in which a block included in the texture image which is co-located with a block included in the depth image is found, and the depth image is encoded by using motion information or disparity information of the texture image.

The second layer encoder 16 may determine a size of a subblock of the second layer image. Here, the subblock is a block of which size is smaller than or equal to a size of a current block to be predicted.

The second layer encoder 16 may perform inter-layer prediction on each of subblock units, and may determine a prediction sample value with respect to a prediction block of the current block by using a prediction sample value generated in each of the subblocks.

The second layer encoder 16 may determine a candidate block included in the first layer image, which corresponds to the current block included in the second layer image. Here, the candidate block denotes a corresponding block located in a different layer image correspondingly to the current block, and motion information included in the candidate block may be used to predict or obtain motion information of the current block. The current block to be predicted may be one of one or more prediction units determined from a coding unit.

The second layer encoder 16 may determine a size of a subblock of the current block by comparing at least one of a height and a width of a predetermined minimum size of a subblock with at least one of a height and a width of the current block of the second layer image.

When at least one of the height and the width of the current block is not an integer multiple of at least one of the height and the width of the predetermined minimum size of the subblock, the second layer encoder 16 may determine the size of the subblock of the current block to be equal to the size of the current block. For example, when the predetermined minimum size of the subblock is 8×8, the second layer encoder 16 compares at least one of a height of 8 of the predetermined minimum size of the subblock and a width of 8 of the predetermined minimum size of the subblock with at least one of the height and the width of the current block. When the size of the current block is 16×12, the second layer encoder 16 determines if a height of 16 of the current block is an integer multiple of the height of 8 of the minimum size of the subblock.

Also, the second layer encoder 16 determines if a width of 12 of the current block is an integer multiple of the height of 8 of the minimum size of the subblock. Since the width of 12 of the current block is 1.5 times greater than the height of 8 of the minimum size of the subblock and thus is not an integer multiple, the second layer encoder 16 may determine the size of the subblock of the current block to be the same as the size of the current block.

The second layer encoder 16 may determine an optimal inter-layer encoding mode among inter-layer encoding modes in which the current block is predicted based on at least one subblock determined from the current block of the second layer image by taking into account a rate-distortion (RD) cost. Then, the second layer encoder 16 may determine the size of the subblock of the current block by comparing at least one of a height and a width of a predetermined minimum size of a subblock in the determined inter-layer encoding mode with at least one of the height and the width of the current block of the second layer image.

In this regard, the inter-layer encoding modes of predicting the current block, based on at least one subblock, may include at least one of an inter-view motion prediction mode and a motion parameter inheritance mode. The inter-view motion prediction mode and the motion parameter inheritance mode will be described below with reference to FIGS. 5A and 5B.

The second layer encoder 16 determines at least one subblock from the current block, according to the determined size of the subblock of the current block. The second layer encoder 16 determines at least one subblock by partitioning the current block by using the determined size of the subblock of the current block. In this regard, the current block may be one of at least one prediction unit determined from the coding unit of the second layer image. The subblock may be smaller than or equal to the prediction unit. That is, in general, a subblock is smaller than a prediction unit but the present disclosure is not limited thereto, and sizes of the subblock and the prediction unit may be equal to each other. The partitioning refers to an operation of determining whether to split the current block into smaller subblocks or to perform prediction by completely using the current block as a subblock, and splitting the current block into the smaller subblocks or determining the current block to be the subblock, according to the determining.

The second layer encoder 16 determines, from the encoded first layer image, the candidate block corresponding to the current block. For example, when the current block is 16×16 and the determined size of the subblock is 8×8, 4 subblocks each having a size of 8×8 may be determined in the current block.

The second layer encoder 16 may obtain position information indicating the candidate block included in the first layer image from the current block included in the second layer image, and may determine the candidate block included in the first layer image by using the obtained position information. When the first layer image and the second layer image are the first view image and the second view image, respectively, the position information may be a disparity vector. When the first layer image is the texture image and the second layer image is the depth image, the position information may be a vector between the texture image and the depth image. The disparity vector and the vector between the texture image and the depth image will be described below with reference to FIGS. 4A and 4B.

For example, the second layer encoder 16 may determine the candidate block of the first layer image, which is co-located with the current block included in the second layer image, by using the position information.

Also, the second layer encoder 16 may obtain, from the current block, the position information indicating the candidate block included in the first layer image by using a disparity block of a temporally or spatially neighboring block adjacent to the current block, and may determine the candidate block included in the first layer image by using the obtained position information.

The second layer encoder 16 determines a candidate subblock from the candidate block of the first layer image by using the subblock of the current block. The second layer encoder 16 may determine the candidate subblock from the candidate block of the first layer image in a similar manner that the subblock is determined from the current block of the second layer image. For example, the second layer encoder 16 may determine a size of the candidate subblock and a relative location of the candidate subblock in the candidate block by using the size of the subblock and a relative location of the subblock in the current block.

The second layer encoder 16 determines motion information of the subblock included in the current block by using motion information of the candidate subblock included in the candidate block. In this regard, the motion information may include a motion vector, a disparity vector, a reference image index, and information regarding a prediction direction.

The second layer encoder 16 may generate a prediction block of the current block by using the motion information of the subblock included in the current block. In more detail, the second layer encoder 16 may perform one of the motion-compensated prediction and the disparity-compensated prediction on the current block, according to the inter-layer encoding mode determined by using the motion information included in the current block. The second layer encoder 16 generates the prediction block including a prediction sample value of the current block by using the motion information of the predicted current block.

The second layer encoder 16 may encode the current block by using the prediction block of the current block. The second layer encoder 16 may encode information regarding a residue indicating a difference between original pixel values of the current block and the prediction sample value of the current block. Here, the information regarding the residue may be particularly transformed, and the transformed information may be entropy-encoded.

The bitstream generator 18 may generate a bitstream including an encoded video and inter-layer prediction information determined in relation to the inter-layer prediction, and may transmit the generated bitstream to a decoding apparatus. The bitstream generator 18 may generate the bitstream including the encoded current block. That is, the bitstream generator 18 may include the information regarding the entropy-encoded residue as the encoded video.

When the subblock-based inter-layer prediction is performed, the bitstream generator 18 may generate a bitstream that includes both the encoded video and information regarding the predetermined minimum size of the subblock.

An inter-layer video encoding method of performing the subblock-based prediction, the method being performed by the inter-layer video encoding apparatus 10, according to various embodiments will be described in detail below with reference to FIGS. 4 through 7C.

The inter-layer video encoding apparatus 10 may perform entropy encoding by transforming and quantizing an error, i.e., a residual component according to inter-layer prediction, between a sample value of a second layer prediction block and a sample value of a second layer original block, by using a reconstructed first layer image. Also, entropy encoding may also be performed on an error between prediction information.

As described above, the inter-layer video encoding apparatus 10 may encode a current layer image sequence by referring to reconstructed first layer images through an inter-layer prediction structure.

However, the inter-layer video encoding apparatus 10 according to various embodiments may encode a second layer image sequence according to a single layer prediction structure without referring to different layer samples. Accordingly, it should not be limitedly construed that the inter-layer video encoding apparatus 10 only performs inter prediction of the inter-layer prediction structure in order to encode the second layer image sequence.

Hereinafter, detailed operations of the inter-layer video encoding apparatus 10 for inter-layer prediction will now be described with reference to FIG. 1B. Hereinafter, a second layer image may denote a motion information-referenced image, and a first layer image may denote a current image to be encoded.

FIG. 1B is a flowchart of an inter-layer video encoding method, according to various embodiments.

In operation 1110, the inter-layer video encoding apparatus 10 may determine a size of a subblock of a current block by comparing at least one of a height and a width of a predetermined minimum size of a subblock with at least one of a height and a width of the current block of a first layer image.

In operation 1120, the inter-layer video encoding apparatus 10 determines at least one subblock from the current block according to the determined size of the subblock of the current block. The inter-layer video encoding apparatus 10 determines at least one subblock by partitioning the current block by using the determined size of the subblock of the current block.

In operation 1130, the inter-layer video encoding apparatus 10 determines a candidate block that corresponds to the current block included in the first layer image and is included in the first layer image different from the second layer image. The inter-layer video encoding apparatus 10 obtains, from the current block included in the first layer image, a disparity vector indicating the candidate block included in the second layer image different from the first layer image. The inter-layer video encoding apparatus 10 may search for the candidate block by using the obtained disparity vector. The inter-layer video encoding apparatus 10 may determine the candidate block included in the second layer image which is co-located with the current block included in the first layer image.

If the first layer image is a first view image and the second layer image is a second view image, the inter-layer video encoding apparatus 10 may obtain the disparity vector from a neighboring block of the current block and may determine the candidate block corresponding to the current block by using the obtained disparity vector. If the first layer image is a depth image and the second layer image is a texture image, the inter-layer video encoding apparatus 10 may determine, as the candidate block, a block of the texture image which is co-located with the current block.

In operation 1140, the inter-layer video encoding apparatus 10 determines a candidate subblock from the candidate block of the second layer image by using the subblock of the current block. In this regard, the candidate subblock refers to a block that is located in the candidate block and is equal to or less than a size of the candidate block.

In operation 1140, the inter-layer video encoding apparatus 10 may determine the candidate subblock from the candidate block of the second layer image by using the subblock of the current block. The inter-layer video encoding apparatus 10 may determine the candidate subblock from the candidate block of the second layer image in a similar manner that the subblock is determined from the current block of the first layer image. For example, the inter-layer video encoding apparatus 10 may determine a size of the candidate subblock and a relative location of the candidate subblock in the candidate block by using the size of the subblock and a relative location of the subblock in the current block.

In operation 1150, the inter-layer video encoding apparatus 10 may determine motion information of the subblock included in the current block by using motion information of the candidate subblock included in the candidate block. In this regard, the motion information may include a motion vector, a reference image index, and information regarding a prediction direction. The inter-layer video encoding apparatus 10 may obtain the motion information of the candidate subblock, and may determine the obtained motion information to be the motion information of the subblock included in the current block or may derive the motion information of the subblock included in the current block by using the obtained motion information.

In operation 1160, the inter-layer video encoding apparatus 10 generates a prediction block of the current block by using the determined motion information of the subblock included in the current block.

For example, the inter-layer video encoding apparatus 10 may perform one of motion compensation and disparity compensation by using the motion information of the subblock included in the current block, so that the prediction block of the current block may be generated.

In operation 1170, the inter-layer video encoding apparatus 10 may generate a bitstream including the current block encoded by using the prediction block of the current block.

As described above, when the inter-layer video encoding apparatus 10 determines the size of the subblock, the inter-layer video encoding apparatus 10 determines the size of the subblock by comparing at least one of the height and the width of the predetermined minimum size of the subblock with at least one of the height and the width of the current block of the first layer image, so that realization/operation complexity of encoding and decoding apparatuses may be reduced.

The inter-layer video encoding apparatus 10 may include a central processor (not shown) that generally controls the first layer encoder 14, the second layer encoder 16, and the bitstream generator 18. Alternatively, the first layer encoder 14, the second layer encoder 16, and the bitstream generator 18 may operate due to individual processors (not shown), and the inter-layer video encoding apparatus 10 may operate as the individual processors systematically operate. Alternatively, the first layer encoder 14, the second layer encoder 16, and the bitstream generator 18 may be controlled under control of an external processor (not shown) of the inter-layer video encoding apparatus 10.

The inter-layer video encoding apparatus 10 may include at least one data storage unit (not shown) in which input and output data of the first layer encoder 14, the second layer encoder 16, and the bitstream generator 18 is stored. The inter-layer video encoding apparatus 10 may include a memory controller (not shown) that manages data input and output of the data storage unit (not shown).

In order to output a video encoding result, the inter-layer video encoding apparatus 10 may operate in cooperation with an internal video encoding processor installed therein or an external video encoding processor so as to perform video encoding operations including transformation. The internal video encoding processor of the inter-layer video encoding apparatus 10 may perform the video encoding operations as a separate processor. Also, basic video encoding operations may be realized as the inter-layer video encoding apparatus 10, a central processing apparatus, or a graphic processing apparatus includes a video encoding processing module.

Figure 1C:
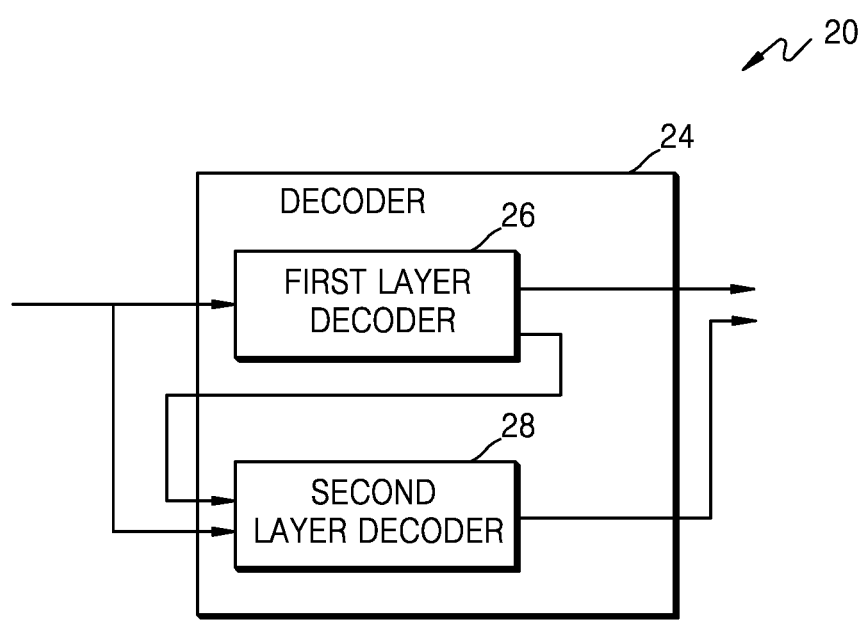
FIG. 1C is a block diagram of an inter-layer video decoding apparatus, according to various embodiments.

FIG. 1C is a block diagram of an inter-layer video decoding apparatus, according to various embodiments.

The inter-layer video decoding apparatus 20 according to various embodiments may include a decoder 24. The decoder 24 may include a first layer decoder 26 and a second layer decoder 28.

The inter-layer video decoding apparatus 20 according to various embodiments receives a bitstream of an encoded video according to layers.

The inter-layer video decoding apparatus 20 may receive bitstreams according to layers, via a scalable encoding scheme. The number of layers of bitstreams received by the inter-layer video decoding apparatus 20 is not limited. However, for convenience of description, an embodiment in which the first layer decoder 26 of the inter-layer video decoding apparatus 20 receives and decodes a first layer stream and the second layer decoder 28 receives and decodes a second layer stream will be described.

For example, the inter-layer video decoding apparatus 20 based on spatial scalability may receive a stream in which image sequences having different resolutions are encoded in different layers. A first layer stream may be decoded to reconstruct an image sequence having low resolution and a second layer stream may be decoded to reconstruct an image sequence having high resolution.

As another example, a multiview video may be decoded according to a scalable video coding scheme. When a stereoscopic video stream is received in a plurality of layers, a first layer stream may be decoded to reconstruct left-view images. A second layer stream in addition to the first layer stream may be further decoded to reconstruct right-view images.

Alternatively, when a multiview video stream is received in a plurality of layers, a first layer stream may be decoded to reconstruct central-view images. A second layer stream in addition to the first layer stream may be further decoded to reconstruct left-view images. A third layer stream in addition to the first layer stream may be further decoded to reconstruct right-view images.

Alternatively, when a texture-depth video stream is received in a plurality of layers, a first layer stream may be decoded to reconstruct a texture image. A second layer stream may be further decoded by using the reconstructed texture image so as to reconstruct a depth image.

As another example, a scalable video coding method based on temporal scalability may be performed. A first layer stream may be decoded to reconstruct base frame rate images. A second layer stream may be further decoded to reconstruct high frame rate images.

Also, when there are at least three second layers, first layer images may be reconstructed from a first layer stream, and when a second layer stream is further decoded by referring to reconstructed first layer images, second layer images may be further reconstructed. When K-th layer stream is further decoded by referring to reconstructed second layer images, K-th layer images may be further reconstructed.

The inter-layer video decoding apparatus 20 may obtain encoded data of first layer images and second layer images from a first layer stream and a second layer stream, and in addition, may further obtain a motion vector generated via inter prediction and prediction information generated via inter-layer prediction.

For example, the inter-layer video decoding apparatus 20 may decode inter-predicted data per layer, and decode inter-layer predicted data between a plurality of layers. Reconstruction may be performed through motion compensation and inter-layer video decoding based on a coding unit or a prediction unit.

Images may be reconstructed by performing motion compensation for a current image by referencing reconstructed images predicted via inter prediction of a same layer, with respect to each layer stream. Motion compensation is an operation in which a reconstructed image of a current image is reconstructed by synthesizing a reference image determined by using a motion vector of the current image and a residual component of the current image.

In addition, the inter-layer video decoding apparatus 20 may perform inter-layer video decoding by referring to prediction information of first layer images so as to decode a second layer image predicted via inter-layer prediction. Inter-layer video decoding is an operation in which prediction information of a current image is reconstructed by using prediction information of a reference block of a different layer so as to determine the prediction information of the current image.

The inter-layer video decoding apparatus 20 according to various embodiments may perform inter-layer video decoding for reconstructing third layer images predicted by using second layer images. An inter-layer prediction structure will be described below with reference to FIG. 3A.

However, the second layer decoder 28 according to various embodiments may decode a second layer stream without having to reference a first layer image sequence. Accordingly, it should not be limitedly construed that the second layer decoder 28 performs inter-layer prediction to decode a second layer image sequence.

The inter-layer video decoding apparatus 20 performs decoding according to blocks of each image of a video. A block may be, from among coding units according to a tree structure, a largest coding unit, a coding unit, a prediction unit, or a transformation unit.

The first layer decoder 26 may decode a first layer image by using parsed encoding symbols of the first layer image. When the inter-layer video decoding apparatus 20 receives streams encoded based on coding units of a tree structure, the first layer decoder 26 may perform decoding based on the coding units of the tree structure, according to a largest coding unit of a first layer stream.

The first layer decoder 26 may obtain decoding information and decoded data by performing entropy decoding per largest coding unit. The first layer decoder 26 may reconstruct a residual component by performing inverse quantization and inverse transformation on encoded data obtained from a stream. The first layer decoder 26 according to another embodiment may directly receive a bitstream of quantized transformation coefficients. The residual component of images may be reconstructed by performing inverse quantization and inverse transformation on quantized transformation coefficients.

The first layer decoder 26 may determine a prediction image via motion compensation between same layer images, and may reconstruct first layer images by combining the prediction image and the residual component.

According to an inter-layer prediction structure, the second layer decoder 28 may generate a second layer prediction image by using samples of a reconstructed first layer image. The second layer decoder 28 may obtain a prediction error according to inter-layer prediction by decoding a second layer stream. The second layer decoder 28 may generate a reconstructed second layer image by combining a second layer prediction image and the prediction error.

The second layer decoder 28 may determine a second layer prediction image by using a reconstructed first layer image decoded by the first layer decoder 26. According to an inter-layer prediction structure, the second layer decoder 28 may determine a block of a first layer image, which is to be referenced by a coding unit or a prediction unit, of a second layer image. For example, a reconstructed block of a first layer image, which is located correspondingly to a location of a current block in a second layer image, may be determined. The second layer decoder 28 may determine a second layer prediction block by using a reconstructed first layer block corresponding to a second layer block. The second layer decoder 28 may determine the second layer prediction block by using the reconstructed first layer block co-located with the second layer block.

The second layer decoder 28 may use a second layer prediction block determined by using a reconstructed first layer block according to an inter-layer prediction structure, as a reference image for inter-layer prediction of a second layer original block. In this case, the second layer decoder 28 may reconstruct a second layer block by synthesizing a sample value of a second layer prediction block determined by using a reconstructed first layer image and a residual according to inter-layer prediction.

In addition, when the inter-layer video decoding apparatus 20 described above decodes a multiview video, an encoded first layer image may be a first view video and a second layer image may be a second view video. Also, when the inter-layer video decoding apparatus 20 described above decodes texture-depth images, an encoded first layer image may be a texture image and a second layer image may be a depth image.

Since a multiview image is obtained at the same time, similarity between images of views is very high. Accordingly, encoding efficiency may be increased by performing disparity compensation in which a region that is most similar to a block to be currently encoded is found and encoded from a different view image by using a disparity vector.

The inter-layer video decoding apparatus 20 may obtain the disparity vector for inter-layer prediction through a bitstream or may predict the disparity vector from other pieces of encoding information. For example, the disparity vector may be predicted from neighboring blocks of the block to be currently reconstructed. Also, when the inter-layer video decoding apparatus 20 cannot predict the disparity vector from the neighboring blocks, the inter-layer video decoding apparatus 20 may determine a default disparity vector to be the disparity vector.

The second layer decoder 28 determines a size of a subblock of a current block by comparing at least one of a height and a width of a predetermined minimum size of a subblock with at least one of a height and a width of the current block of a second layer image. When at least one of the height and the width of the current block is not an integer multiple of at least one of the height and the width of the predetermined minimum size of the subblock, the second layer decoder 28 may determine the size of the subblock of the current block to be equal to the size of the current block.

The predetermined minimum size of the subblock may be determined by obtaining, from a bitstream, information indicating a predetermined size of the subblock.

The second layer decoder 28 determines at least one subblock from the current block, according to the size of the subblock of the current block. The second layer decoder 28 determines at least one subblock by partitioning the current block by using the size of the subblock of the current block.

The second layer decoder 28 may determine a candidate block that is included in the encoded first layer image and corresponds to the current block. In more detail, the second layer decoder 28 may obtain position information from the current block included in the second layer image, the position information indicating the candidate block included in the first layer image, and may determine the candidate block of the first layer image by using the obtained position information.

For example, when the multiview video is decoded, the first layer image may be the first view image and the second layer image may be the second view image. In this regard, the second layer decoder 28 may determine a disparity vector of the current block by using a disparity vector with respect to a neighboring block of the current block. The second layer decoder 28 may determine, from the current block included in the second layer image, the candidate block included in the first layer image by using the disparity vector of the current block indicating the candidate block included in the first layer image.

For example, when texture-depth images are decoded, the first layer image may be a texture image and the second layer image may be a depth image. In this regard, the second layer decoder 28 may determine a candidate block included in the texture image by using a predetermined vector. In more detail, the predetermined vector may be (0,0). That is, the second layer decoder 28 may determine the candidate block included in the texture image which is co-located with the current block of the depth image.

The second layer decoder 28 may determine a candidate subblock of the current block from the candidate block of the first layer image. The second layer decoder 28 may determine the candidate subblock from the candidate block of the first layer image in a similar manner that the subblock is determined from the current block of the second layer image. For example, the second layer decoder 28 may determine a size of the candidate subblock and a relative location of the candidate subblock in the candidate block by using the size of the subblock and a relative location of the subblock in the current block.

The second layer decoder 28 may determine motion information of the subblock included in the current block by using motion information of the candidate subblock included in the candidate block. The motion information may include a motion vector, a disparity vector, a reference image index, and information regarding a prediction direction.

The second layer decoder 28 may obtain the motion information of the candidate subblock, and may determine the obtained motion information to be the motion information of the subblock included in the current block or may derive the motion information of the subblock included in the current block by using the obtained motion information.

The second layer decoder 28 generates a prediction block of the current block by using the motion information of the subblock included in the current block. For example, the second layer decoder 28 may perform one of motion compensation and disparity compensation by using the motion information of the subblock included in the current block or disparity information, and as a result, the prediction block of the current block may be generated. The second layer decoder 28 may reconstruct the current block by using the prediction block of the current block. The second layer decoder 28 may reconstruct the second layer image including the reconstructed current block.

As described above, when the inter-layer video decoding apparatus 20 determines the size of the subblock, the inter-layer video decoding apparatus 20 determines the size of the subblock by comparing at least one of the height and the width of the predetermined minimum size of the subblock with at least one of the height and the width of the current block of the second layer image, so that realization/operation complexity of encoding and decoding apparatuses may be reduced.

When the inter-layer video decoding apparatus 20 performs subblock-based inter-layer prediction, the inter-layer video decoding apparatus 20 determines a size of a subblock by comparing at least one of a height and a width of a predetermined minimum size of a subblock with at least one of a height and a width of a current block to be predicted. For example, when the predetermined minimum size of the subblock is 8×8, the inter-layer video decoding apparatus 20 may not use a subblock of which size is less than the predetermined minimum size of the subblock. That is, when one of the height and the width of the current block is smaller than one of a height and a width of a size of a subblock, the inter-layer video decoding apparatus 20 does not use the corresponding subblock.

In this regard, not to use the corresponding subblock may mean that an inter-layer decoding mode according to subblock-based prediction is not used but another inter-layer decoding mode is used to perform inter-layer prediction, or may mean that inter-layer prediction is performed by using a subblock of which size is equal to a size of a prediction block of a current block.

For example, when the size of the prediction block is at least one of 16×4, 4×16, 16×12, and 12×16 (in this regard, it is assumed that the predetermined minimum size of the subblock is 8×8), the inter-layer video decoding apparatus 20 may apply only a merge candidate according to a single-layer prediction technique to a merge candidate list, and may not apply, to the merge candidate list, a merge candidate according to an inter-layer prediction technique including a merge candidate related to the subblock-based inter-layer prediction technique.

Therefore, the inter-layer video decoding apparatus 20 may not perform the subblock-based inter-layer prediction, and may generate the prediction block of the current block by using another prediction technique that does not use a subblock.

In the above description, it is assumed that the inter-layer video decoding apparatus 20 determines to perform the subblock-based inter-layer prediction. Hereinafter, processes of the inter-layer video decoding apparatus 20 determining a motion vector candidate, generating a merge candidate list, and determining to perform the subblock-based inter-layer prediction on a current block by using the merge candidate list will now be described in detail.

The inter-layer video decoding apparatus 20 determines various motion vector candidates by predicting a motion vector so as to perform inter-layer prediction on the current block.

For example, the inter-layer video decoding apparatus 20 may determine a motion vector to be predicted from a spatial candidate block as a motion vector candidate. Also, the inter-layer video decoding apparatus 20 may determine a motion vector to be predicted from a temporal candidate block to be another motion vector candidate.

The inter-layer video decoding apparatus 20 may determine a motion vector candidate for subblock-based inter-view motion prediction (hereinafter, referred to as an inter-view motion prediction candidate). The inter-layer video decoding apparatus 20 may determine a motion vector candidate (motion parameter inheritance candidate) for motion prediction according to subblock-based motion parameter inheritance.

When the inter-layer video decoding apparatus 20 determines a motion vector candidate for the inter-view motion prediction, the inter-layer video decoding apparatus 20 may determine the inter-view motion prediction candidate by using a disparity vector derived from a neighboring block of the current block.

In addition, the inter-layer video decoding apparatus 20 may determine the inter-view motion prediction candidate and the motion parameter inheritance candidate with respect to the current block by using an index (a reference image index) indicating a reference image from a prediction list.

The inter-layer video decoding apparatus 20 may determine a prediction direction. In more detail, the inter-layer video decoding apparatus 20 may determine the prediction direction by using prediction direction information. The prediction direction information is information indicating at least one prediction direction from among a L1 prediction list and a L0 prediction list. For example, the prediction direction information may include L0 prediction direction information indicating that the L0 prediction list is available and L1 prediction direction information indicating that the L1 prediction list is available. To determine the prediction direction means to determine which prediction list among the L0 prediction list and the L1 prediction list is used in prediction. That is, the inter-layer video decoding apparatus 20 may determine at least one of the L0 prediction list and the L1 prediction list.

The inter-layer video decoding apparatus 20 may determine a reference target image from among images included in the determined prediction list by using the reference image index. The reference image index may include an index indicating a reference target image from among images included in the L0 prediction list and an index indicating a reference target image from among images included in the L1 prediction list.

When a merge candidate is determined at a later time from merge candidates, the inter-layer video decoding apparatus 20 may refer to an image included in the prediction list (at least one of the L0 prediction list and the L1 prediction list) related to the prediction direction, may determine a block in the reference image by using a motion vector candidate related to the determined merge candidate, and may generate a prediction sample value of the current block by using the block in the reference image.

The inter-layer video decoding apparatus 20 generates a merge candidate list when the motion vector candidate is determined.

For example, the inter-layer video decoding apparatus 20 generates the merge candidate list including various merge candidates, such as a spatial merge candidate, a temporal merge candidate, an inter-view motion prediction merge candidate, an inter-view disparity prediction merge candidate, and a motion parameter inheritance merge candidate.

Here, the motion vector candidate, the reference image index, and the prediction direction, which may be used in inter-layer prediction regarding the merge candidate, may be already determined. The merge candidate may be an indicator indicating a motion vector prediction technique, and in more detail, the merge candidate may denote a block used in the motion vector prediction technique.

First, the inter-layer video decoding apparatus 20 determines whether each merge candidate is available according to priority of merge candidates.

The inter-layer video decoding apparatus 20 adds an available merge candidate to the merge candidate list.

For example, the inter-layer video decoding apparatus 20 determines whether the temporal merge candidate is available, and when the temporal merge candidate is available, adds the temporal merge candidate to the merge candidate list. The inter-layer video decoding apparatus 20 may determine whether the inter-view motion prediction merge candidate that is a next priority according to the priority of the merge candidates is available.

If the inter-view motion prediction merge candidate is available, the inter-layer video decoding apparatus 20 adds the inter-view motion prediction merge candidate to the merge candidate list. Also, if the motion parameter inheritance merge candidate is available, the inter-layer video decoding apparatus 20 adds the motion parameter inheritance merge candidate to the merge candidate list.

The number of merge candidates addable to the merge candidate list may be limited. Accordingly, the inter-layer video decoding apparatus 20 may add available merge candidates according to the priority of the merge candidates, and when a space to add a merge candidate is not sufficient in the merge candidate list, may not add a merge candidate to the merge candidate list.

The inter-layer video decoding apparatus 20 obtains a merge index. The merge index may be obtained from a bitstream. The merge index denotes an index indicating one of the merge candidates added to the merge candidate list.

The inter-layer video decoding apparatus 20 determines a merge candidate from the merge candidate list by using the merge index.

When the merge candidate determined by using the merge index is the inter-view motion prediction merge candidate, the inter-layer video decoding apparatus 20 performs motion compensation by using the motion vector candidate, the reference image index, and the prediction direction information, which are determined via the inter-view motion prediction.

If the merge candidate determined by using the merge index is the motion parameter inheritance merge candidate, the inter-layer video decoding apparatus 20 may perform at least one of disparity compensation and motion compensation by using the motion parameter inheritance candidate according to the motion parameter inheritance, the reference image index, and the prediction direction information.

If the merge candidate determined by using the merge index is one of the inter-view motion prediction merge candidate and the motion parameter inheritance merge candidate, the inter-layer video decoding apparatus 20 performs the motion compensation and the disparity compensation on the current block by using a corresponding motion vector candidate, and thus generates a prediction sample value with respect to the current block.

In more detail, the inter-layer video decoding apparatus 20 determines a reference block with respect to the current block by using the motion vector candidate. The inter-layer video decoding apparatus 20 generates the prediction sample value with respect to the current block by using the determined reference block.

When the inter-layer video decoding apparatus 20 determines an inter-view motion prediction candidate and a motion parameter inheritance candidate, the inter-layer video decoding apparatus 20 may determine a subblock-based inter-view motion prediction candidate and a subblock-based motion parameter inheritance candidate. In this regard, the subblock-based inter-view motion prediction candidate and the subblock-based motion parameter inheritance candidate may each refer to a motion vector candidate that is determined with respect to a subblock of the current block by determining at least one subblock from the current block, determining a candidate subblock of a different layer image by using the determined subblock, and using motion information of the candidate subblock. In this regard, since a motion vector is predicted by using a subblock of which size is equal to or less than a size of the current block, a prediction error is minimized.

The inter-layer video decoding apparatus 20 according to various embodiments may determine a subblock-based inter-view motion prediction candidate and a motion parameter inheritance candidate when a partition type of a current coding unit is a 2N×2N type while determining the inter-view motion prediction candidate and the motion parameter inheritance candidate.

When the inter-layer video decoding apparatus 20 according to various embodiments performs decoding according to a motion parameter inheritance mode (or an inter-view motion prediction mode) that is a subblock-based inter-layer decoding mode, the inter-layer video decoding apparatus 20 may perform decoding according to the motion parameter inheritance mode (or the inter-view motion prediction mode) by using a subblock only when a partition type of the current block is a particular partition type.

When decoding is performed according to the motion parameter inheritance mode (or the inter-view motion prediction mode), if the partition type of the current block to be decoded is PART_2N×2N, the inter-layer video decoding apparatus 20 may perform prediction by using the subblock according to the motion parameter inheritance mode (or the inter-view motion prediction mode).

When the partition type of the current block is not the particular partition type, the inter-layer video decoding apparatus 20 may not use the subblock and may perform decoding by using a subblock of which size is equal to the current block according to the motion parameter inheritance mode (or the inter-view motion prediction mode). In this regard, the inter-layer video decoding apparatus 20 may perform prediction on the current block by using a current prediction block in a prediction module with respect to the motion parameter inheritance mode (or the inter-view motion prediction mode) using a subblock. For example, according to a partition type, the inter-layer video decoding apparatus 20 may differently determine a size of the subblock used in the prediction module with respect to the motion parameter inheritance mode, and may perform inter-layer prediction on the current block.

For example, if a partition type of the current block is 2N×2N, the inter-layer video decoding apparatus 20 may determine a size of a subblock to be equal to a predetermined size of a subblock, and may perform decoding by using the determined subblock according to the motion parameter inheritance mode.

On the other hand, if the partition type of the current block is not 2N×2N, the inter-layer video decoding apparatus 20 may determine the size of the subblock to be equal to a size of the current prediction block, and may perform decoding by using the determined subblock according to the motion parameter inheritance mode.

When the size of the subblock is determined not to be the predetermined size of the subblock (for example, in a case where the size of the subblock is determined to be one of 12×8 and 8×12 when the predetermined size of the subblock is 8×8), the inter-layer video decoding apparatus 20 according to various embodiments may perform motion compensation according to the determined block unit. When motion information generated by performing the motion compensation is stored, the motion information may be stored with respect to each subblock unit having a predetermined size. For example, when the size of the subblock is determined to be equal to one of 12×8 and 8×12, not a size of a subblock such as 8×4, 4×8, 8×8, 16×16, 16×8, or 8×16, the inter-layer video decoding apparatus 20 may perform prediction by using the subblock of which size is equal to one of 12×8 and 8×12. However, the inter-layer video decoding apparatus 20 may not store motion information with respect to the subblock having the size of 12×8, the motion information being obtained with respect to the subblock having the size of 12×8, but may store the motion information with respect to each of subblocks having sizes of 8×4 and 8×8 that are predetermined sizes of subblocks. Equally, the inter-layer video decoding apparatus 20 may not store motion information with respect to the subblock having the size of 8×12, the motion information being obtained with respect to the subblock having the size of 8×12, but may store the motion information with respect to each of subblocks having sizes of 4×8 and 8×8 that are predetermined sizes of subblocks.

When the inter-layer video decoding apparatus 20 according to various embodiments performs the subblock-based inter-layer prediction by using a height and a width of a predetermined minimum size of a subblock, when a height or a width of a current block to be predicted is not equally divided by being compared with at least one of the height and the width of the predetermined minimum size of the subblock, the inter-layer video decoding apparatus 20 may split the current block into blocks that each are smaller or larger than the predetermined minimum size of the subblock, and may perform inter-layer prediction on the current block by using the split subblock. In this regard, a bi-directional prediction may not be allowed to reduce memory access complexity with respect to a block that is smaller or larger than the predetermined minimum size of the subblock. Here, the meaning that the bi-directional prediction is not allowed may specify that prediction is not performed by using both an L0 prediction list and an L1 prediction list but is performed by using one of the L0 prediction list and the L1 prediction list. For example, when the predetermined minimum size of the subblock is 8×8 and a size of a determined subblock is 8×4 or 4×8, the inter-layer video decoding apparatus 20 may not allow the bi-directional prediction with respect to the subblock. When the size of the subblock is determined to be a size that is not the predetermined minimum size of the subblock, the inter-layer video decoding apparatus 20 may not allow the bi-directional prediction with respect to the subblock by taking into account complexity. In more detail, when a size of a subblock is determined to be a size that is greater than the predetermined minimum size of the subblock and is not a predetermined size of the subblock, the inter-layer video decoding apparatus 20 may not allow the bi-directional prediction with respect to the subblock by taking into account complexity. In this regard, the considered complexity may be about an external memory bandwidth. According to the High Efficiency Video Coding (HEVC) standard, when the bi-directional prediction is allowed with respect to 8×4 or 4×8, an external memory bandwidth is increased (a worst case in the HEVC) than the bi-directional prediction with respect to 8×8 in a same-size region, thus, the bi-directional prediction is allowed with respect to a block having a size of 8×4 or 4×8.

When the inter-layer video decoding apparatus 20 according to various embodiments determines a motion parameter inheritance mode from among a plurality of inter-layer decoding modes, the inter-layer video decoding apparatus 20 performs prediction on motion information by using a block of a texture image which is co-located with a block of a depth image.

Motion information of the texture image may be stored according to blocks having a predetermined size (a size of 8×8 or 16×16). In this regard, when a size of a subblock to be used in inter-layer prediction is smaller than a size of a block storing motion information, an operation of fetching motion information is repeatedly performed.

Therefore, the inter-layer video decoding apparatus 20 according to various embodiments may determine the size of the subblock to be a size of a block which is equal to or greater than a unit size storing a motion parameter. For example, when a size of a minimum unit storing the motion parameter is 8×8, and the determined size of the subblock is one of 8×4 and 4×8, the inter-layer video decoding apparatus 20 may not allow a subblock having a size of one of 8×4 and 4×8, and may re-determine the size of the subblock to be a block of which size is equal to or greater than the unit size.

In this regard, the inter-layer video decoding apparatus 20 may determine a subblock of which size is equal to or greater than a size of 8×8, and may perform inter-layer prediction by using the determined subblock.

The inter-layer video decoding apparatus 20 may determine the size of the subblock to be the size of the block which is equal to or greater than the unit size storing the motion parameter in an advanced motion vector prediction (AMVP) mode, not limited to the motion parameter inheritance mode.

For example, when one of a height and a width of a determined subblock is less than at least one of a height and a width of the unit size storing the motion parameter, the inter-layer video decoding apparatus 20 may not allow the determined subblock. That is, the inter-layer video decoding apparatus 20 may perform inter-layer prediction by using a determined subblock having a size of which height or width is equal to or greater than at least one of the height and the width of the unit size storing the motion parameter.

When the size of the determined subblock is equal to a predetermined size, the inter-layer video decoding apparatus 20 according to various embodiments may not perform bi-directional prediction. For example, when the size of the subblock is equal to a size of 8×4 or 4×8, the inter-layer video decoding apparatus 20 may perform only uni-directional prediction. In this regard, the inter-layer video decoding apparatus 20 may determine one of the L0 prediction list and the L1 prediction list or may determine a preset prediction list, and may perform the uni-directional prediction by using an image included in the determined prediction list.

With reference to FIG. 1C, the descriptions are provided above assuming that the first layer image is a base layer image and the second layer image is an enhancement layer image. A base layer refers to a layer that can be reconstructed by using only its own layer, and an enhancement layer refers to a layer that can be reconstructed by using information of another layer.

The terms "first" and "second" are used only to emphasize a difference therebetween, and as used herein, it is obvious to one of ordinary skill in the art that the base layer image may refer to "second layer image", and the enhancement layer image (a layer image that uses the base layer image) may refer to "first layer image".

Hereinafter, with reference to FIG. 1D, an inter-layer video decoding method will now be described by assuming that the base layer is a second layer image and the enhancement layer is a first layer image, for convenience of description.

Figure 1D:
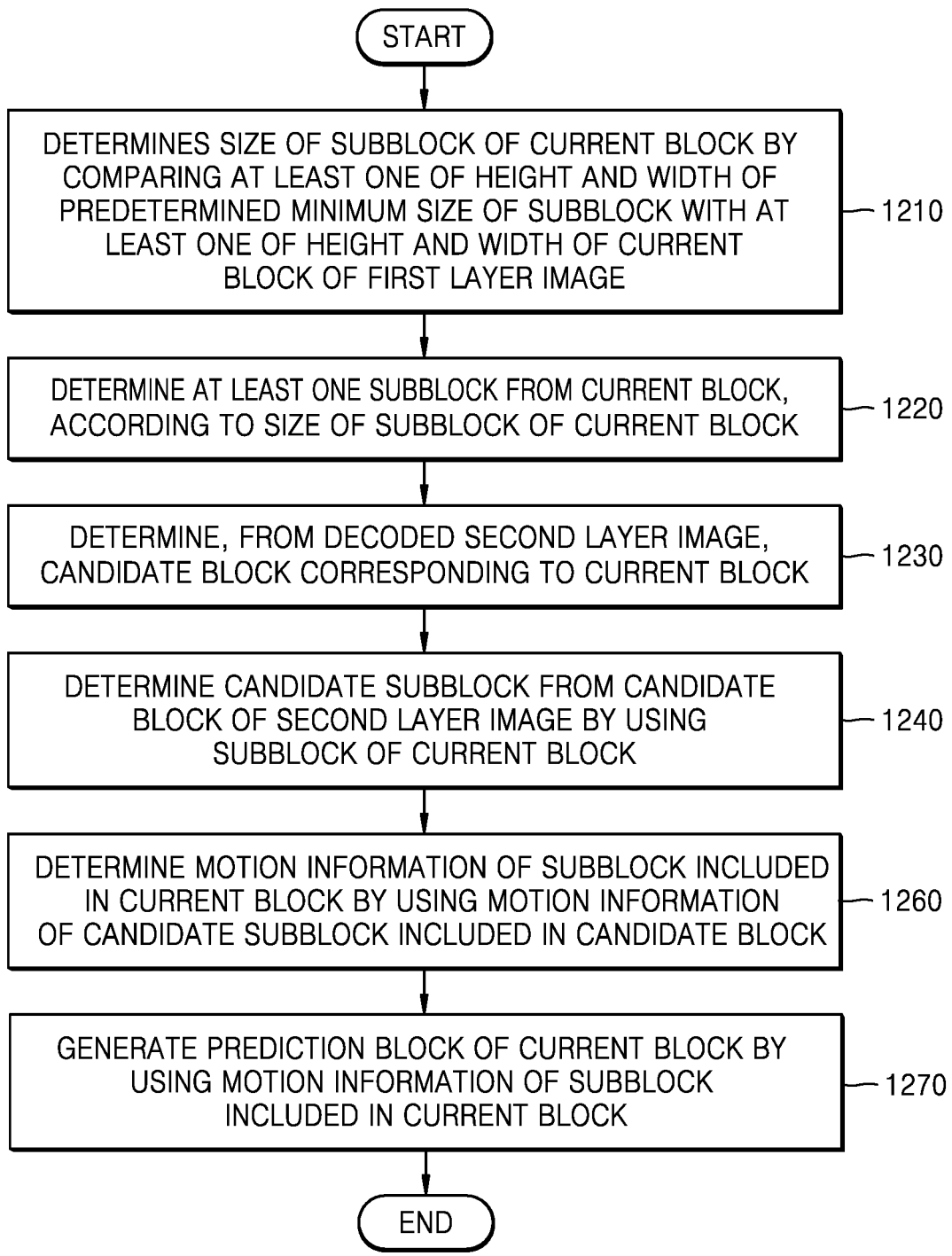
FIG. 1D is a flowchart of an inter-layer video decoding method, according to various embodiments.

FIG. 1D is a flowchart of an inter-layer video decoding method, according to various embodiments.

In operation 1210, the inter-layer video decoding apparatus 20 determines a size of a subblock of a current block by comparing at least one of a height and a width of a predetermined minimum size of a subblock with at least one of a height and a width of a current block of a first layer image. When at least one of the height and the width of the current block is not an integer multiple of at least one of the height and the width of the predetermined minimum size of the subblock, the inter-layer video decoding apparatus 20 may determine the size of the subblock of the current block to be equal to the size of the current block In operation 1220, the inter-layer video decoding apparatus 20 determines at least one subblock from the current block, according to the size of the subblock of the current block. The second layer decoder 28 determines at least one subblock by partitioning the current block by using the size of the subblock of the current block. The partitioning refers to an operation of determining whether to split the current block into smaller subblocks or to perform prediction by completely using the current block as a subblock, and splitting the current block into the smaller subblocks or determining the current block to be the subblock, according to the determining.

In operation 1230, the inter-layer video decoding apparatus 20 may determine, from a decoded second layer image, a candidate block corresponding to the current block. The inter-layer video decoding apparatus 20 obtains position information indicating the candidate block included in the second layer image from the current block of the first layer image, and determines the candidate block of the second layer image by using the obtained position information.

For example, when a multiview video is decoded, the first layer image may be a first view image, and the second layer image may be a second view image. In this regard, the inter-layer video decoding apparatus 20 may determine a disparity vector of the current block by using a disparity vector with respect to a neighboring block of the current block. The inter-layer video decoding apparatus 20 may determine, from a current block included in the first view image, the candidate block included in the second view image by using a disparity vector of the current block indicating a candidate block included in the second view image.

For example, when texture-depth images are decoded, the first layer image may be a depth image and the second layer image may be a texture image. In this regard, the inter-layer video decoding apparatus 20 may determine a candidate block included in the texture image by using a predetermined vector. In more detail, the predetermined vector may be (0,0). That is, the inter-layer video decoding apparatus 20 may determine the candidate block included in the texture image which is co-located with the current block of the depth image.

In operation 1240, the inter-layer video decoding apparatus 20 may determine a candidate subblock of the current block from the candidate block of the second layer image. The inter-layer video decoding apparatus 20 may determine the candidate subblock from the candidate block of the second layer image in a similar manner that the subblock is determined from the current block of the first layer image. For example, the inter-layer video decoding apparatus 20 may determine a size of the candidate subblock and a relative location of the candidate subblock in the candidate block by using the size of the subblock and a relative location of the subblock in the current block.

Therefore, the inter-layer video decoding apparatus 20 may determine the candidate subblock by partitioning the candidate block in a similar manner that the current block is partitioned. In operation 1260, the inter-layer video decoding apparatus 20 may determine motion information of the subblock included in the current block by using motion information of the candidate subblock included in the candidate block. The inter-layer video decoding apparatus 20 may obtain the motion information of the candidate subblock, and may determine the obtained motion information to be the motion information of the subblock included in the current block or may derive the motion information of the subblock included in the current block by using the obtained motion information.

In operation 1270, the inter-layer video decoding apparatus 20 generates a prediction block of the current block by using the motion information of the subblock included in the current block. For example, the inter-layer video decoding apparatus 20 may perform one of motion-compensated prediction and disparity-compensated prediction by using the motion information or disparity information of the subblock included in the current block, so that the prediction block of the current block may be generated as a result of the prediction. The inter-layer video decoding apparatus 20 may reconstruct the current block by using the prediction block of the current block. The inter-layer video decoding apparatus 20 may reconstruct the first layer image including the reconstructed current block.

Figure 2A:
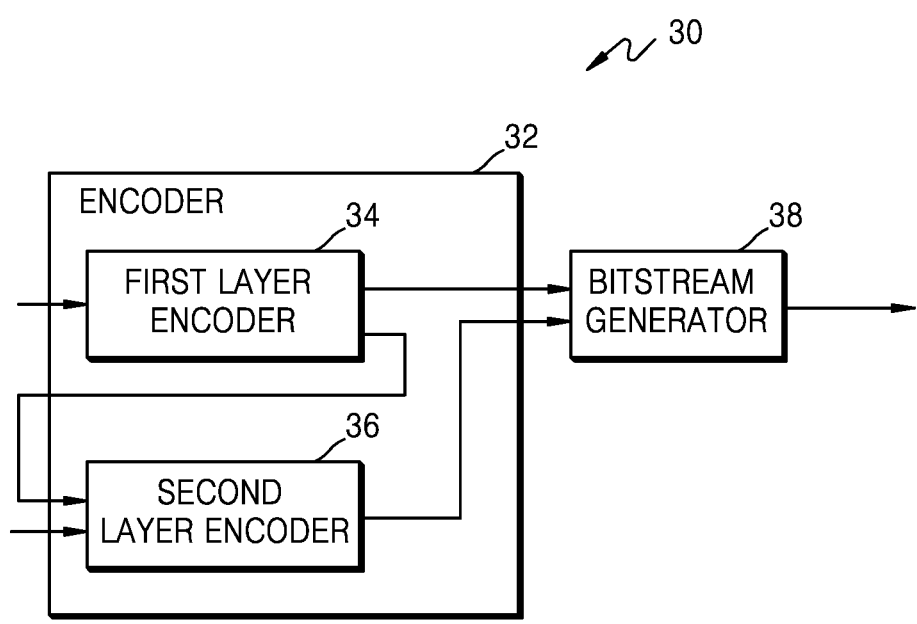
FIG. 2A is a block diagram of an inter-layer video encoding apparatus, according to various embodiments.

FIG. 2A is a block diagram of an inter-layer video encoding apparatus, according to another embodiment of the present disclosure.

An inter-layer video encoding apparatus 30 may include an encoder 32.

The inter-layer video encoding apparatus 30 may perform functions performed by the inter-layer video encoding apparatus 10 described with reference to FIG. 1A as long as the functions do not confront each other.

The encoder 32 may include a first layer encoder 34 and a second layer encoder 36. The first layer encoder 34 may encode a first layer image.

The second layer encoder 36 may determine an inter-layer decoding mode from among a plurality of inter-layer decoding modes of predicting a current block, based on at least one subblock determined from the current block of a second layer image.

The inter-layer decoding mode refers to a decoding mode in which prediction is performed on an image including a plurality of layers, not a single layer, by using prediction information of a different layer image, and in particular, a current block is predicted based on at least one subblock determined from the current block. For example, the plurality of inter-layer decoding modes may include an inter-view motion prediction mode and a motion parameter inheritance mode.

The second layer encoder 36 may perform prediction according to various inter-layer decoding modes, and may determine the inter-layer decoding mode of predicting the current block, based on the subblock, by taking into account a rate-distortion (RD) cost.

When one inter-layer decoding mode is determined, the second layer encoder 36 obtains position information from the second layer image so as to determine a location of a candidate block in the determined inter-layer decoding mode. In this regard, the position information refers to a difference between a particular position of a current layer image and a particular position of a different layer image, and may include a vector including a vector between texture and depth images and a disparity vector.

For example, When the inter-layer decoding mode is the inter-view motion prediction mode, the first layer image may be a first view image and the second layer image may be a second view image. The second layer encoder 36 may obtain, from the current block of the second view image, a disparity vector indicating a candidate block of the first view image. The second layer encoder 36 may derive and obtain the disparity vector of the current block by using a disparity vector with respect to a neighboring block of the current block.

For example, when the inter-layer decoding mode is the motion parameter inheritance mode, the first layer image may be a texture image and the second layer image may be a depth image. The second layer encoder 36 may obtain a vector between the texture and depth images which indicates a candidate block of the texture image from a current block of the depth image. The vector between the texture and depth images may be a vector having a predetermined value. For example, the vector between the texture and depth images may be (0,0).

The second layer encoder 36 may determine at least one subblock from the current block. The second layer encoder 36 determines at least one subblock from the current block. The second layer encoder 36 determines at least one subblock by partitioning the current block. The partitioning refers to an operation of determining whether to split the current block into smaller subblocks or to perform prediction by completely using the current block as a subblock, and splitting the current block into the smaller subblocks or determining the current block to be the subblock, according to the determining.

The second layer encoder 36 may determine, by using the obtained position information, the candidate block that corresponds to the current block and is included in a encoded first layer image. For example, when the inter-layer decoding mode is the inter-view motion prediction mode, the second layer encoder 36 may determine the candidate block of the first view image by using a disparity vector indicating the candidate block of the first view image from the current block of the second view image.

For example, when the inter-layer decoding mode is the motion parameter inheritance mode, the second layer encoder 36 may determine the candidate block of the texture image by using the vector between the texture and depth images which indicates the candidate block of the texture image from the current block of the depth image.

The second layer encoder 36 may determine a candidate subblock from the candidate block of the second layer image by using the subblock of the current block. The second layer encoder 36 may determine the candidate subblock from the candidate block of the first layer image in a similar manner that the subblock is determined from the current block of the second layer image. For example, the second layer encoder 36 may determine a size of the candidate subblock and a relative location of the candidate subblock in the candidate block by using the size of the subblock and a relative location of the subblock in the current block. Therefore, the second layer encoder 36 may determine the candidate subblock by partitioning the candidate block in a similar manner that the current block is partitioned.

The second layer encoder 36 may determine motion information of the subblock included in the current block by using motion information of the candidate subblock included in the candidate block.

The second layer encoder 36 may generate a prediction block of the current block according to the motion information of the subblock included in the current block.

The inter-layer video encoding apparatus 30 may further include a bitstream generator 38. The bitstream generator 38 may generate a bitstream including the encoded current block.

As described above, the inter-layer video encoding apparatus 30 determines and predicts the candidate block corresponding to the current block and the candidate subblock in a same way by using one module with respect to the plurality of inter-layer decoding modes of predicting the current block, based on the subblock, so that realization/operation complexity of encoding and decoding apparatuses may be reduced.

Figure 2B:
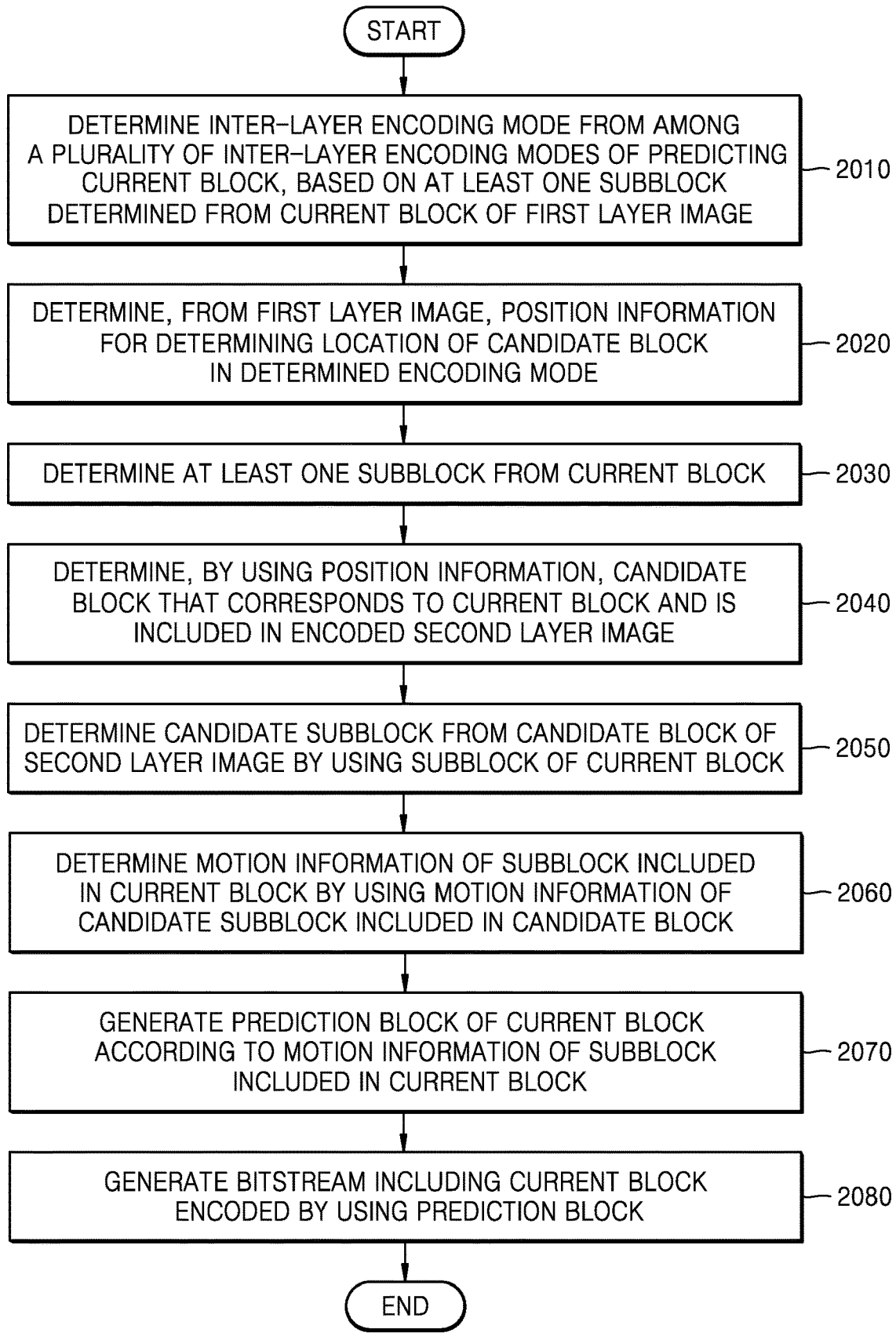
FIG. 2B is a flowchart of an inter-layer video encoding method, according to various embodiments.

FIG. 2B is a flowchart of an inter-layer video encoding method, according to various embodiments.

In operation 2010, the inter-layer video encoding apparatus 30 determines an inter-layer decoding mode from among a plurality of inter-layer decoding modes of predicting a current block, based on at least one subblock determined from the current block of a first layer image. In operation 2020, the inter-layer video encoding apparatus 30 may determine, from the second layer image, position information for determining a location of a candidate block in the determined decoding mode.

In operation 2030, the inter-layer video encoding apparatus 30 may determine at least one subblock from the current block.

In operation 2040, the inter-layer video encoding apparatus 30 may determine, by using the position information, the candidate block that corresponds to the current block and is included in an encoded second layer image.

In operation 2050, the inter-layer video encoding apparatus 30 may determine a candidate subblock of the current block from the candidate block of the second layer image.

In operation 2060, the inter-layer video encoding apparatus 30 may determine motion information of the subblock included in the current block by using motion information of the candidate subblock included in the candidate block.

In operation 2070, the inter-layer video encoding apparatus 30 may generate a prediction block of the current block according to the motion information of the subblock included in the current block.

In operation 2080, the inter-layer video encoding apparatus 30 generates a bitstream including the current block encoded by using the prediction block.

Figure 2C:
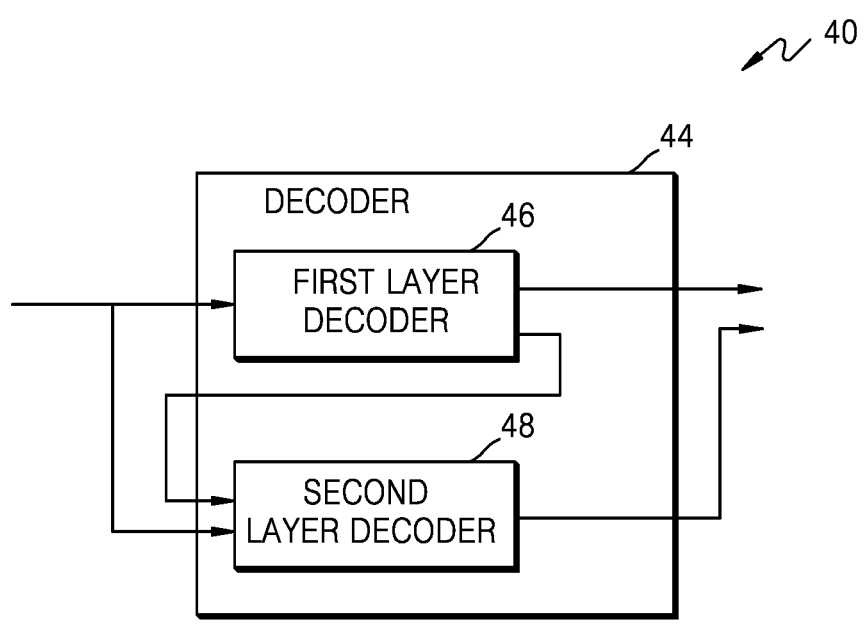
FIG. 2C is a block diagram of an inter-layer video decoding apparatus, according to various embodiments.

FIG. 2C is a block diagram of an inter-layer video decoding apparatus, according to another embodiment of the present disclosure.

An inter-layer video decoding apparatus 40 may perform functions performed by the inter-layer video decoding apparatus 20 as long as the inter-layer video decoding apparatus 40 does not confront with the inter-layer video decoding apparatus 20 with respect to the functions.

Referring to FIG. 2D, the inter-layer video decoding apparatus 40 may include a decoder 44.

The decoder 44 may include a first layer decoder 46 and a second layer decoder 48.

The first layer decoder 46 may decode an encoded first layer image.

The second layer decoder 48 determines an inter-layer decoding mode from among a plurality of inter-layer decoding modes of predicting a current block, based on at least one subblock determined from the current block of a second layer image.

The second layer decoder 48 determines a candidate subblock from a candidate block of the first layer image by using a subblock of the current block.

The second layer decoder 48 may determine motion information of the subblock included in the current block by using motion information of the candidate subblock included in the candidate block.

The second layer decoder 48 generates a prediction block of the current block by using the motion information of the subblock included in the current block. The second layer decoder 48 may reconstruct the current block by using the prediction block of the current block. The second layer decoder 48 may reconstruct the second layer image including the reconstructed current block.

As described above, the second layer decoder 48 first determines a particular inter-layer decoding mode from among the inter-layer decoding modes, determines the motion information of the current block according to the particular inter-layer decoding mode, and generates the prediction block of the current block.

However, it is not limited thereto, and it is obvious to one of ordinary skill in the art that the second layer decoder 48 may determine merge candidates according to a plurality of inter-layer decoding modes including the particular inter-layer decoding mode, may also determine motion vector candidates related to the motion information of the current block by determining the merge candidates, may determine, from among the merge candidates, a merge candidate related to the particular inter-layer decoding mode, and then may generate a prediction block of the current block by using a motion vector candidate of the merge candidate related to the particular inter-layer decoding mode.

Hereinafter, a procedure of generating a prediction block of a current block by using a merge candidate will now be described in detail.

The second layer decoder 48 determines merge candidates according to a plurality of inter-layer decoding modes. In this regard, a motion vector candidate, a reference image index, and a prediction direction are determined with respect to each merge candidate. That is, the second layer decoder 48 may determine a motion vector candidate from motion information of a candidate subblock by determining one merge candidate. The second layer decoder 48 generates a merge candidate list by adding the merge candidates to the merge candidate list. The second layer decoder 48 may obtain, from the merge candidate list, a merge index indicating an inter-layer decoding mode. The second layer decoder 48 may determine a merge candidate related to the inter-layer decoding mode by using the obtained merge index. The second layer decoder 48 may generate the prediction block of the current block by using a motion vector candidate, a reference image index, and a prediction direction related to the determined merge candidate.

With reference to FIG. 2C, the descriptions are provided above assuming that the first layer image is a base layer image and the second layer image is an enhancement layer image. A base layer refers to a layer that can be reconstructed by using only its own layer, and an enhancement layer refers to a layer that can be reconstructed by using information of another layer.

The terms "first" and "second" are used only to emphasize a difference therebetween, and as used herein, it is obvious to one of ordinary skill in the art that the base layer image may refer to "second layer image", and the enhancement layer image (a layer image that uses the base layer image) may refer to "first layer image".

Hereinafter, with reference to FIG. 2D, an inter-layer video decoding method will now be described by assuming that the base layer is a second layer image and the enhancement layer is a first layer image, for convenience of description.

FIG. 2D is a flowchart of an inter-layer video decoding method, according to another embodiment of the present disclosure.

In operation 2110, the inter-layer video decoding apparatus 40 determines an inter-layer decoding mode from among a plurality of inter-layer decoding modes of predicting a current block, based on at least one subblock determined from the current block of a first layer image.

In operation 2120, the inter-layer video decoding apparatus 40 obtains position information for determining a position of a candidate block from a second layer image in the determined decoding mode.

In operation 2130, the inter-layer video decoding apparatus 40 determines at least one subblock from the current block.

In operation 2140, the inter-layer video decoding apparatus 40 determines, by using the position information, the candidate block that corresponds to the current block and is included in the decoded second layer image.

In operation 2150, the inter-layer video decoding apparatus 40 determines a candidate subblock from the candidate block of the second layer image by using the subblock of the current block.

In operation 2160, the inter-layer video decoding apparatus 40 determines motion information of the subblock included in the current block by using motion information of the candidate subblock.

In operation 2170, the inter-layer video decoding apparatus 40 generates a prediction block of the current block according to the motion information of the subblock included in the current block. The inter-layer video decoding apparatus 40 reconstructs the current block by using the generated prediction block of the current block, and reconstructs the first layer image including the reconstructed current block.

Hereinafter, with reference to FIG. 3A, an inter-layer prediction structure that may be performed in the inter-layer video encoding apparatus 10 according to various embodiments will now be described.

Figure 3A:
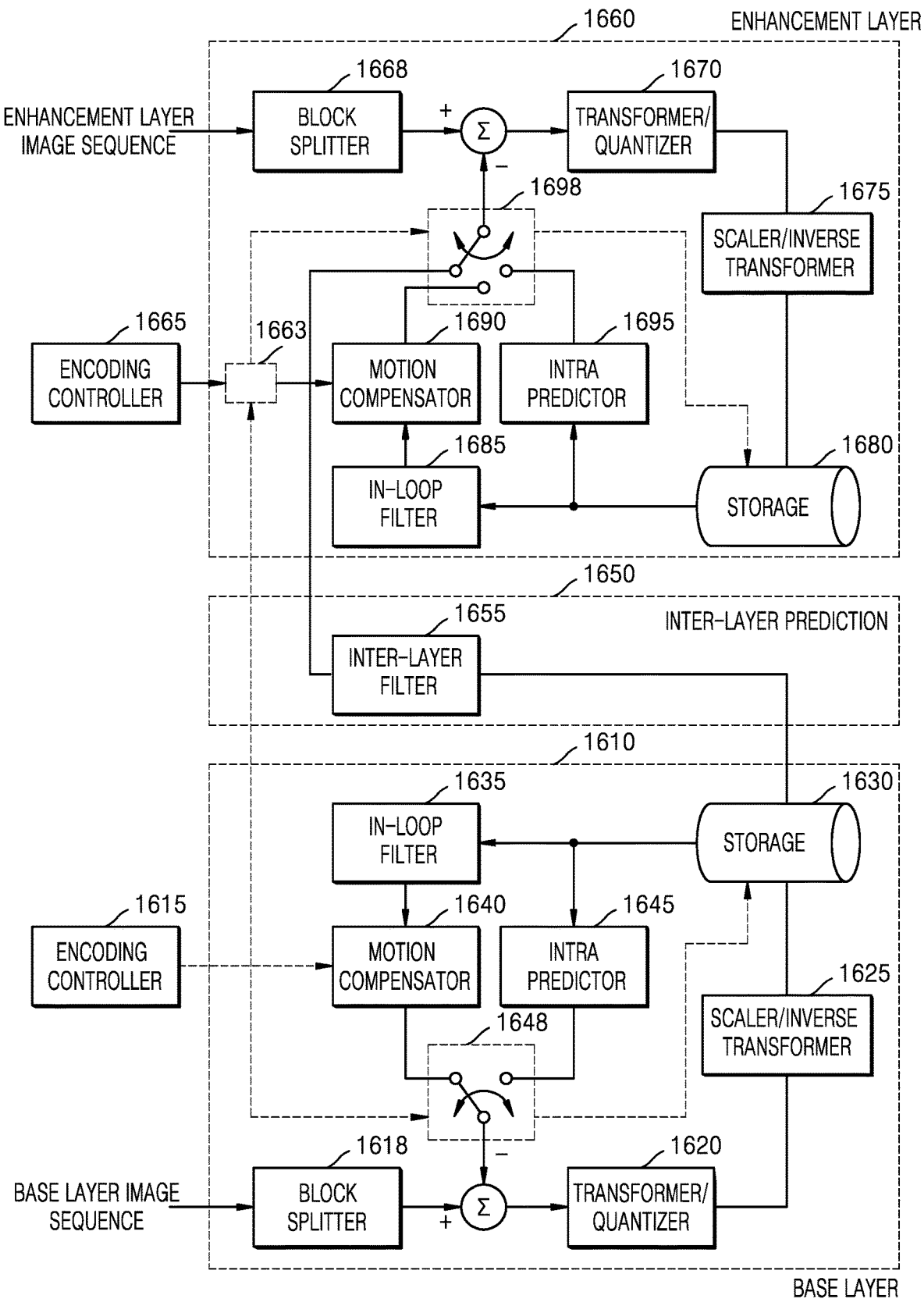
FIG. 3A is a diagram of an inter-layer prediction structure, according to various embodiments.

FIG. 3A is a diagram of an inter-layer prediction structure, according to various embodiments.

The inter-layer video encoding apparatus 10 according to an embodiment may prediction-encode base view images, left-view images, and right-view images according to a reproduction order 50 of a multiview video prediction structure of FIG. 3A.

According to the reproduction order 50 of the multiview video prediction structure according to a related technology, images of the same view are arranged in a horizontal direction. Accordingly, the left-view images indicated by 'Left' are arranged in the horizontal direction in a row, the base view images indicated by 'Center' are arranged in the horizontal direction in a row, and the right-view images indicated by 'Right' are arranged in the horizontal direction in a row. Compared to the left/right-view images, the base view images may be central-view images.

Also, images having the same picture order count (POC) order are arranged in a vertical direction. A POC order of images indicates a reproduction order of images forming a video. 'POC X' indicated in the reproduction order 50 of the multiview video prediction structure indicates a relative reproduction order of images in a corresponding column, wherein a reproduction order is in front when a value of X is low, and is behind when the value of X is high.

Thus, according to the reproduction order 50 of the multiview video prediction structure according to the related technology, the left-view images indicated by 'Left' are arranged in the horizontal direction according to the POC order (reproduction order), the base view images indicated by 'Center' are arranged in the horizontal direction according to the POC order (reproduction order), and the right-view images indicated by 'Right' are arranged in the horizontal direction according to the POC order (reproduction order). Also, the left-view image and the right-view image located on the same column as the base view image have different views but the same POC order (reproduction order).

Four consecutive images form one group of pictures (GOP) according to views. Each GOP includes images between consecutive anchor pictures, and one anchor picture (key picture).

An anchor picture is a random access point, and when a reproduction location is arbitrarily selected from images arranged according to a reproduction order, i.e., a POC order, while reproducing a video, an anchor picture closest to the reproduction location according to the POC order is reproduced. The base layer images include base layer anchor pictures 51 through 55, the left-view images include left-view anchor pictures 131 through 135, and the right-view images include right-view anchor pictures 231 through 235.

Multiview images may be reproduced and predicted (reconstructed) according to a GOP order. First, according to the reproduction order 50 of the multiview video prediction structure, images included in GOP 0 may be reproduced, and then images included in GOP 1 may be reproduced, according to views. In other words, images included in each GOP may be reproduced in an order of GOP 0, GOP 1, GOP 2, and GOP 3. Also, according to a coding order of the multiview video prediction structure, the images included in GOP 1 may be predicted (reconstructed), and then the images included in GOP 1 may be predicted (reconstructed), according to views. In other words, the images included in each GOP may be predicted (reconstructed) in an order of GOP 0, GOP 1, GOP 2, and GOP 3.

According to the reproduction order 50 of the multiview video prediction structure, inter-view prediction (inter-layer prediction) and inter prediction are performed on images. In the multiview video prediction structure, an image where an arrow starts is a reference image, and an image where an arrow ends is an image predicted by using a reference image.

A prediction result of base view images may be encoded and then output in a form of a base view image stream, and a prediction result of additional view images may be encoded and then output in a form of a layer bitstream. Also, a prediction encoding result of left-view images may be output as a first layer bitstream, and a prediction encoding result of right-view images may be output as a second layer bitstream.

Only inter-prediction is performed on base view images. That is, the base layer anchor pictures 51, 52, 53, 54, and 55 of an I-picture type do not refer to other images, but remaining images of B- and b-picture types are predicted by referring to other base view images. Images of a B-picture type are predicted by referring to an anchor picture of an I-picture type, which precedes the images of a B-picture type according to a POC order, and a following anchor picture of an I-picture type. Images of a b-picture type are predicted by referring to an anchor picture of an I-type, which precedes the image of a b-picture type according a POC order, and a following image of a B-picture type, or by referring to an image of a B-picture type, which precedes the images of a b-picture type according to a POC order, and a following anchor picture of an I-picture type.

Inter-view prediction (inter-layer prediction) that references different view images, and inter prediction that references same view images are performed on each of left-view images and right-view images.

Inter-view prediction (inter-layer prediction) may be performed on the left-view anchor pictures 131, 132, 133, 134, and 135 by respectively referring to the base view anchor pictures 51 through 55 having the same POC order. Inter-view prediction may be performed on the right-view anchor pictures 231, 232, 233, 234, and 235 by respectively referring to the base view anchor pictures 51, 52, 53, 54, and 55 or the left-view anchor pictures 131, 132, 133, 134, and 135 having the same POC order. Also, inter-view prediction (inter-layer prediction) may be performed on remaining images other than the left-view images 131, 132, 133, 134, and 135 and the right-view images 231, 232, 233, 234, and 235 by referring to other view images having the same POC.

Remaining images other than the anchor pictures 131, 132, 133, 134, 135, 231, 232, 233, 234, and 235 from among left-view images and right-view images are predicted by referring to the same view images.

However, each of the left-view images and the right-view images may not be predicted by referring to an anchor picture that has a preceding reproduction order from among additional view images of the same view. In other words, in order to perform inter prediction on a current left-view image, left-view images excluding a left-view anchor picture that precedes the current left-view image in a reproduction order may be referenced. Similarly, in order to perform inter prediction on a current right-view image, right-view images excluding a right-view anchor picture that precedes the current right-view image in a reproduction order may be referenced.

Also, in order to perform inter prediction on a current left-view image, prediction may be performed by referring to a left-view image that belongs to a current GOP but is to be reconstructed before the current left-view image, instead of referring to a left-view image that belongs to a GOP before the current GOP of the current left-view image. The same is applied to a right-view image.

The inter-layer video decoding apparatus 20 according to various embodiments may reconstruct base view images, left-view images, and right-view images according to the reproduction order 50 of the multiview video prediction structure of FIG. 3A.

Left-view images may be reconstructed via inter-view disparity compensation that references base view images and inter motion compensation that references left-view images. Right-view images may be reconstructed via inter-view disparity compensation that references base view images and left-view images, and inter motion compensation that references right-view images. Reference images may be reconstructed first for disparity compensation and motion compensation of left-view images and right-view images.

For inter motion compensation of a left-view image, left-view images may be reconstructed via inter motion compensation that references a reconstructed left-view reference image. For inter motion compensation of a right-view image, right-view images may be reconstructed via inter motion compensation that references a reconstructed right-view reference image.

Also, for inter motion compensation of a current left-view image, only a left-view image that belongs to a current GOP of the current left-view image but is to be reconstructed before the current left-view image may be referenced, and a left-view image that belongs to a GOP before the current GOP is not referenced. The same is applied to a right-view image.

Figure 3B:
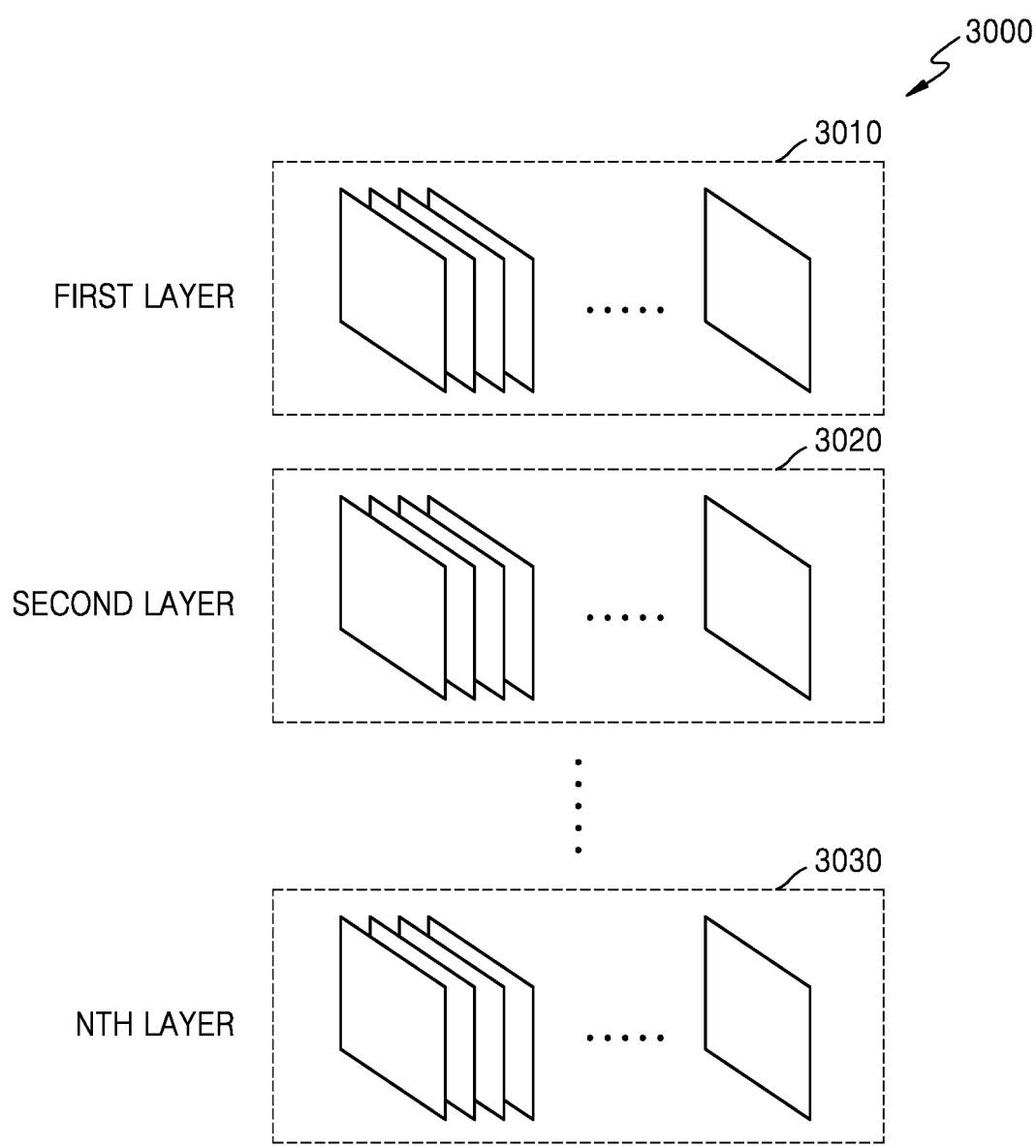
FIG. 3B is a diagram of a multilayer video, according to various embodiments.

FIG. 3B is a diagram of a multilayer video, according to various embodiments.

In order to provide an optimum service in various network environments and various terminals, the inter-layer video encoding apparatus 10 may output a scalable bitstream by encoding multilayer image sequences having various spatial resolutions, various qualities, various frame rates, and different viewpoints. That is, the inter-layer video encoding apparatus 10 may generate and output a scalable video bitstream by encoding an input image according to various scalability types. Scalability includes temporal, spatial, quality, and multiview scalabilities, and a combination thereof. Such scalabilities may be classified according to types. Also, the scalabilities may be classified as a dimension identifier in each type.

For example, the scalability has the same scalability type as the temporal, spatial, quality, and multiview scalability. Also, the scalability may be classified into scalability dimension identifier according to types. For example, when the scalabilities are different, the scalabilities may have different dimension identifiers. For example, a high scalability dimension may be assigned to a high-dimensional scalability with respect to the scalability type.

When a bitstream is dividable into valid sub-streams, the bitstream is scalable. A spatial scalable bitstream includes sub-streams of various resolutions. In order to distinguish different scalabilities in the same scalability type, a scalability dimension is used. The scalability dimension may be expressed by a scalability dimension identifier.

For example, the spatial scalable bitstream may be divided into sub-streams having different resolutions, such as a quarter video graphics array (QVGA), a video graphics array (VGA), a wide video graphics array (WVGA). For example, layers having different resolutions may be distinguished by using a dimension identifier. For example, the QVGA sub-stream may have 0 as a spatial scalability dimension identifier value, the VGA sub-stream may have 1 as a spatial scalability dimension identifier value, and the WVGA sub-stream may have 2 as a spatial scalability dimension identifier value.

A temporal scalable bitstream includes sub-streams having various frame rates. For example, the temporal scalable bitstream may be divided into sub-streams having a frame rate of 7.5 Hz, a frame rate of 15 Hz, a frame rate of 30 Hz, and a frame rate of 60 Hz. A quality scalable bitstream may be divided into sub-streams having different qualities according to a coarse-grained scalability (CGS) method, a medium-grained scalability (MGS) method, and a fine-grained scalability (FGS) method. The temporal scalability may also be distinguished according to different dimensions according to different frame rates, and the quality scalability may also be distinguished according to different dimensions according to different methods.

A multiview scalable bitstream includes sub-streams of different viewpoints in one bitstream. For example, in a stereoscopic image, a bitstream includes a left image and a right image. Also, a scalable bitstream may include sub-streams related to a multiview image and encoded data of a depth map. The viewpoint scalability may also be distinguished according to different dimensions according to different viewpoints.

Different scalable expansion types may be combined with each other. In other words, a scalable video bitstream may include sub-streams in which image sequences of a multi-layer including images, wherein at least one of temporal, spatial, quality, and multiview scalabilities are different from each other, are encoded.

FIG. 3B illustrates image sequences 3010, 3020, and 3030 having different scalable expansion types. The image sequence 3010 of a first layer, the image sequence 3020 of a second layer, and an image sequence 3030 of an n-th layer (n is an integer) may be image sequences in which at least one of resolutions, qualities, and viewpoints are different from each other. Also, one of the image sequence 3010 of the first layer, the image sequence 3020 of the second layer, and the image sequence 3030 of the n-th layer may be an image sequence of a base layer and the other image sequences may be image sequences of an enhancement layer.

For example, the image sequence 3010 of the first layer may include images of a first viewpoint, the image sequence 3020 of the second layer may include images of a second viewpoint, and the image sequence 3030 of the n-th layer may include images of an n-th viewpoint. As another example, the image sequence 3010 of the first layer may be a left-view image of a base layer, the image sequence 3020 of the second layer may be a right-view image of the base layer, and the image sequence 3030 of the n-th layer may be a right-view image of an enhancement layer. However, an embodiment is not limited thereto, and the image sequences 3010, 3020, and 3030 having different scalable expansion types may be image sequences having different image attributes.

FIG. 3C is a diagram of NAL units including encoded data of a multilayer video, according to various embodiments.

As described above, the bitstream generator 18 outputs NAL units including encoded multilayer video data and additional information. A video parameter set (VPS) includes information applied to multilayer image sequences 3120, 3130, and 3140 included in the multilayer video. The NAL unit including information about the VPS is referred to as a VPS NAL unit 3110.

The VPS NAL unit 3110 includes a common syntax element shared by the multilayer image sequences 3120, 3130, and 3140, information about an operation point to stop transmission of unnecessary information, and essential information about an operation point required during session negotiation, such as a profile or a level. In particular, the VPS NAL unit 3110 according to an embodiment includes scalability information related to a scalability identifier for realizing scalability in a multilayer video. The scalability information is information for determining scalability applied to the multilayer image sequences 3120, 3130, and 3140 included in the multilayer video.

The scalability information includes information about a scalability type and a scalability dimension applied to the multilayer image sequences 3120 through 3140 included in the multilayer video. In encoding and decoding methods according to a first embodiment of the present disclosure, the scalability information may be directly obtained from a value of a hierarchical identifier included in a NAL unit header. The hierarchical identifier is an identifier for distinguishing a plurality of layers included in a VPS. The VPS may signal the hierarchical identifier of each layer through VPS extension. The layer identifier of each layer of the VPS may be signaled by being included in the VPS NAL unit. For example, the hierarchical identifier of the NAL units belong to a certain layer of the VPS may be included in the VPS NAL unit. For example, the hierarchical identifier of the NAL unit belonging to the VPS may be signaled through the VPS extension. Accordingly, in encoding and decoding methods according to various embodiments, the scalability information about a layer of the NAL units belonging to the VPS may be obtained by using the hierarchical identifier value of the NAL units.

Figure 4A:
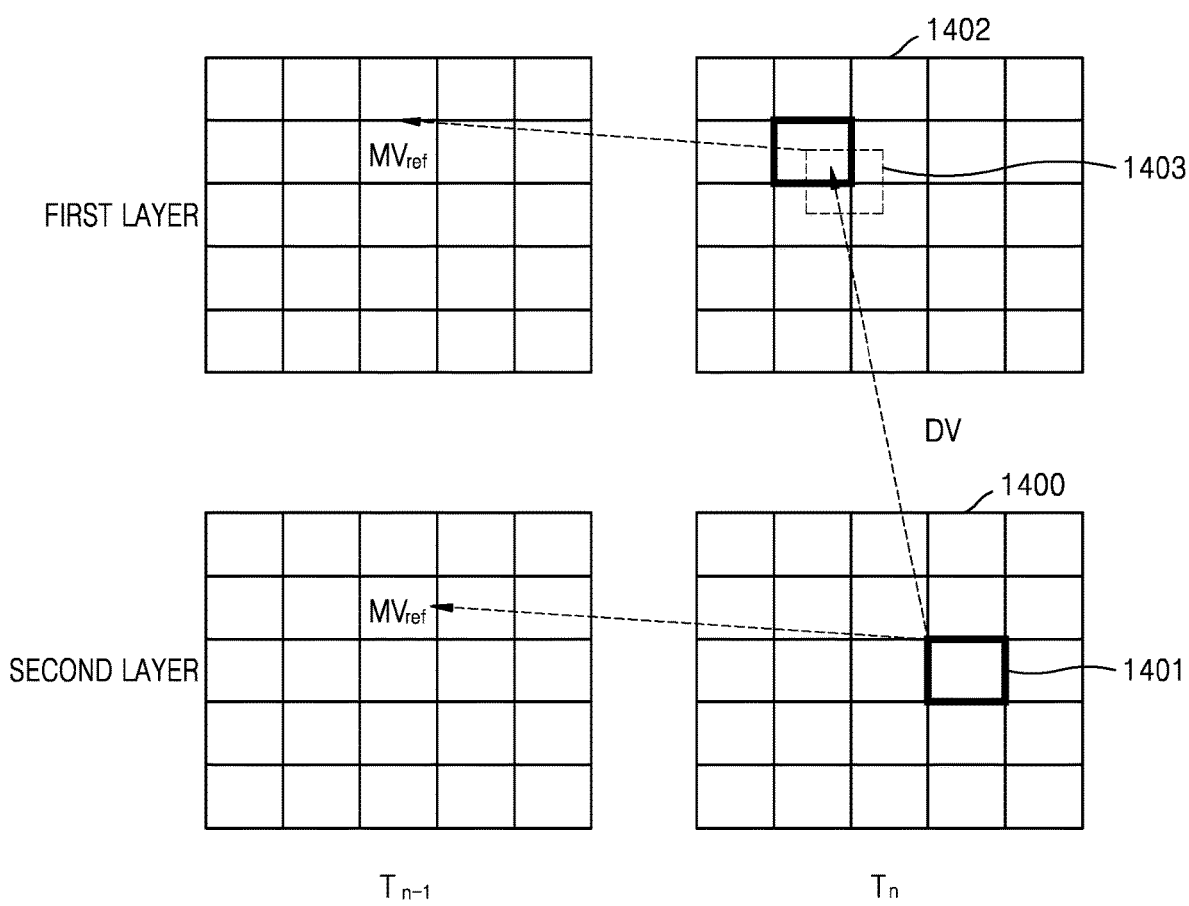
FIG. 4A is a diagram for describing a disparity vector for inter-layer prediction, according to various embodiments.

FIG. 4A is a diagram for describing a disparity vector for inter-layer prediction, according to various embodiments.

Referring to FIG. 4A, the inter-layer video decoding apparatus 20 or 40 according to various embodiments may perform inter-layer prediction to find a first layer reference block 1403 included in a first layer reference image 1402, which corresponds to a current block 1401 included in a second layer current picture 1400, by using a disparity vector DV, and perform disparity compensation by using the first layer reference block 1403.

Also, the inter-layer video decoding apparatus 20 according to various embodiments may, for inter motion compensation, obtain a reference motion vector mv_ref of the first layer reference block 1403 indicated by the disparity vector DV from the second layer current block 1401 and predict a motion vector mv_ cur of the current block 1401 by using the obtained reference motion vector mv_ ref. In this case, the inter-layer video decoding apparatus 20 may perform motion compensation between second layer images by using the predicted motion vector mv_ cur. As described above, in order to perform prediction by referring to different view images, a disparity vector is required. A disparity vector may be transmitted from an encoding apparatus to a decoding apparatus through a bitstream as separate information, or may be predicted based on a depth image or a neighboring block of a current block. That is, a predicted disparity vector may be a neighboring blocks disparity vector (NBDV) and a depth oriented NBDV (DoNBDV).

First, when a disparity vector (a motion vector in an inter-layer direction) is obtained from neighboring block candidates, the NBDV denotes a disparity vector of a current block predicted by using the obtained disparity vector.

In addition, when a depth image corresponding to a different layer image is encoded and decoded, a depth block corresponding to a current block may be determined by using the NBDV. Here, a representative depth value is determined from among depth values included in the determined depth block, and the determined depth value is converted to a disparity vector by using a camera parameter. The DoNBDV denotes a disparity vector predicted by using the disparity vector converted from the depth value.

Figure 4B:
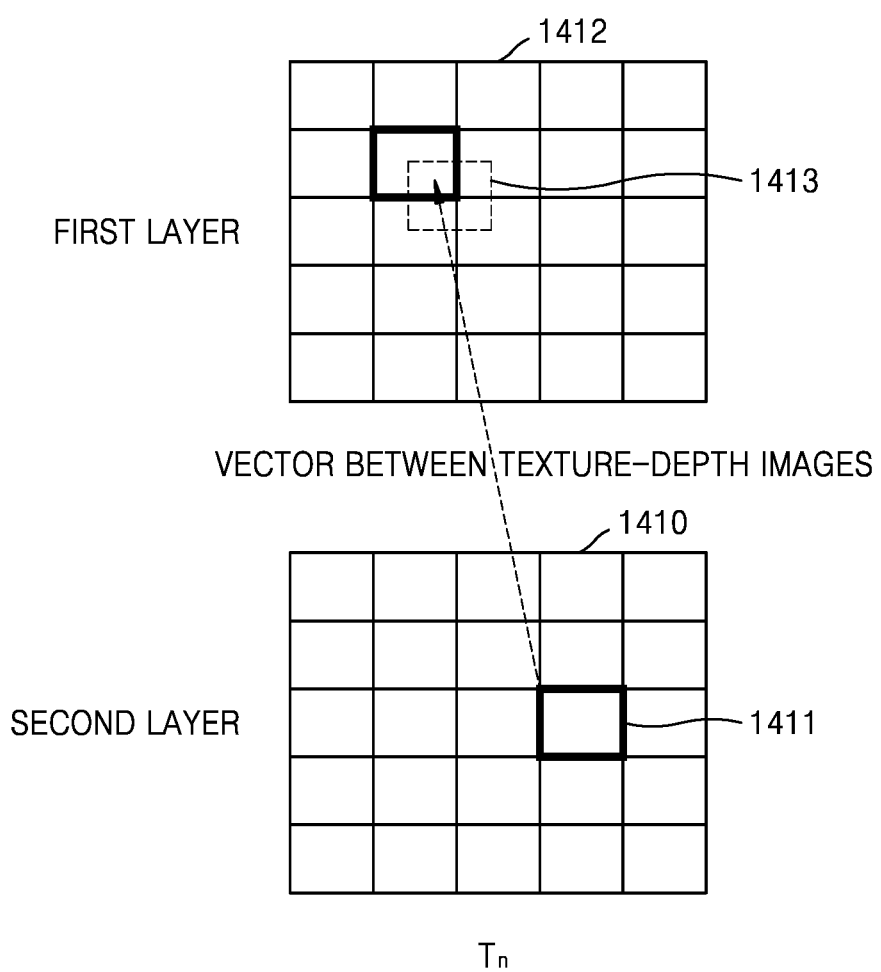
FIG. 4B is a diagram for describing a vector between texture-depth images for motion parameter inheritance, according to various embodiments.

FIG. 4B is a diagram for describing a vector between texture-depth images for motion parameter inheritance, according to various embodiments.

With reference to FIG. 4B, it is assumed that the first layer image is a first view image, and the second layer image is a second view image. However, it is not limited thereto, and the first layer image may be a first-view texture image, and the second layer image may be a first-view depth image.

Referring to FIG. 4B, the inter-layer video decoding apparatus 20 or 40 according to various embodiments determines, by using the vector between the texture-depth images, a corresponding texture block 1413 of a current texture image 1412 which corresponds to a current depth block 1411 included in a current depth image 1410. In this regard, the vector between the texture-depth images may be (0,0). In this case, the inter-layer video decoding apparatus 40 may determine the corresponding texture block 1413 that is co-located with the current depth block 1411.

When an inter-layer decoding mode is a motion parameter inheritance mode, the inter-layer video decoding apparatus 20 or 40 may determine motion information of the depth block 1411 by using motion information of the corresponding texture block 1413. In this regard, the motion information may include one of a motion vector and a disparity vector.

The inter-layer video decoding apparatus 20 or 40 may perform one of motion compensation and disparity compensation on the current depth block 1411, according to a type of the determined motion information.

Figure 4C:
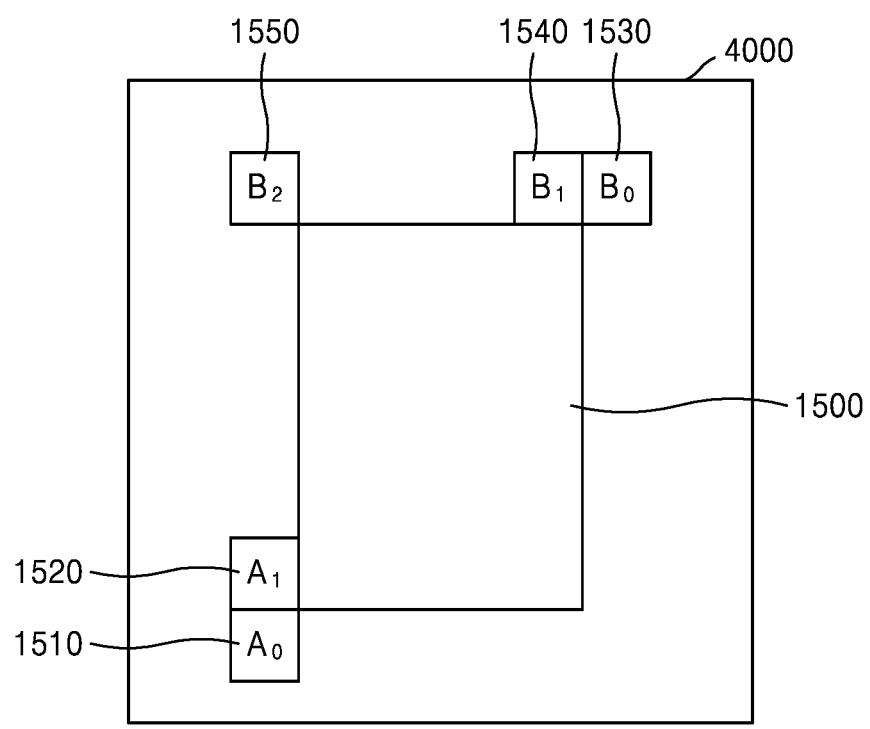
FIG. 4C is a diagram for describing spatial neighboring block candidates for predicting a disparity vector, according to various embodiments.

FIG. 4C is a diagram for describing spatial neighboring block candidates for predicting a disparity vector, according to various embodiments.

Referring to FIG. 4C, the inter-layer video decoding apparatus 20 or 40 according to an embodiment of the present disclosure may search spatial neighboring block candidates in a predetermined searching order (for example, z-scan or raster scan) in order to predict a disparity vector of a current block 1500 in a current picture 4000. Here, found neighboring block candidates may be prediction units temporally or spatially adjacent to the current block 1500.

Alternatively, for example, in the inter-layer video decoding apparatus 20 or 40 according to another embodiment, a neighboring block A0 1510 located at the left bottom of the current block 1500, a neighboring block A1 1520 located at the left of the current block 1500, a neighboring block B0 1530 located at right top of the current block 1500, a neighboring block B1 1540 located at the top of the current block 1500, and a neighboring block B2 1550 located at the left top of the current block 1500 may be spatial neighboring block candidates for obtaining a disparity vector. In order to obtain a disparity vector, neighboring blocks at predetermined locations may be searched in an order of neighboring block candidates A1 1520, B1 1540, B0 1530, A0 1510, and B2 1550.

Figure 4D:
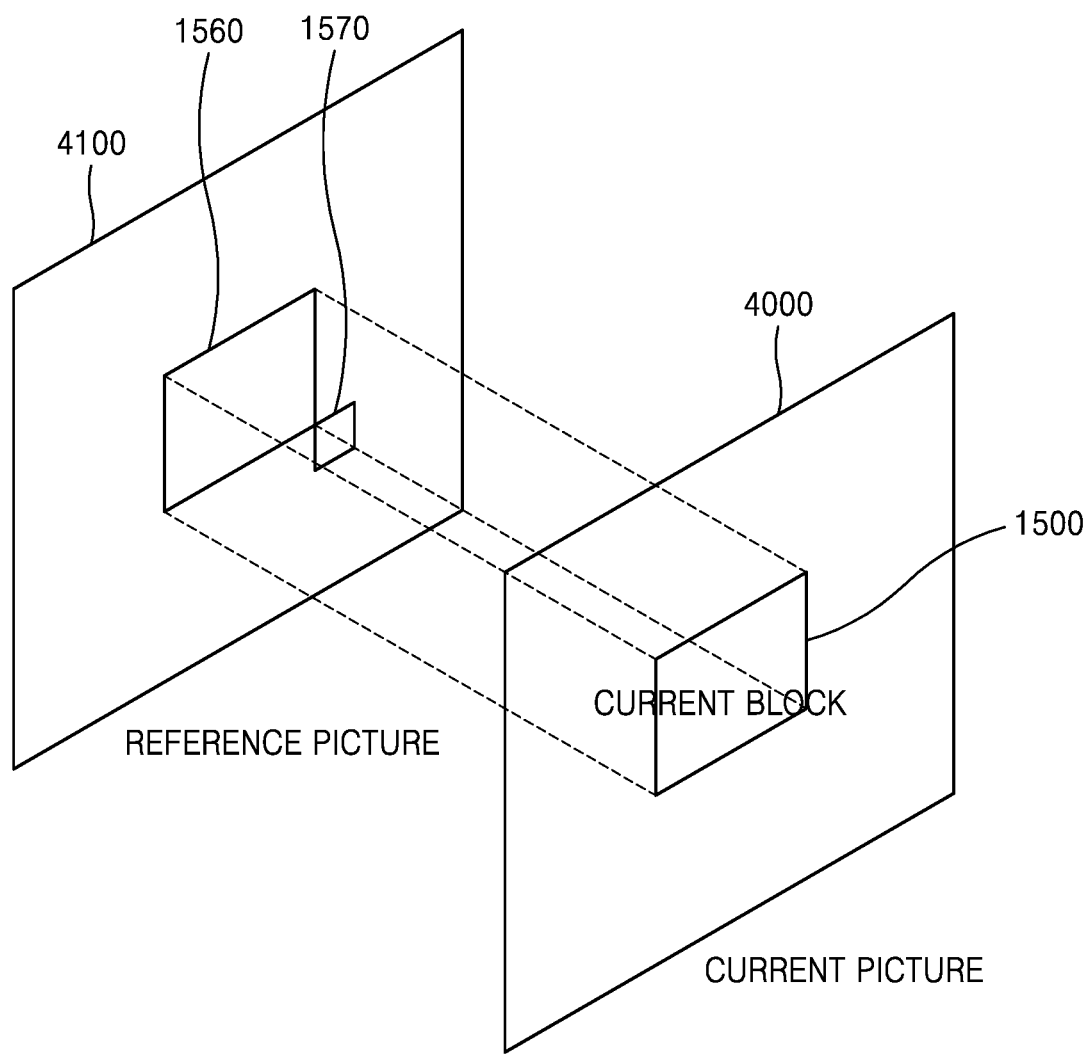
FIG. 4D is a diagram for describing a temporal neighboring block candidate for predicting a disparity vector, according to various embodiments.

FIG. 4D is a diagram for describing a temporal neighboring block candidate for predicting a disparity vector, according to various embodiments.

Referring to FIG. 4D, in order for the inter-layer video decoding apparatus 20 or 40 to perform inter prediction on the current block 1500 included in the current image 4000, at least one of a block Col 1560 that is included in a reference picture 4100 and is co-located with the current block 1500 and an adjacent block of the co-located block 1560 may be included in a temporal neighboring block candidate. For example, a right bottom block BR 1570 of the co-located block Col 1560 may be included in a temporal prediction candidate. Meanwhile, a block used for temporal prediction candidate determination may be a coding unit or a prediction unit.

Figure 5A:
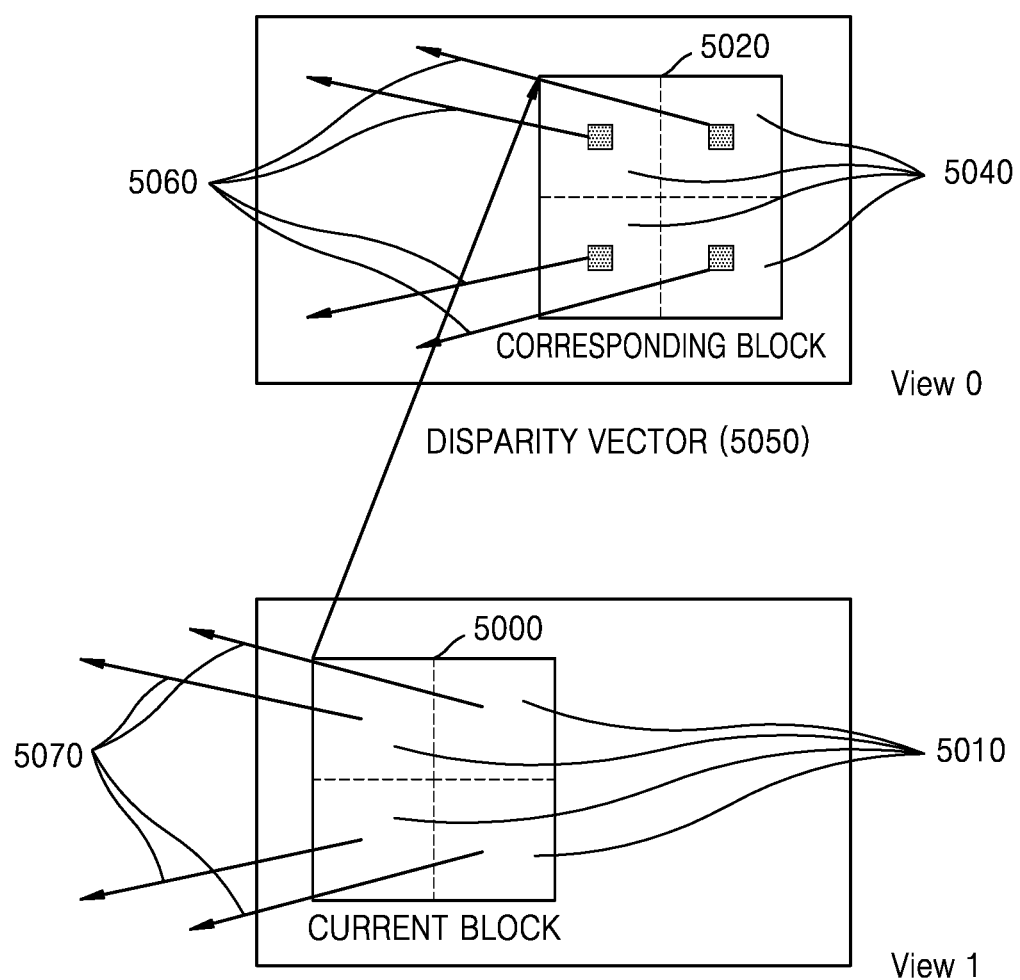
FIG. 5A is a diagram for describing subblock-based inter-view motion prediction, according to various embodiments.

FIG. 5A is a diagram for describing subblock-based inter-view motion prediction, according to various embodiments.

The inter-layer video decoding apparatus 20 or 40 may determine a disparity vector of a current block 5000. Here, the determined disparity vector may be a vector determined by using information about a disparity vector obtained from a bitstream, or a disparity vector derived from a neighboring block. Here, a current block may be a prediction unit.

The inter-layer video decoding apparatus 20 or 40 may determine a candidate block 5020 in and a different viewpoint View 0 from an image of a current viewpoint View 1 by using the determined disparity vector. Here, a size of the candidate block 5020 may be the same as a size of the current block 5000, and a candidate block may be a co-located block with a current block.

Meanwhile, the inter-layer video decoding apparatus 20 or 40 may determine at least one subblock from the current block.

The inter-layer video decoding apparatus 20 or 40 may equally split the current block into subblocks having a predetermined size. For example, when the size of the current block 5000 is 16×16 and a predetermined size of subblocks 5010 is 8×8, the inter-layer video decoding apparatus 20 may split the current block 5000 into four subblocks 5010.

In addition, the inter-layer video decoding apparatus 20 or 40 may determine subblocks 5040 in the block 5020 of the other viewpoint View 0 different from the current viewpoint, which respectively correspond to the four subblocks 5010 in the current block.

Here, the inter-layer video decoding apparatus 20 or 40 may obtain motion vectors 5060 of the subblocks 5040 and may predict a motion vector 5070 of each of the subblocks 5010 by using the obtained motion vectors.

The inter-layer video decoding apparatus 20 or 40 may determine one of blocks included in one picture from among pictures in a reference list in the same viewpoint View 1 as the current viewpoint as a reference block by using the predicted motion vector of each of the subblocks 5010.

The inter-layer video decoding apparatus 20 may perform motion compensation by using the reference block.

Figure 5B:
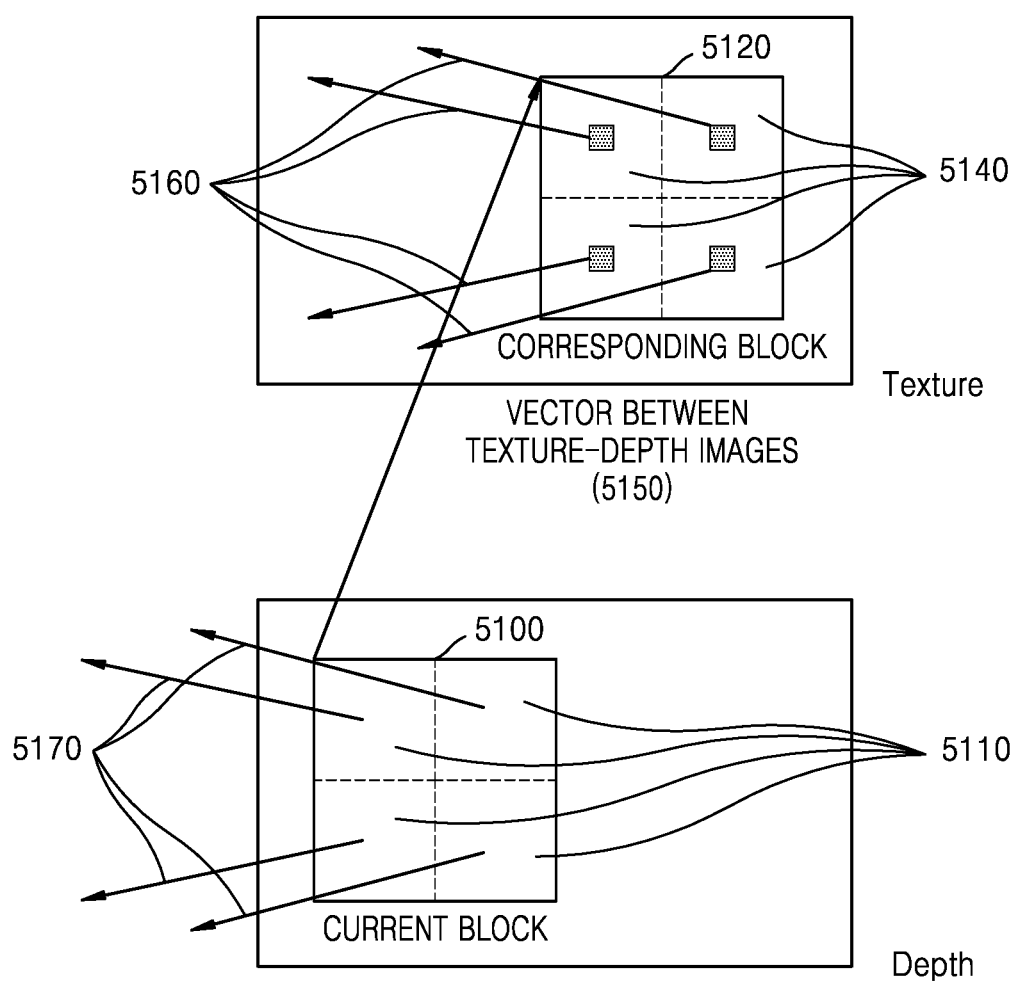
FIG. 5B is a diagram for describing a subblock-based motion parameter inheritance mode, according to various embodiments.

FIG. 5B is a diagram for describing a subblock-based motion parameter inheritance mode, according to various embodiments.

Referring to FIG. 5B, the inter-layer video decoding apparatus 20 or 40 may obtain a vector between texture-depth images 5150. In this regard, the vector between texture-depth images 5150 may be a predetermined vector. For example, the vector between texture-depth images 5150 may be a vector of (0,0).

The inter-layer video decoding apparatus 20 or 40 may determine a candidate block 5120 in a texture image by using the vector between texture-depth images 5150. In this regard, a size of the candidate block 5120 may be equal to a size of a current block 5100, and a candidate block may be a block that is co-located with a current block.

The inter-layer video decoding apparatus 20 or 40 may determine at least one subblock from the current block. The inter-layer video decoding apparatus 20 or 40 may equally split the current block into subblocks each having a predetermined size. For example, when a size of the current block 5100 is 16×16, and a predetermined size of subblocks 5110 is 8×8, the inter-layer video decoding apparatus 20 or 40 may split the current block 5100 into four subblocks 5110.

The inter-layer video decoding apparatus 20 or 40 may determine subblocks 5140 in the texture image which correspond to the four subblocks 5110 in the current block. In this regard, the inter-layer video decoding apparatus 20 or 40 may obtain one 5160 of a motion vector and a disparity vector of subblocks 5140, and may predict one 5170 of a motion vector and a disparity vector of each of the four subblocks 5110.

The inter-layer video decoding apparatus 20 or 40 may determine a reference block in a depth image corresponding to a same view and a different time which corresponds to the current depth block 5100, by using the predicted motion vector of each of the four subblocks 5110, and may perform motion compensation by using the determined reference block.

Alternatively, the inter-layer video decoding apparatus 20 or 40 may determine a reference block in a depth image corresponding to a different view and a same time which corresponds to the current depth block 5100, by using the predicted motion vector of each of the four subblocks 5110, and may perform disparity compensation by using the determined reference block.

Figure 6A:
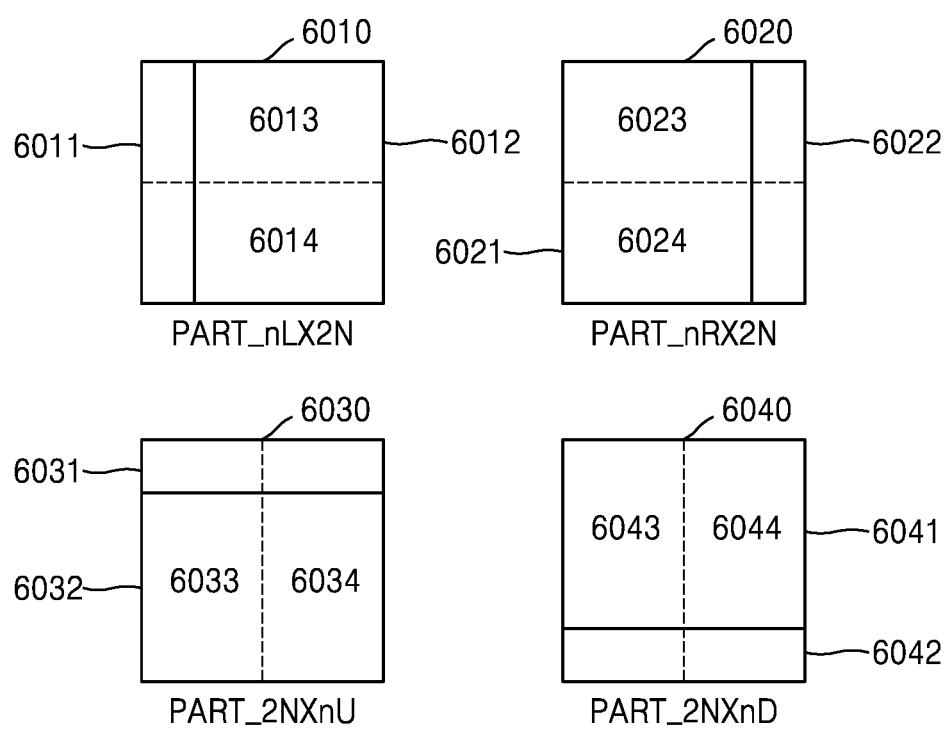
FIGS. 6A through 6C are diagrams for describing processes of determining a size of a subblock, according to various embodiments.
Figure 6B:
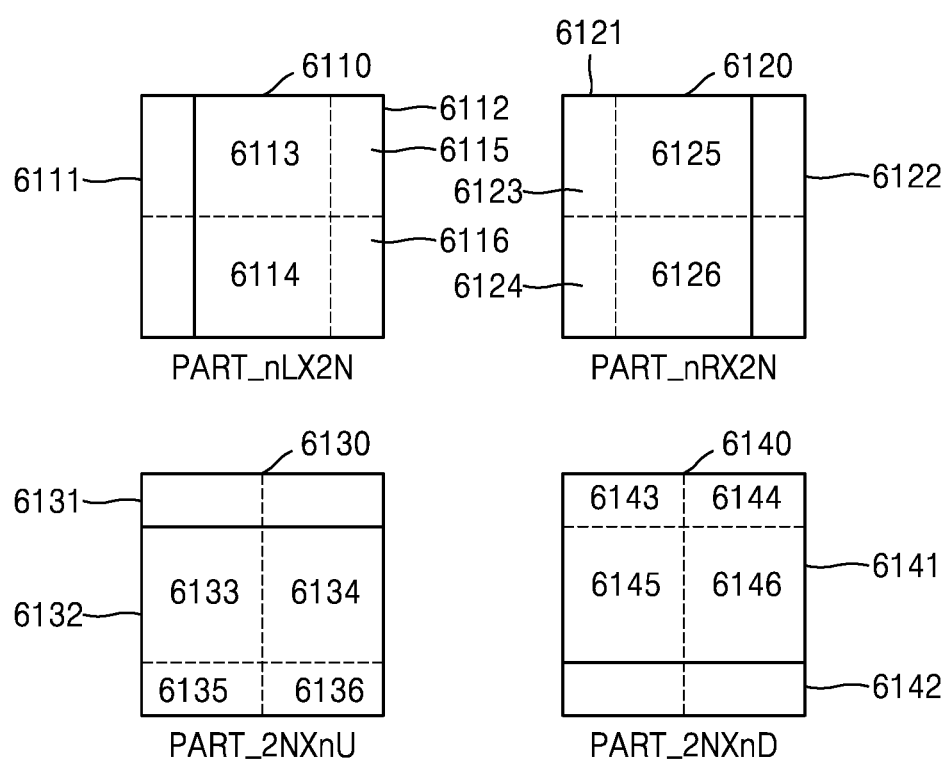
Figure 6C:
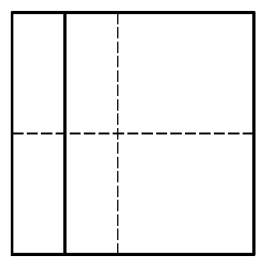
Figure 6C:
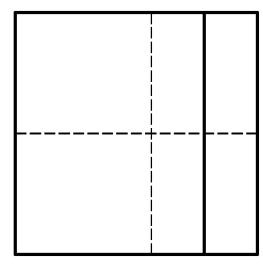
Figure 6C:
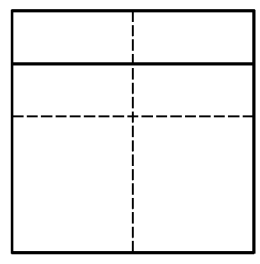
Figure 6C:
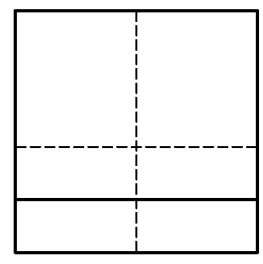

FIGS. 6A through 6C are diagrams for describing processes of determining a size of a subblock, according to various embodiments.

Referring to FIG. 6A, according to a partition type of a coding unit, the inter-layer video decoding apparatus 20 or 40 may split a coding unit 6010 asymmetrically into prediction units 6011 and 6012 (partition type PART_nL×2N), a coding unit 6020 asymmetrically into prediction units 6021 and 6022 (partition type PART_nR×2N), a coding unit 6030 asymmetrically into prediction units 6031 and 6032 (partition type PART_2N×nU), or a coding unit 6040 asymmetrically into prediction units 6041 and 6042 (partition type PART_2N×nD).

Referring to FIG. 6A, the inter-layer video decoding apparatus 20 or 40 may split the prediction units 6011, 6012, 6021, 6022, 6031, 6032, 6041 and 6042 in a direction perpendicular to a split direction while splitting the coding units 6010, 6020, 6030 and 6040 into prediction units, in order to determine at least one subblock from the prediction units 6011, 6012, 6021, 6022, 6031, 6032, 6041 and 6042.

The inter-layer video decoding apparatus 20 or 40 may determine the subblock from the prediction units 6011, 6012, 6021, 6022, 6031, 6032, 6041 and 6042 so as to perform subblock-based inter-layer prediction. When a size of the prediction units 6011,6012, 6021, 6022, 6031, 6032, 6041 and 6042 is not an integer multiple of a certain size pre-determined to be a size of a subblock, the inter-layer video decoding apparatus 40 may not determine a block having the predetermined size as a subblock. In this regard, when a size of the coding units 6010 through 6040 is 16×16, blocks 6013, 6014, 6023, and 6024 may be 12×8 and blocks 6033, 6034, 6043, and 6044 may be 8×12. Meanwhile, subblocks having sizes of 12×8 and 8×12 may not be prediction units generally allowed in a codec.

Accordingly, when a size of a subblock is not an allowable unit (8×8, 8×4, or 4×8), the inter-layer video decoding apparatus 20 or 40 according to an embodiment of the present disclosure may perform prediction on a coding unit by matching the size of the subblock with a size of a prediction unit.

For example, when the prediction unit is 16×12 or 16×4, the inter-layer video decoding apparatus 20 or 40 may determine a size of the subblock to be 16×12 or 16×4.

Referring to FIG. 6B, the inter-layer video decoding apparatus 20 or 40 determines a block having the same size as a predetermined size of a prediction unit as a first subblock, and the inter-layer video decoding apparatus 20 or 40 determines a block in which at least one of a width and a height is less than a predetermined width and a predetermined height as a second subblock.

Accordingly, the inter-layer video decoding apparatus 20 or 40 may split a prediction unit 6112 into first subblocks 6113 and 6114 and second subblocks 6115 and 6116. For example, the inter-layer video decoding apparatus 20 or 40 may split prediction units 6110 and 6120 into the first subblocks 6113 and 6114 having the same size as a predetermined size (8×8). Also, the inter-layer video decoding apparatus 20 or 40 may split the prediction unit 6110 into the second subblocks 6115 and 6116 in which at least one of a width and a height is less than the predetermined width and the height.

Equally, the inter-layer video decoding apparatus 20 or 40 may split remaining prediction units 6121, 6132, and 6141 in the similar manner.

Accordingly, the inter-layer video decoding apparatus 40 may split a prediction unit having a size (12×8 or 8×12) that is not allowed into subblocks having a size of 8×8, 8×4, or 4×8 that is allowed.

Referring to FIG. 6C, as described in detail in relation to FIG. 6B, the inter-layer video decoding apparatus 20 or 40 determines a block having the same size as a predetermined size of a prediction unit into a first subblock, and the inter-layer video decoding apparatus 40 determines a block in which at least one of a width or a height is less than a predetermined width or a predetermined height as a second subblock.

However, unlike to that shown in FIG. 6B, the inter-layer video decoding apparatus 20 or 40 may vary a split boundary to vary and split a location of a first subblock and a location of a second subblock in a prediction unit. In other words, the inter-layer video decoding apparatus 20 or 40 may determine a split boundary via any one of various methods while splitting a prediction unit into subblocks, and thus types of subblocks and the number of subblocks according to types may be the same but locations of the subblocks may vary according to the split boundary.

Figure 7A:
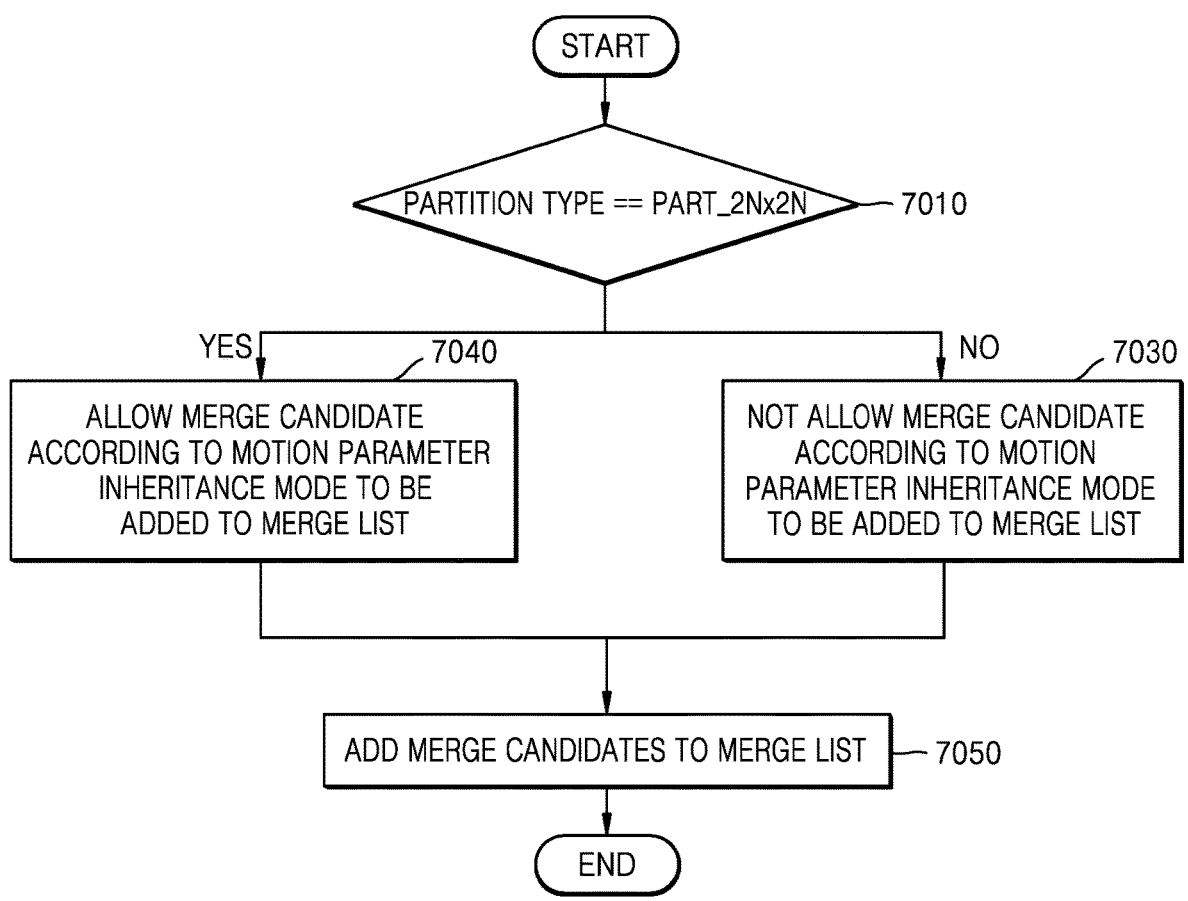
FIG. 7A is a flowchart of an inter-layer video decoding method, according to various embodiments.

FIG. 7A is a flowchart of an inter-layer video decoding method, according to various embodiments.

The inter-layer video decoding apparatus 20 or 40 according to various embodiments may first determine if a partition type of a current block is a particular partition type before the inter-layer video decoding apparatus 20 or 40 determines a merge candidate for inter prediction.

Referring to FIG. 7A, in operation 7010, the inter-layer video decoding apparatus 20 or 40 may determine if the partition type of the current block is PART_2N×2N.

In operation 7030, when the partition type of the current block is not PART_2N×2N, the inter-layer video decoding apparatus 20 or 40 may not allow a merge candidate according to a motion parameter inheritance mode (or an inter-view motion prediction mode) to be added to a merge candidate list. The inter-layer video decoding apparatus 20 or 40 may not the merge candidate according to the motion parameter inheritance mode (or the inter-view motion prediction mode) to be added to the merge candidate list by determining that the merge candidate according to the motion parameter inheritance mode (or the inter-view motion prediction mode) is not available.

In operation 7040, when the partition type of the current block is PART_2N×2N, the inter-layer video decoding apparatus 20 or 40 may allow the merge candidate according to the motion parameter inheritance mode (or the inter-view motion prediction mode) to be added to the merge candidate list.

In operation 7050, the inter-layer video decoding apparatus 20 or 40 may add merge candidates to the merge candidate list according to according to priority. When the inter-layer video decoding apparatus 20 or 40 does not allow the merge candidate according to the motion parameter inheritance mode (or the inter-view motion prediction mode) to be added to the merge candidate list, the inter-layer video decoding apparatus 20 or 40 may not add the merge candidate according to the motion parameter inheritance mode (or the inter-view motion prediction mode) to the merge candidate list but may add other merge candidates to the merge candidate list according to according to priority, except for an inter-layer decoding mode according to the motion parameter inheritance mode (or the inter-view motion prediction mode).

The number of merge candidates that are allowed to be added to the merge candidate list may be determined to be a predetermined number, and when the predetermined number of merge candidates is added to the merge candidate list, no more merge candidates may be added to the merge candidate list.

The motion parameter inheritance mode and the inter-view motion prediction mode are mode for inter-layer prediction and are extended from a single-layer prediction mode. Unlike to the single-layer prediction mode, in the motion parameter inheritance mode and the inter-view motion prediction mode, motion information is obtained from an external memory while increasing complexity, and in this regard, by performing the inter-layer prediction according to the motion parameter inheritance mode and the inter-view motion prediction mode only when the partition type of the current block is the particular partition type, memory complexity may be minimized. In addition, since the inter-layer decoding mode for the inter-layer prediction has high complexity of calculations, the complexity of calculations may be minimized in a manner that the inter-layer prediction according to the motion parameter inheritance mode or the inter-view motion prediction mode is performed according to only the particular partition type.

Figure 7B:
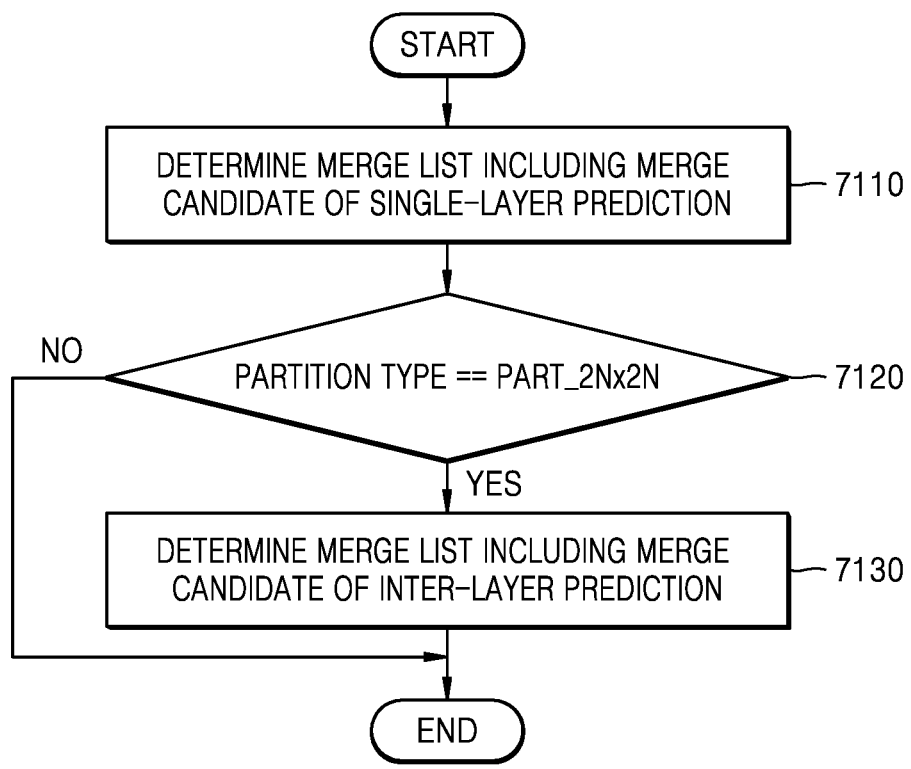
FIG. 7B is a flowchart of an inter-layer video decoding method, according to various embodiments.

FIG. 7B is a flowchart of an inter-layer video decoding method, according to various embodiments.

When the inter-layer video decoding apparatus 20 or 40 according to various embodiments generates a merge candidate list, the inter-layer video decoding apparatus 20 or 40 generates the merge candidate list by first adding a merge candidate according to a single-layer prediction mode and additionally adding a merge candidate according to an inter-layer decoding mode to the merge candidate list. The merge candidate according to the inter-layer decoding mode may include an inter-view motion predicted merge candidate, a disparity predicted merge candidate, a view synthesis predicted merge candidate, a shift inter-view motion predicted merge candidate, a shift disparity predicted merge candidate, a motion inheritance merge candidate, a depth derived disparity merge candidate, or the like.

Referring to FIG. 7B, in operation 7110, the inter-layer video decoding apparatus 20 or 40 according to various embodiments first adds a merge candidate of a single-layer prediction mode to a merge candidate list.

In operation 7120, the inter-layer video decoding apparatus 20 or 40 may determine if a partition type of a current block is a particular partition type. For example, the inter-layer video decoding apparatus 20 or 40 may determine if the partition type of the current block is PART_2N×2N.

In operation 7130, when the partition type of the current block is PART_2N×2N, the inter-layer video decoding apparatus 20 or 40 may additionally add a merge candidate according to an inter-layer decoding mode to the merge candidate list. Therefore, when the partition type of the current block is PART_2N×2N, the inter-layer video decoding apparatus 20 or 40 may include not only the merge candidate according to the single-layer prediction mode but may also include the merge candidate according to the inter-layer decoding mode.

In addition, the inter-layer video decoding apparatus 20 or 40 according to various embodiments may differ in merge candidates included in the merge candidate list according to whether a current image including the current block is a texture image or a depth image.

For example, when the current image is the texture image, the merge candidate according to the single-layer prediction mode is added to the merge candidate list, and then the partition type of the current block is the particular partition type, the inter-layer video decoding apparatus 20 or 40 may add the merge candidate according to the inter-layer decoding mode to the merge candidate list.

However, when the current image is the depth image and the merge candidate according to the single-layer prediction mode is added to the merge candidate list, the inter-layer video decoding apparatus 20 or 40 may add the merge candidate according to the inter-layer decoding mode to the merge candidate list, regardless of the partition type of the current block.

The inter-layer video decoding apparatus 20 or 40 is not limited to differing in the merge candidates included in the merge candidate list according to the partition type of the current block, and the inter-layer video decoding apparatus 20 or 40 may differ in the merge candidates included in the merge candidate list when the current block has a particular size.

For example, after the merge candidate according to the single-layer prediction mode is added to the merge candidate list, when a size of the current block is not one of 8×4 and 4×8, the inter-layer video decoding apparatus 20 or 40 adds a merge candidate according to inter-layer prediction to the merge candidate list. After the merge candidate according to the single-layer prediction mode is added to the merge candidate list, when the size of the current block is one of 8×4 and 4×8, the inter-layer video decoding apparatus 20 or 40 does not add the merge candidate according to the inter-layer prediction to the merge candidate list. In this case, the inter-layer video decoding apparatus 20 or 40 may perform the inter-layer prediction on the current block by using the merge candidate list including the merge candidate according to the single-layer prediction mode.

A mode that involves performing inter-layer prediction according to each of subblocks may include a view synthesis prediction mode. In the view synthesis prediction mode, a size of a subblock used in the inter-layer prediction may be 8×4 or 4×8.

According to the aforementioned descriptions, when the partition type of the current block is the particular partition type in one mode of the motion parameter inheritance mode and the inter-view motion prediction mode, the inter-layer video decoding apparatus 20 or 40 may allow inter-layer prediction according to a corresponding mode, and is not limited thereto, thus, even in the view synthesis prediction mode, when a partition type (e.g., 2N×2N) of the current block is equal to the particular partition type that allows the inter-layer prediction in the motion parameter inheritance mode and the inter-view motion prediction mode, the inter-layer video decoding apparatus 20 or 40 may allow inter-layer prediction according to the view synthesis prediction mode.

Figure 7C:
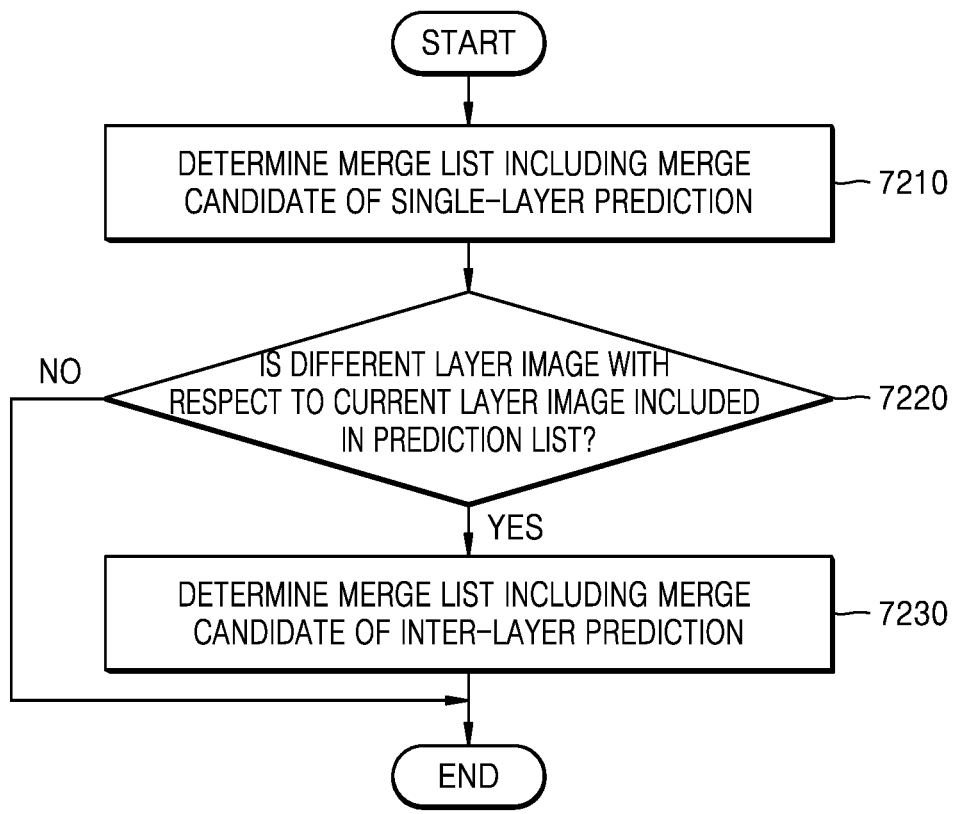
FIG. 7C is a flowchart of an inter-layer video decoding method, according to various embodiments.

FIG. 7C is a flowchart of an inter-layer video decoding method, according to various embodiments.

In order to perform inter-layer prediction, a different layer image with respect to a current layer image has to be included in a prediction list. when the different layer image with respect to the current layer image is not included in the prediction list (e.g., an L0 prediction list, an L1 prediction list), a merge candidate according to an inter-layer decoding mode should not be added to a merge candidate list.

The inter-layer video decoding apparatus 20 or 40 has a problem in which whether a different layer image with respect to a current image is included in the prediction list is determined according to each merge candidate according to the inter-layer decoding mode.

According to whether the different layer image with respect to the current image is included in the prediction list, the inter-layer video decoding apparatus 20 or 40 according to various embodiments may add the merge candidate according to the inter-layer decoding mode to the merge candidate list.

Referring to FIG. 7C, in operation 7210, the inter-layer video decoding apparatus 20 or 40 determines a merge candidate list including a merge candidate of single-layer prediction.

In operation 7220, the inter-layer video decoding apparatus 20 or 40 determines if the different layer image with respect to the current layer image is included in the prediction list. When the different layer image is not included in the prediction list, the inter-layer video decoding apparatus 20 or 40 may not add a merge candidate according to inter-layer prediction to the merge candidate list, and may allow the merge candidate list to include only the merge candidate according to the single-layer prediction.

In operation 7230, when the different layer image is included in the prediction list, the inter-layer video decoding apparatus 20 or 40 may add the merge candidate according to the inter-layer prediction to the merge candidate list.

The inter-layer video decoding apparatus 20 or 40 may skip an operation of determining when the different layer image is included in the prediction list for each of the merge candidates according to inter-layer prediction, and may perform only an operation of adding the merge candidate according to the single-layer prediction to the merge candidate list, so that complexity of implementing hardware may be reduced.

As described above, the inter-layer video encoding apparatuses 10 and 30 according to various embodiments and the inter-layer video decoding apparatuses 20 and 40 according to various embodiments may spilt blocks of video data into coding units having a tree structure, and coding units, prediction units, and transformation units may be used for inter-layer prediction or inter prediction of coding units. Hereinafter, with reference to FIGS. 8 through 20, a video encoding method, a video encoding apparatus, a video decoding method, and a video decoding apparatus based on coding units having a tree structure and transformation units, according to various embodiments, will be described.

In principle, during encoding and decoding processes for a multilayer video, encoding and decoding processes for first layer images and encoding and decoding processes for second layer images are separately performed. That is, when inter-layer prediction is performed on a multilayer video, encoding and decoding results of single-layer videos may be mutually referred to, but separate encoding and decoding processes are performed according to single-layer videos.

Accordingly, since video encoding and decoding processes based on coding units having a tree structure as described below with reference to FIGS. 8 through 20 for convenience of description are video encoding and decoding processes for processing a single-layer video, only inter prediction and motion compensation are performed. However, as described above with reference to FIGS. 1A through 7C, in order to encode and decode a video stream, inter-layer prediction and compensation are performed on base layer images and second layer images.

Figure 8:
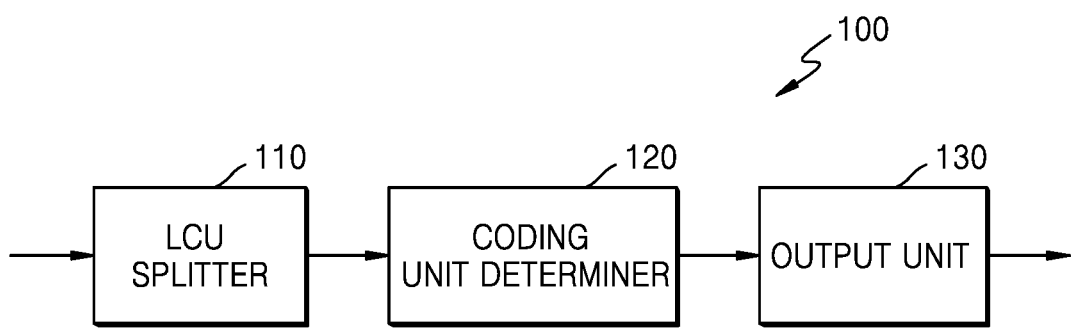
FIG. 8 is a block diagram of a video encoding apparatus based on coding units according to a tree structure, according to an embodiment.

Accordingly, in order for the encoder 12 or 32 of the inter-layer video encoding apparatus 10 or 30 according to various embodiments to encode a multilayer video based on coding units having a tree structure, the inter-layer video encoding apparatus 10 or 30 may include as many video encoding apparatuses 100 of FIG. 8 as the number of layers of the multilayer video so as to perform video encoding according to each single-layer video, thereby controlling each video encoding apparatus 100 to encode an assigned single-layer video. Also, the inter-layer video encoding apparatus 10 or 30 may perform inter-view prediction by using encoding results of individual single viewpoints of each video encoding apparatus 100. Accordingly, the encoder 12 or 32 of the inter-layer video encoding apparatus 10 or 30 may generate a base view video stream and a second layer video stream, which include encoding results according to layers.

Figure 9:
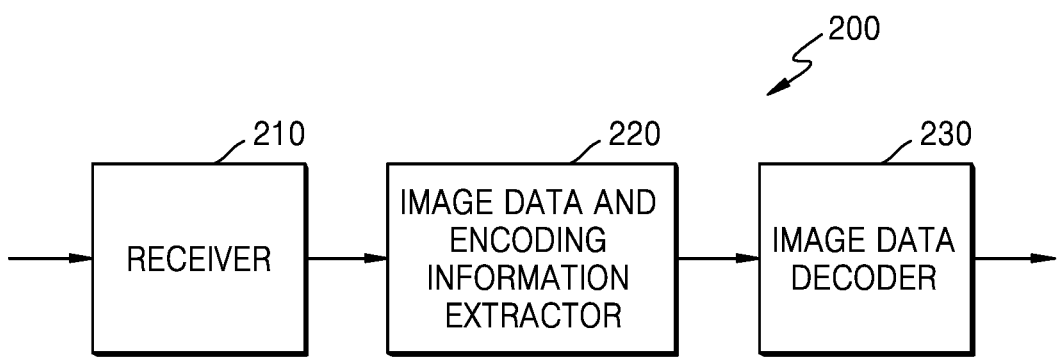
FIG. 9 is a block diagram of a video decoding apparatus based on coding units according to a tree structure, according to an embodiment.

Similarly, in order for the decoder 24 or 44 of the inter-layer video decoding apparatus 20 or 40 according to various embodiments to decode a multilayer video based on coding units having a tree structure, the inter-layer video decoding apparatus 20 or 40 may include as many video decoding apparatuses 200 of FIG. 9 as the number of layers of the multilayer video so as to perform video decoding according to layers with respect to a received first layer video stream and a received second layer video stream, thereby controlling each video decoding apparatus 200 to decode an assigned single-layer video. Also, the inter-layer video decoding apparatus 20 or 40 may perform inter-layer compensation by using a decoding result of an individual single layer of each video decoding apparatus 200. Accordingly, the decoder 24 or 44 of the inter-layer video decoding apparatus 20 or 40 may generate first layer images and second layer images, which are reconstructed according to layers.

FIG. 8 is a block diagram of the video encoding apparatus based on coding units according to a tree structure 100, according to an embodiment of the present disclosure.

The video encoding apparatus involving video prediction based on coding units according to a tree structure 100 according to an embodiment includes a largest coding unit splitter 110, a coding unit determiner 120, and an output unit 130. Hereinafter, for convenience of description, the video encoding apparatus involving video prediction based on coding units according to a tree structure 100 will be abbreviated to the 'video encoding apparatus 100'.

The coding unit determiner 120 may split a current picture based on a largest coding unit that is a coding unit having a maximum size for the current picture of an image. If the current picture is larger than the largest coding unit, image data of the current picture may be split into the at least one largest coding unit. The largest coding unit according to various embodiments may be a data unit having a size of 32×32, 64×64, 128×128, 256×256, etc., wherein a shape of the data unit is a square having a width and length in squares of 2.

A coding unit according to various embodiments may be characterized by a maximum size and a depth. The depth denotes the number of times the coding unit is spatially split from the largest coding unit, and as the depth deepens, deeper coding units according to depths may be split from the largest coding unit to a minimum coding unit. A depth of the largest coding unit is an uppermost depth and a depth of the minimum coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to various embodiments is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. In other words, the coding unit determiner 120 determines a final depth by encoding the image data in the deeper coding units according to depths, according to the largest coding unit of the current picture, and selecting a depth having the least encoding error. The determined final depth and the encoded image data according to the determined coded depth are output to the output unit 130.

The image data in the largest coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 120 according to various embodiments may determine coding units having a tree structure included in the largest coding unit. The 'coding units having a tree structure' according to various embodiments include coding units corresponding to a depth determined to be the final depth, from among all deeper coding units included in the largest coding unit. A coding unit of a final depth may be hierarchically determined according to depths in the same region of the largest coding unit, and may be independently determined in different regions. Similarly, a final depth in a current region may be independently determined from a final depth in another region.

A maximum depth according to various embodiments is an index related to the number of splitting times from a largest coding unit to a minimum coding unit. A first maximum depth according to various embodiments may denote the total number of splitting times from the largest coding unit to the minimum coding unit. A second maximum depth according to various embodiments may denote the total number of depth levels from the largest coding unit to the minimum coding unit. For example, when a depth of the largest coding unit is 0, a depth of a coding unit, in which the largest coding unit is split once, may be set to 1, and a depth of a coding unit, in which the largest coding unit is split twice, may be set to 2. In this case, if the minimum coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a largest coding unit.

The video encoding apparatus 100 according to various embodiments may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a final depth according to various embodiments, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode according to various embodiments may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 according to various embodiments may also perform the transformation on the image data in a coding unit based not only on the coding unit for encoding the image data, but also based on a data unit that is different from the coding unit. In order to perform the transformation in the coding unit, the transformation may be performed based on a transformation unit having a size less than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to various embodiments. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to various embodiments. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Split information according to depths requires not only information about a depth, but also about information related to prediction encoding and transformation. Accordingly, the coding unit determiner 120 not only determines a depth having a least encoding error, but also determines a partition mode of splitting a prediction unit into a partition, a prediction mode according to prediction units, and a size of a transformation unit for transformation.

Coding units according to a tree structure in a largest coding unit and methods of determining a prediction unit/partition, and a transformation unit, according to various embodiments, will be described in detail below with reference to FIGS. 9 through 19.

The coding unit determiner 120 may measure an encoding error of deeper coding units according to depths by using Rate-Distortion Optimization based on Lagrangian multipliers.

The output unit 130 outputs the image data of the largest coding unit, which is encoded based on the at least one depth determined by the coding unit determiner 120, and split information according to the depth, in bitstreams.

The encoded image data may be obtained by encoding residual data of an image.

The split information according to depth may include information about the depth, about the partition mode in the prediction unit, about the prediction mode, and about split of the transformation unit.

The information about the final depth may be defined by using split information according to depths, which indicates whether encoding is performed on coding units of a lower depth instead of a current depth. If the current depth of the current coding unit is a depth, the current coding unit is encoded, and thus the split information may be defined not to split the current coding unit to a lower depth. On the other hand, if the current depth of the current coding unit is not the depth, the encoding is performed on the coding unit of the lower depth, and thus the split information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and split information is determined for a coding unit of a depth, at least one piece of split information may be determined for one largest coding unit. Also, a depth of the image data of the largest coding unit may be different according to locations since the image data is hierarchically split according to depths, and thus a depth and split information may be set for the image data.

Accordingly, the output unit 130 according to various embodiments may assign a corresponding depth and encoding information about an encoding mode to at least one of the coding unit, the prediction unit, and a minimum unit included in the largest coding unit.

The minimum unit according to various embodiments is a square data unit obtained by splitting the minimum coding unit constituting the lowermost depth by 4. Alternatively, the minimum unit according to various embodiments may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information related to prediction, prediction information, and slice type information.

In the video encoding apparatus 100 according to the simplest embodiment, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to various embodiments, image compression efficiency may be increased since a coding unit is adjusted while considering characteristics of an image while increasing a maximum size of a coding unit while considering a size of the image.

The inter-layer video encoding apparatus 10 described above with reference to FIG. 1A may include as many video encoding apparatuses 100 as the number of layers, in order to encode single-layer images according to layers of a multilayer video. For example, the first layer encoder 14 may include one video encoding apparatus 100 and the second layer encoder 16 may include as many video encoding apparatuses 100 as the number of second layers.

When the video encoding apparatus 100 encodes first layer images, the coding unit determiner 120 may determine, for each largest coding unit, a prediction unit for inter-prediction according to coding units having a tree structure, and perform inter-prediction according to prediction units.

Even when the video encoding apparatus 100 encodes second layer images, the coding unit determiner 120 may determine, for each largest coding unit, coding units and prediction units having a tree structure, and perform inter-prediction according to prediction units.

The video encoding apparatus 100 may encode a luminance difference to compensate for a luminance difference between a first layer image and a second layer image. However, whether to perform luminance may be determined according to an encoding mode of a coding unit. For example, luminance compensation may be performed only on a prediction unit having a size of 2N×2N.

FIG. 9 is a block diagram of the video decoding apparatus based on coding units according to a tree structure 200, according to various embodiments.

The video decoding apparatus that involves video prediction based on coding units having a tree structure 200 according to an embodiment includes a receiver 210, an image data and encoding information extractor 220, and an image data decoder 230. For convenience of description, the video decoding apparatus that involves video prediction based on coding units having a tree structure 200 according to an embodiment will be abbreviated to the 'video decoding apparatus 200'.

Definitions of various terms, such as a coding unit, a depth, a prediction unit, a transformation unit, and various split information, for decoding operations of the video decoding apparatus 200 according to various embodiments are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a final depth and split information for the coding units having a tree structure according to each largest coding unit, from the parsed bitstream. The extracted final depth and split information are output to the image data decoder 230. That is, the image data in a bit stream is split into the largest coding unit so that the image data decoder 230 decodes the image data for each largest coding unit.

A depth and split information according to the largest coding unit may be set for at least one piece of depth information, and split information may include information about a partition mode of a corresponding coding unit, about a prediction mode, and about split of a transformation unit. Also, split information according to depths may be extracted as the information about a depth.

The depth and the split information according to each largest coding unit extracted by the image data and encoding information extractor 220 is a depth and split information determined to generate a minimum encoding error when an encoder, such as the video encoding apparatus 100 according to various embodiments, repeatedly performs encoding for each deeper coding unit according to depths according to each largest coding unit. Accordingly, the video decoding apparatus 200 may reconstruct an image by decoding the image data according to a coded depth and an encoding mode that generates the minimum encoding error.

Since encoding information according to various embodiments about a depth and an encoding mode may be assigned to a predetermined data unit from among a corresponding coding unit, a prediction unit, and a minimum unit, the image data and encoding information extractor 220 may extract the depth and the split information according to the predetermined data units. If the depth and the split information of a corresponding largest coding unit is recorded according to predetermined data units, the predetermined data units to which the same depth and the same split information is assigned may be inferred to be the data units included in the same largest coding unit.

The image data decoder 230 may reconstruct the current picture by decoding the image data in each largest coding unit based on the depth and the split information according to the largest coding units. That is, the image data decoder 230 may decode the encoded image data based on the extracted information about the partition mode, the prediction mode, and the transformation unit for each coding unit from among the coding units having the tree structure included in each largest coding unit. A decoding process may include a prediction including intra prediction and motion compensation, and an inverse transformation.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each largest coding unit. Via the inverse transformation, a pixel value of a spatial region of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode encoded data in the current largest coding unit by using the information about the partition mode of the prediction unit, the prediction mode, and the size of the transformation unit.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The inter-layer video decoding apparatus 20 described above with reference to FIG. 2A may include the number of video decoding apparatuses 200 as much as the number of viewpoints, so as to reconstruct first layer images and second layer images by decoding a received first layer image stream and a received second layer image stream.

When the first layer image stream is received, the image data decoder 230 of the video decoding apparatus 200 may split samples of first layer images extracted from the first layer image stream by the image data and encoding information extractor 220 into coding units having a tree structure. The image data decoder 230 may reconstruct the first layer images by performing motion compensation according to prediction units for inter prediction, on the coding units having the tree structure obtained by splitting the samples of the first layer images.

When the second layer image stream is received, the image data decoder 230 of the video decoding apparatus 200 may split samples of second layer images extracted from the second layer image stream by the image data and encoding information extractor 220 into coding units having a tree structure. The image data decoder 230 may reconstruct the second layer images by performing motion compensation according to prediction units for inter prediction, on the coding units obtained by splitting the samples of the second layer images.

The extractor 220 may obtain information related to a luminance error from a bitstream so as to compensate for a luminance difference between a first layer image and a second layer image. However, whether to perform luminance may be determined according to an encoding mode of a coding unit. For example, luminance compensation may be performed only on a prediction unit having a size of 2N×2N.

Thus, the video decoding apparatus 200 may obtain information about at least one coding unit that generates the minimum encoding error when encoding is recursively performed for each largest coding unit, and may use the information to decode the current picture. In other words, the coding units having the tree structure determined to be the optimum coding units in each largest coding unit may be decoded.

Accordingly, even if image data has high resolution and a large amount of data, the image data may be efficiently decoded and reconstructed by using a size of a coding unit and an encoding mode, which are adaptively determined according to characteristics of the image data, by using optimum split information received from an encoder.

Figure 10:
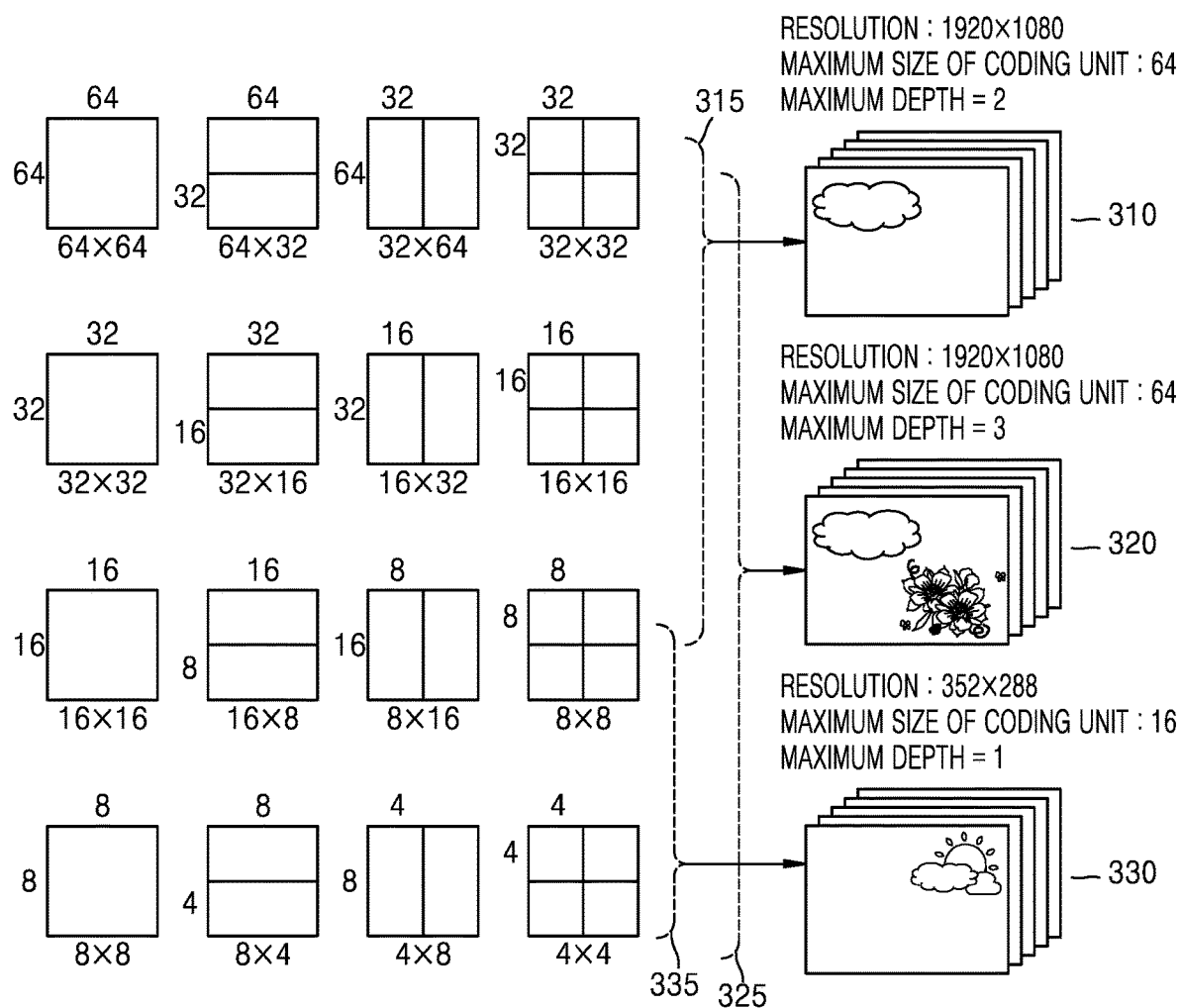
FIG. 10 is a diagram for describing a concept of coding units, according to various embodiments of the present disclosure.

FIG. 10 is a diagram for describing a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a largest coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. Since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 11:
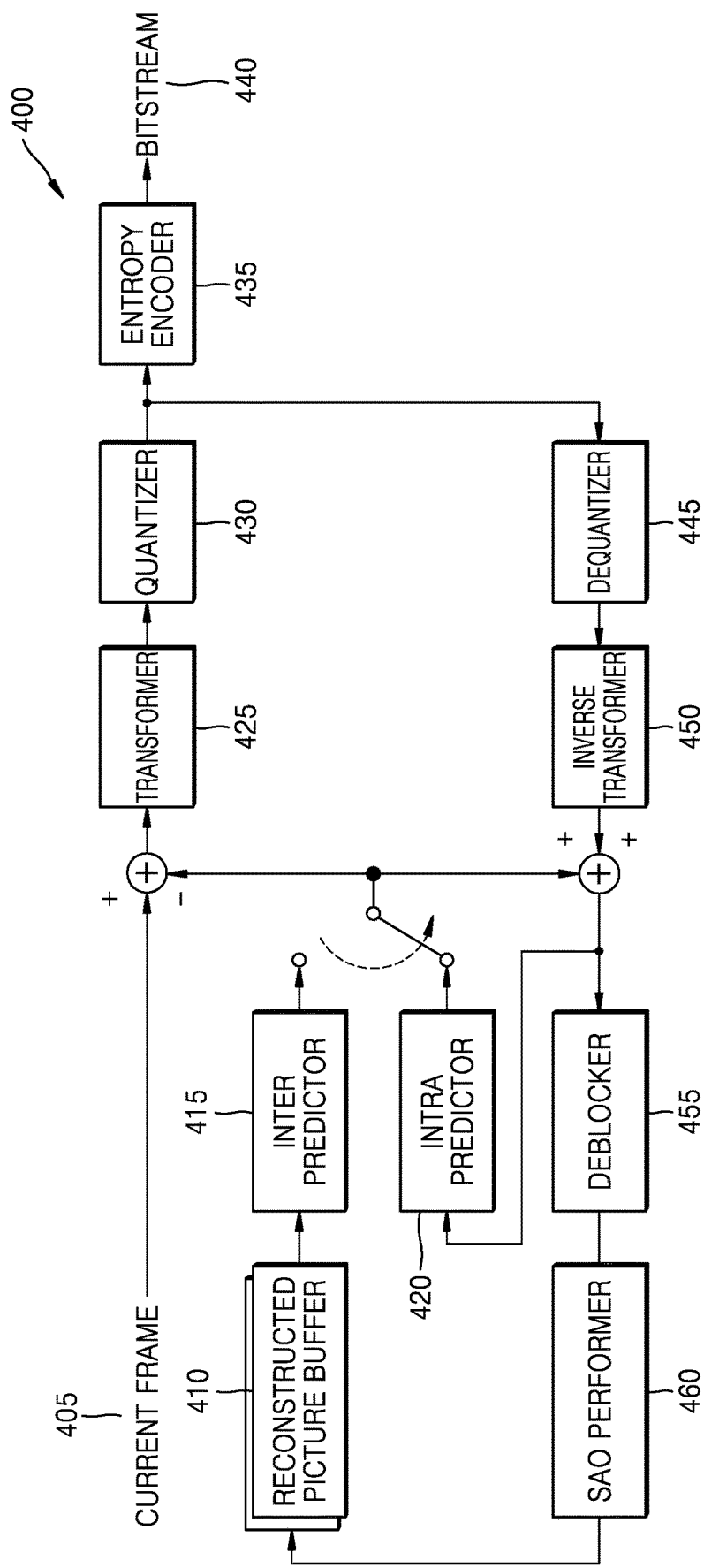
FIG. 11 is a block diagram of an image encoder based on coding units, according to various embodiments of the present disclosure.

FIG. 11 is a block diagram of an image encoder 400 based on coding units, according to various embodiments.

The image encoder 400 according to various embodiments performs operations of the coding unit determiner 120 of the video encoding apparatus 100 to encode image data. In other words, an intra predictor 420 performs intra prediction on coding units in an intra mode, from among a current frame 405, per prediction unit, and an inter predictor 415 performs inter prediction on coding units in an inter mode by using the current image 405 and a reference image obtained by a restored picture buffer 410, per prediction unit. The current picture 405 may be split into largest coding units, and then the largest coding units may be sequentially encoded. Here, the encoding may be performed on coding units split in a tree structure from the largest coding unit.

Residual data is generated by subtracting prediction data of a coding unit of each mode output from the intra predictor 420 or the inter predictor 415 from data of the current image 405 to be encoded, and the residual data is output as a quantized transformation coefficient through a transformer 425 and a quantizer 430 per transformation unit. The quantized transformation coefficient is restored to residual data in a spatial domain through an inverse quantizer 445 and an inverse transformer 450. The residual data in the spatial domain is added to the prediction data of the coding unit of each mode output from the intra predictor 420 or the inter predictor 415 to be restored as data in a spatial domain of the coding unit of the current image 405. The data in the spatial domain passes through a deblocker 455 and a sample adaptive offset (SAO) performer 460 and thus a restored image is generated. The restored image is stored in the restored picture buffer 410. Restored images stored in the restored picture buffer 410 may be used as a reference image for inter prediction of another image. The quantized transformation coefficient obtained through the transformer 425 and the quantizer 430 may be output as a bitstream 440 through an entropy encoder 435.

In order for the image encoder 400 according to various embodiments to be applied in the video encoding apparatus 100, components of the image encoder 400, i.e., the inter predictor 415, the intra predictor 420, the transformer 425, the quantizer 430, the entropy encoder 435, the inverse quantizer 445, the inverse transformer 450, the deblocking unit 455, and the SAO performer 460 perform operations based on each coding unit among coding units having a tree structure per largest coding unit.

In particular, the intra predictor 420 and the inter predictor 415 determine partitions and a prediction mode of each coding unit from among the coding units having a tree structure while considering the maximum size and the maximum depth of a current largest coding unit, and the transformer 425 may determine whether to split a transformation unit according to a quad-tree in each coding unit from among the coding units having the tree structure.

Figure 12:
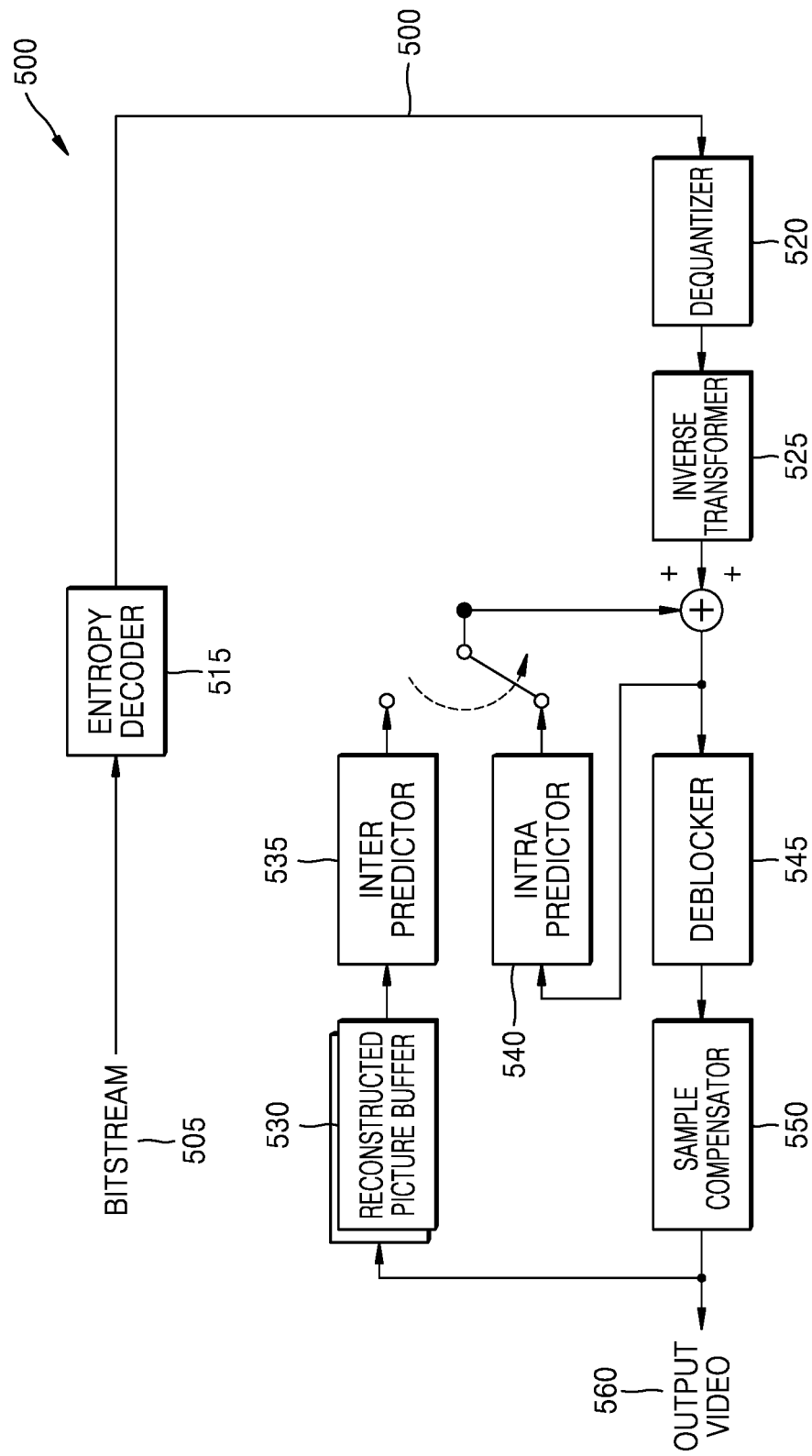
FIG. 12 is a block diagram of an image decoder based on coding units, according to various embodiments of the present disclosure.

FIG. 12 is a block diagram of an image decoder 500 based on coding units, according to various embodiments.

An entropy decoder 515 parses encoded image data that is to be decoded and encoding information required for decoding from a bitstream 505. The encoded image data is a quantized transformation coefficient, and an inverse quantizer 520 and an inverse transformer 525 restores residual data from the quantized transformation coefficient.

An intra predictor 540 performs intra prediction on a coding unit in an intra mode according to prediction units. An inter predictor performs inter prediction on a coding unit in an inter mode from a current image according to prediction units, by using a reference image obtained by a restored picture buffer 530.

Data in a spatial domain of coding units of the current image is restored by adding the residual data and the prediction data of a coding unit of each mode through the intra predictor and the inter predictor 535, and the data in the spatial domain may be output as a restored image through a deblocking unit 545 and an SAO performer 550. Also, restored images stored in the restored picture buffer 530 may be output as reference images.

In order to decode the image data in the image data decoder 230 of the video decoding apparatus 200, operations after the entropy decoder 515 of the image decoder 500 according to some embodiments may be performed.

In order for the image decoder 500 to be applied in the video decoding apparatus 200 according to some embodiments, components of the image decoder 500, i.e., the entropy decoder 515, the inverse quantizer 520, the inverse transformer 525, the intra predictor 540, the inter predictor 535, the deblocking unit 545, and the SAO performer 550 may perform operations based on coding units having a tree structure for each largest coding unit.

Specifically, the intra prediction 540 and the inter predictor 535 determine a partition mode and a prediction mode according to each of coding units having a tree structure, and the inverse transformer 525 may determine whether to split a transformation unit according to a quad-tree structure per coding unit.

An encoding operation of FIG. 10 and a decoding operation of FIG. 11 are respectively a video stream encoding operation and a video stream decoding operation in a single layer. Accordingly, when the encoder 16 of FIG. 1A encodes a video stream of at least two layers, the video encoding apparatus 100 of FIG. 1A may include as many image encoder 400 as the number of layers. Similarly, when the decoder 22 of FIG. 2A decodes a video stream of at least two layers, the video decoding apparatus 200 of FIG. 2A may include as many image decoders 500 as the number of layers.

Figure 13:
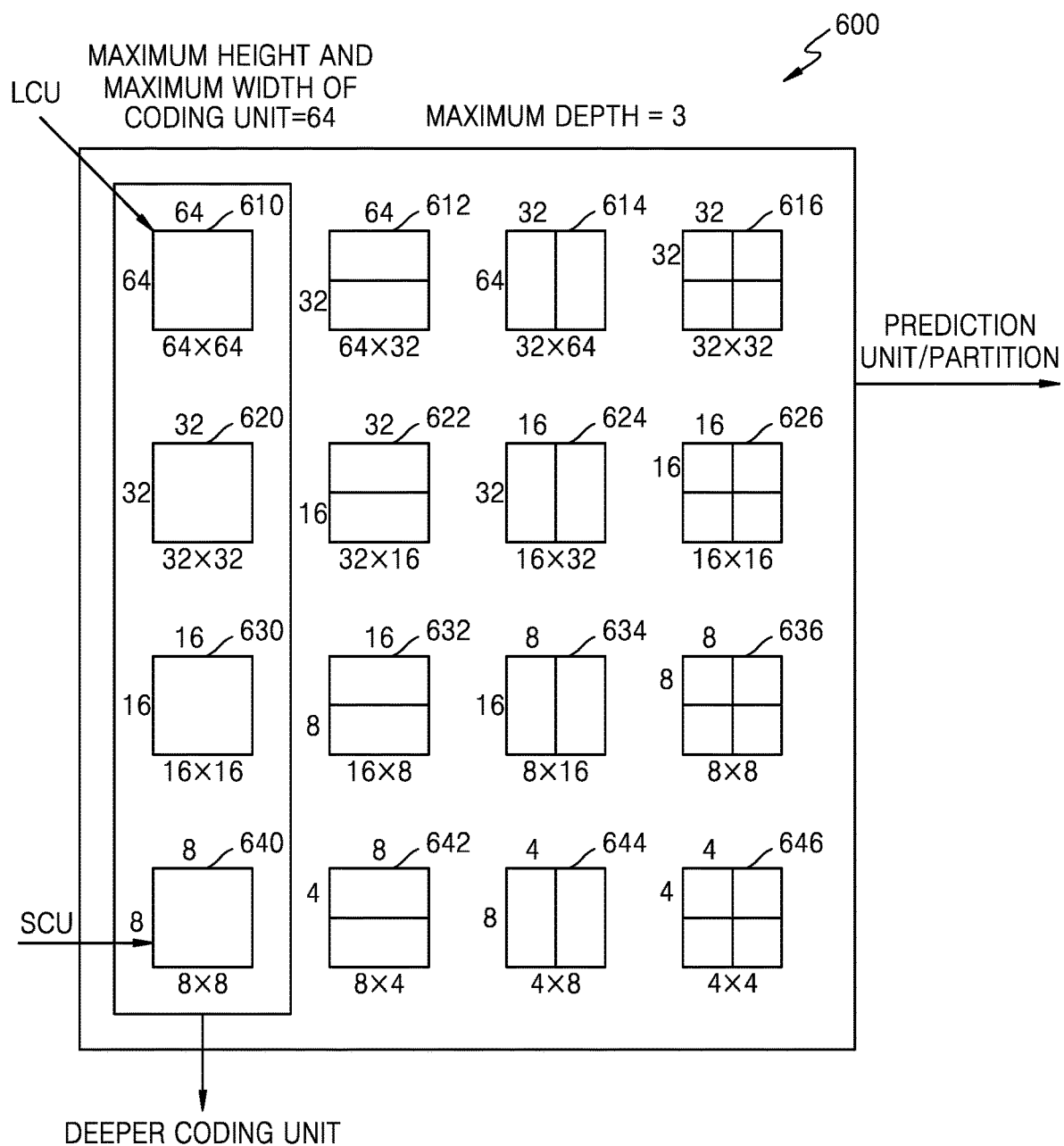
FIG. 13 is a diagram illustrating coding units and partitions, according to various embodiments of the present disclosure.

FIG. 13 is a diagram illustrating coding units and partitions, according to various embodiments of the present disclosure.

The video encoding apparatus 100 according to various embodiments and the video decoding apparatus 200 according to various embodiments use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure 600 of coding units according to various embodiments, the maximum height and the maximum width of the coding units are each 64, and the maximum depth is 3. In this case, the maximum depth refers to a total number of times the coding unit is split from the largest coding unit to the minimum coding unit. Since a depth deepens along a vertical axis of the hierarchical structure 600 of coding units according to various embodiments, a height and a width of the deeper coding unit are each split. Also, a prediction unit and partitions, which are bases for prediction encoding of each deeper coding unit, are shown along a horizontal axis of the hierarchical structure 600.

That is, a coding unit 610 is a largest coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions included in the encoding unit 610 having a size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having the size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having the size of 16×16, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having the size of 8×8, i.e. a partition having a size of 8×8 included in the coding unit 640, partitions 642 having a size of 8×4, partitions 644 having a size of 4×8, and partitions 646 having a size of 4×4.

In order to determine the depth of the largest coding unit 610, the coding unit determiner 120 of the video encoding apparatus 100 according to various embodiments performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the largest coding unit 610 may be selected as the depth and a partition mode of the largest coding unit 610.

Figure 14:
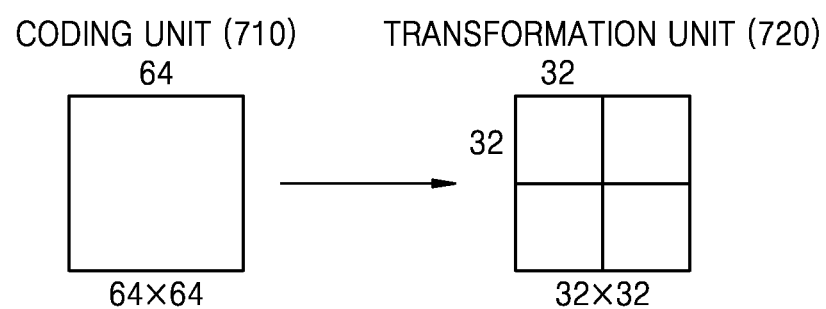
FIG. 14 is a diagram for describing a relationship between a coding unit and transformation units, according to various embodiments of the present disclosure.

FIG. 14 is a diagram for describing a relationship between a coding unit and transformation units, according to various embodiments.

The video encoding apparatus 100 according to various embodiments or the video decoding apparatus 200 according to various embodiments encodes or decodes an image according to coding units having sizes less than or equal to a largest coding unit for each largest coding unit. Sizes of transformation units for transformation during encoding may be selected based on data units that are not larger than a corresponding coding unit.

For example, in the video encoding apparatus 100 according to various embodiments or the video decoding apparatus 200 according to various embodiments, if a size of a coding unit 710 is 64×64, transformation may be performed by using a transformation unit 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 15:
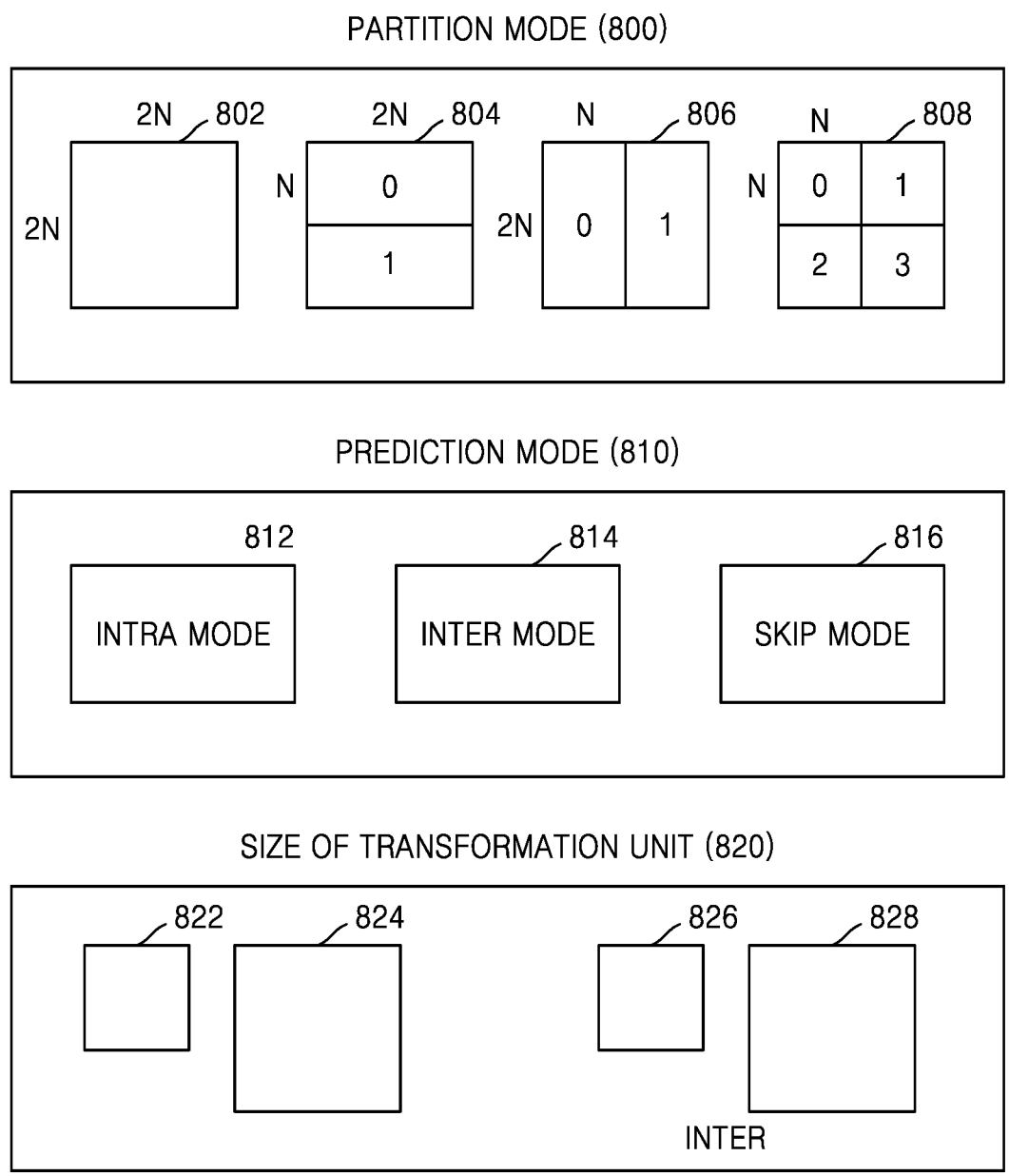
FIG. 15 is a diagram illustrating a plurality of pieces of encoding information, according to an embodiment of the present disclosure.

FIG. 15 is a diagram for describing encoding information, according to various embodiments.

The output unit 130 of the video encoding apparatus 100 according to various embodiments may encode and transmit information 800 about a partition mode, information 810 about a prediction mode, and information 820 about a size of a transformation unit for each coding unit corresponding to a depth, as split information.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the information 800 about a partition type of a current coding unit is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 according to various embodiments may extract and use the information 800, 810, and 820 for decoding, according to each deeper coding unit.

Figure 16:
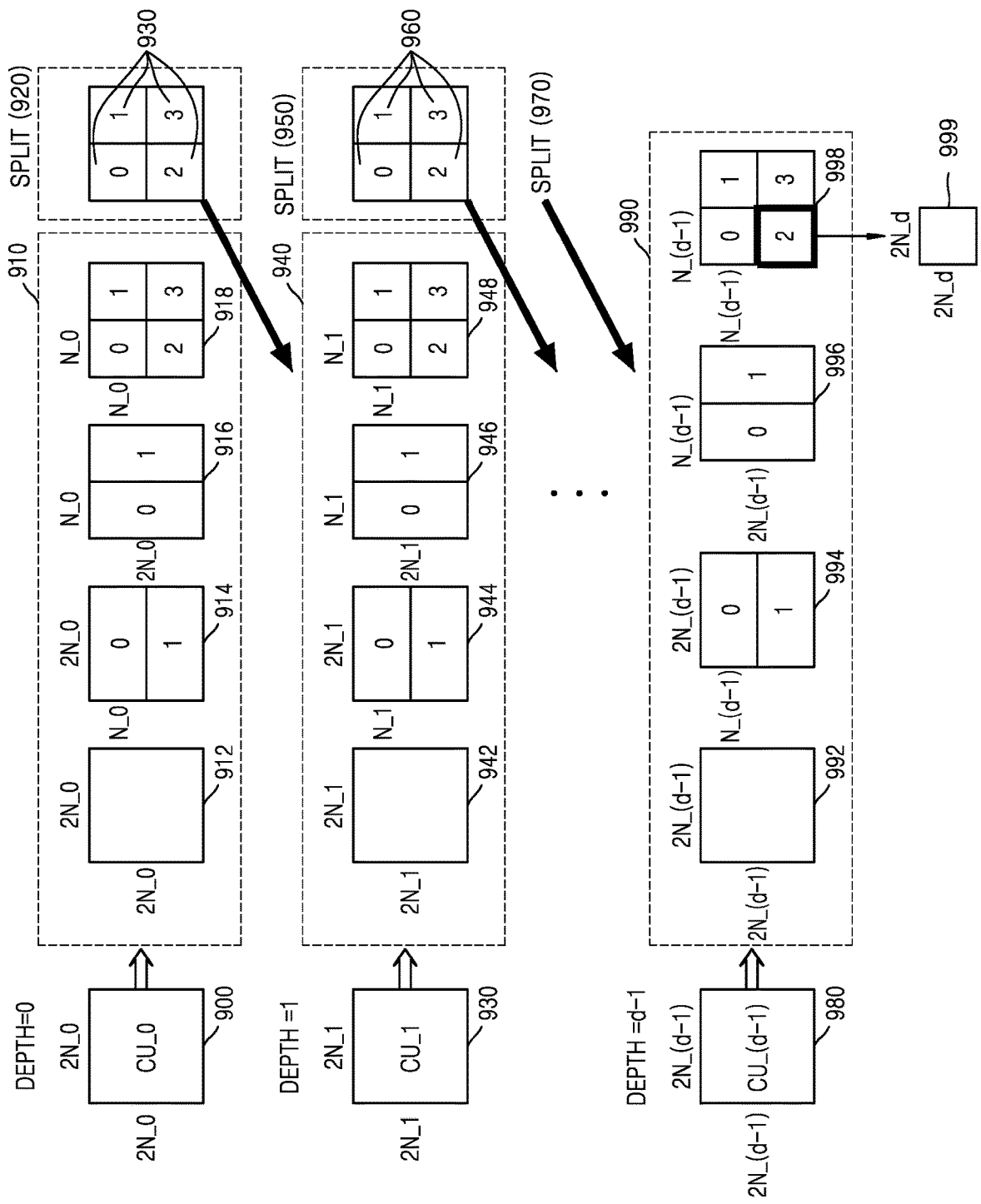
FIG. 16 is a diagram of coding units, according to various embodiments of the present disclosure.

FIG. 16 is a diagram of deeper coding units according to depths, according to various embodiments.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0× N_0, a partition mode 916 having a size of N_0×2N_0, and a partition mode 918 having a size of N_0×N_0. FIG. 9 only illustrates the partitions 912 through 918 which are obtained by symmetrically splitting the prediction unit, but a partition mode is not limited thereto, and the partitions of the prediction unit may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0× 2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error in one of the partition modes 912, 914, and 916 is a least error, the prediction unit 910 may not be split into a lower depth.

If the encoding error in the partition mode 918 is a least error, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If the encoding error in the partition mode 948 is a least error, a depth is changed from 1 to 2 to split the partition mode 948 in operation 950, and encoding is repeatedly performed on coding units 960, which have a depth of 2 and a size of N_2×N_2 to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes to search for a partition mode having a minimum encoding error.

Even when the partition mode 998 has the least encoding error, since a maximum depth is d, a coding unit CU_(d−1) having a depth of d−1 is no longer split to a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to various embodiments may be a square data unit obtained by splitting a minimum coding unit having a lowermost depth by 4. By performing the encoding repeatedly, the video encoding apparatus 100 according to various embodiments may select a depth having the least encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 1 through d, and a depth having the least encoding error may be determined as a d depth. The depth, the partition mode of the prediction unit, and the prediction mode may be encoded and transmitted as split information. Also, since a coding unit is split from a depth of 0 to a depth, only split information of the depth is set to 0, and split information of depths excluding the depth is set to 1.

The image data and encoding information extractor 220 of the video decoding apparatus 200 according to various embodiments may extract and use the information about the depth and the prediction unit of the coding unit 900 to decode the partition 912. The video decoding apparatus 200 according to various embodiments may determine a depth, in which split information is 0, as a depth by using split information according to depths, and use split information of the corresponding depth for decoding.

Figure 17:
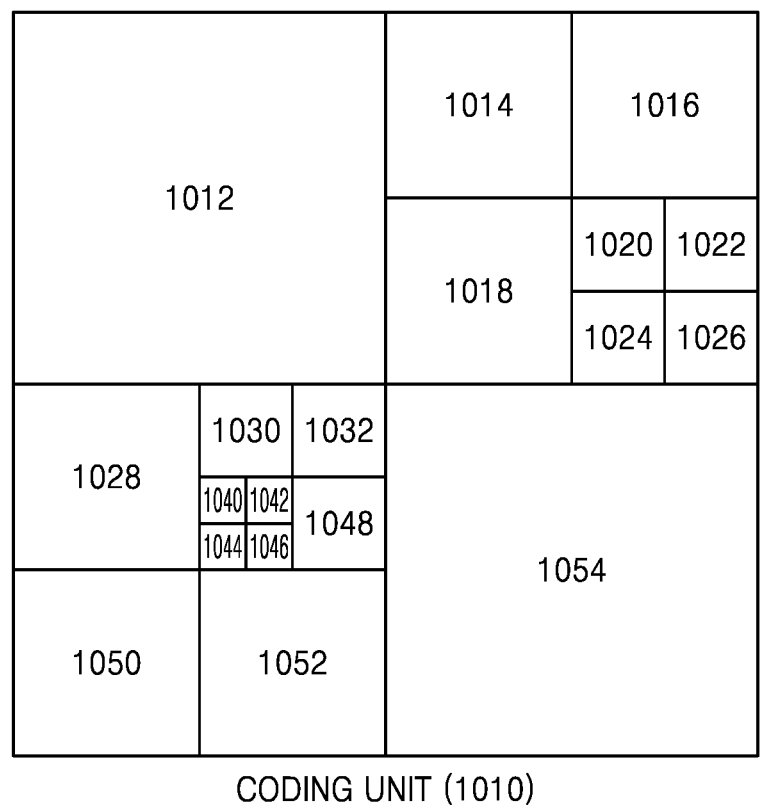
FIGS. 17, 18, and 19 are diagrams for describing a relationship between coding units, prediction units, and transformation units, according to various embodiments of the present disclosure.
Figure 18:
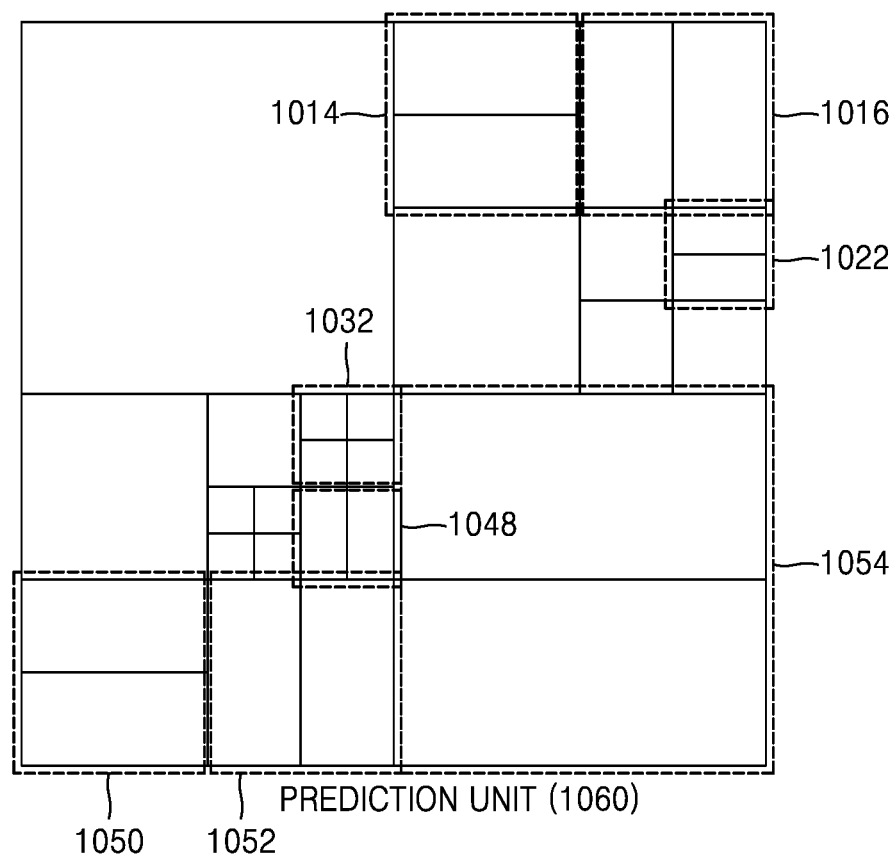
Figure 19:
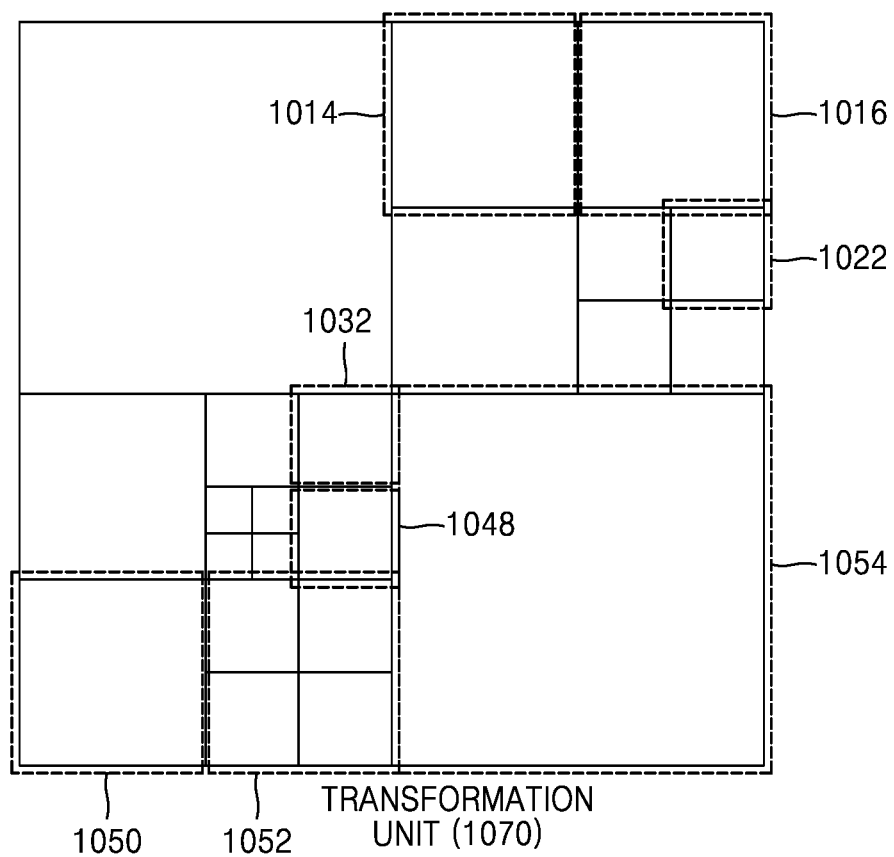

FIGS. 17, 18, and 19 are diagrams for describing a relationship between coding units, prediction units, and transformation units, according to various embodiments.

Coding units 1010 are coding units having a tree structure, according to depths determined by the video encoding apparatus 100 according to various embodiments, in a largest coding unit. Prediction units 1060 are partitions of prediction units of each of coding units according to depths, and transformation units 1070 are transformation units of each of coding units according to depths.

When a depth of a largest coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. That is, partition modes in the coding units 1014, 1022, 1050, and 1054 have a size of 2N×N, partition modes in the coding units 1016, 1048, and 1052 have a size of N×2N, and a partition modes of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are data units different from those in the prediction units 1060 in terms of sizes and shapes. In other words, the video encoding and decoding apparatuses 100 and 200 according to various embodiments may perform intra prediction, motion estimation, motion compensation, transformation, and inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, information about a partition mode, information about a prediction mode, and information about a size of a transformation unit. Table 1 shows the encoding information that may be set by the video encoding and decoding apparatuses 100 and 200 according to various embodiments.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| | Symmetrical Partition Type | Asymmetrical Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 according to various embodiments may output the encoding information about the coding units having a tree structure, and the image data and encoding information extractor 220 of the video decoding apparatus 200 according to various embodiments may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a depth, and thus information about a partition mode, prediction mode, and a size of a transformation unit may be defined for the depth. If the current coding unit is further split according to the split information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition type of the current coding unit is an asymmetrical partition mode, the size of the transformation unit may be N/2×N/2.

The encoding information about coding units having a tree structure, according to various embodiments, may include at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be determined.

Accordingly, if a current coding unit is predicted based on encoding information of adjacent data units, encoding information of data units in deeper coding units adjacent to the current coding unit may be directly referred to and used.

As another example, if a current coding unit is predicted based on encoding information of adjacent data units, data units adjacent to the current coding unit are searched using encoded information of the data units, and the searched adjacent coding units may be referred for predicting the current coding unit.

Figure 20:
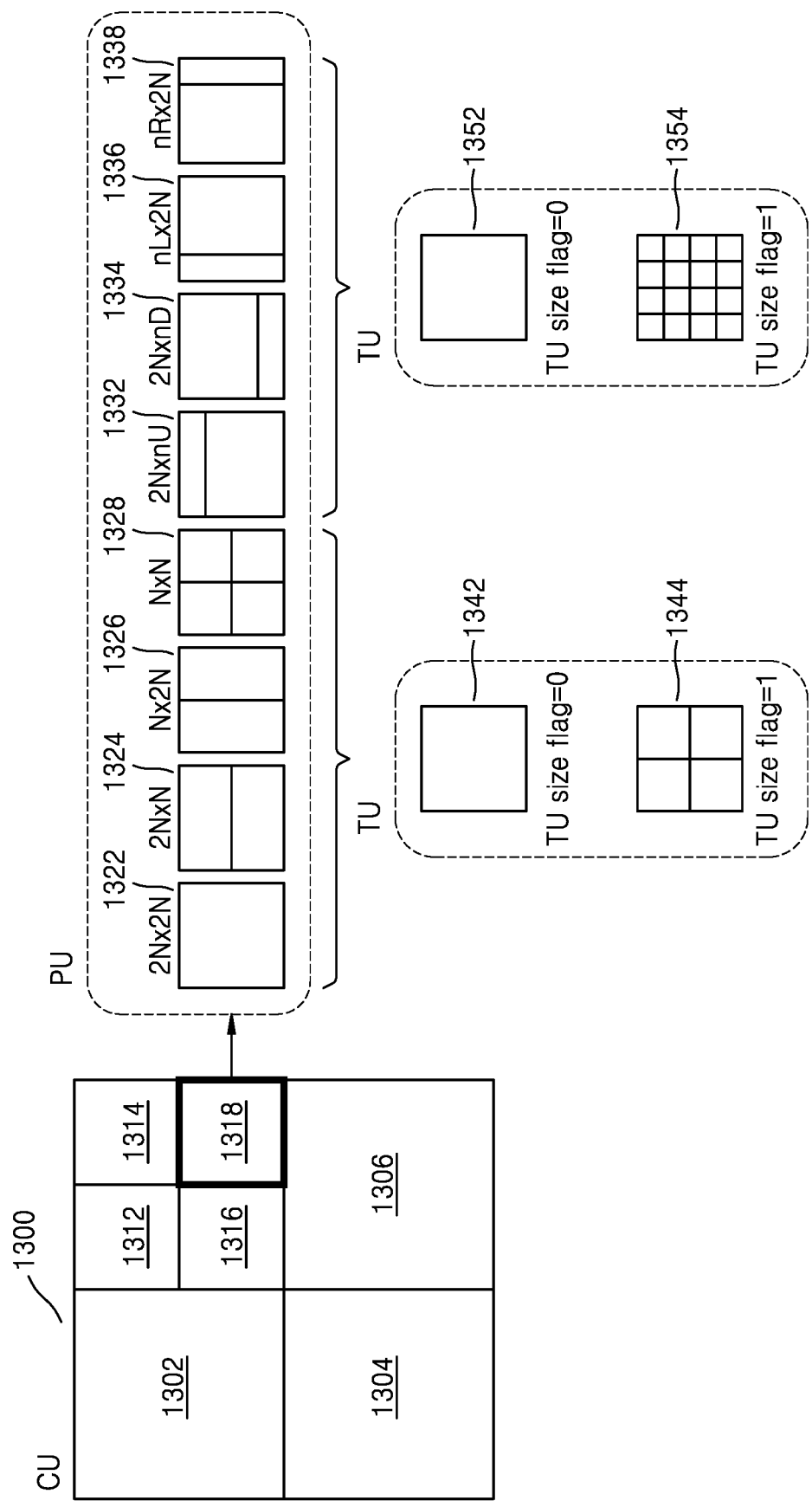
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Information about a partition mode of the coding unit 1318 having a size of 2N×2N may be set to be one of a partition mode 1322 having a size of 2N×2N, a partition mode 1324 having a size of 2N×N, a partition mode 1326 having a size of N×2N, a partition mode 1328 having a size of N×N, a partition mode 1332 having a size of 2N×nU, a partition mode 1334 having a size of 2N×nD, a partition mode 1336 having a size of nL×2N, and a partition mode 1338 having a size of nR×2N.

Split information (TU size flag) of a transformation unit is a type of a transformation index. The size of the transformation unit corresponding to the transformation index may be changed according to a prediction unit type or partition mode of the coding unit.

For example, when the partition mode is set to be symmetrical, i.e. the partition mode 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition mode is set to be asymmetrical, i.e., the partition mode 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 19, the TU size flag is a flag having a value or 0 or 1, but the TU size flag according to some exemplar embodiments is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to various embodiments, together with a maximum size and minimum size of the transformation unit. The video encoding apparatus 100 according to various embodiments is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 according to various embodiments may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize = \max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to various embodiments, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = \min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize = \min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present disclosure is not limited thereto.

According to the video encoding method based on coding units having a tree structure as described with reference to FIGS. 8 through 20, image data of a spatial region is encoded for each coding unit of a tree structure. According to the video decoding method based on coding units having a tree structure, decoding is performed for each largest coding unit to reconstruct image data of a spatial region. Thus, a picture and a video that is a picture sequence may be reconstructed. The reconstructed video may be reproduced by a reproducing apparatus, stored in a storage medium, or transmitted through a network.

The embodiments according to the present disclosure may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the inter-layer video encoding method and/or the video encoding method described above with reference to FIGS. 1A through 20 will be collectively referred to as a 'video encoding method of the present disclosure'. In addition, the inter-layer video decoding method and/or the video decoding method described above with reference to FIGS. 1A through 20 will be referred to as a 'video decoding method of the present disclosure'.

Also, a video encoding apparatus including the inter-layer video encoding apparatus 10, the video encoding apparatus 100, or the image encoder 400, which has been described with reference to FIGS. 1A through 20, will be referred to as a 'video encoding apparatus of the present disclosure'. In addition, a video decoding apparatus including the inter-layer video decoding apparatus 20, the video decoding apparatus 200, or the image decoder 500, which has been descried with reference to FIGS. 1A through 20, will be referred to as a 'video decoding apparatus of the present disclosure'.

The computer-readable recording medium such as a disc 26000 that stores the programs according to an embodiment will now be described in detail.

Figure 21:
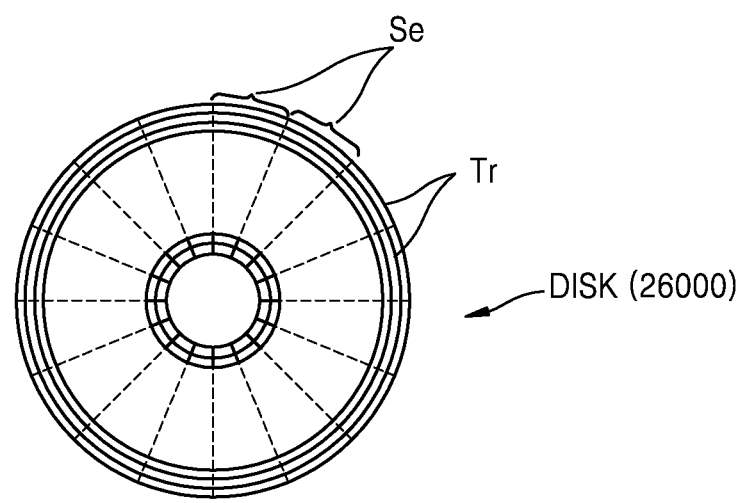
FIG. 21 is a diagram of a physical structure of a disc in which a program is stored, according to various embodiments.

FIG. 21 is a diagram of a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000 according to the various embodiments, a program that executes the quantization parameter determining method, the video encoding method, and the video decoding method described above may be assigned and stored.

A computer system embodied using the storage medium that stores the program for executing the video encoding method and the video decoding method as described above will now be described with reference to FIG. 22.

Figure 22:
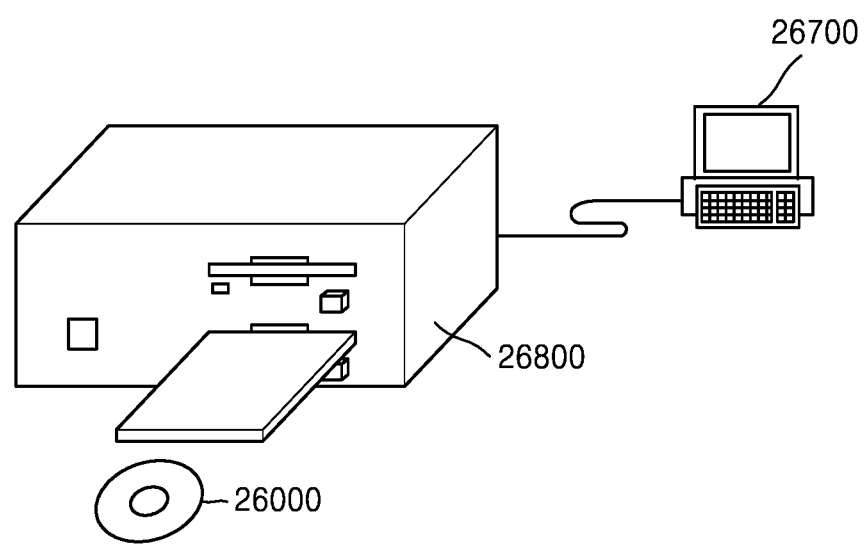
FIG. 22 is a diagram of a disc drive for recording and reading a program by using the disc.

FIG. 22 is a diagram of a disc drive 26800 for recording and reading a program by using the disc 26000. A computer system 27000 may store a program that executes at least one of a video encoding method and a video decoding method of the present disclosure, in the disc 26000 via the disc drive 26800. To run the program stored in the disc 26000 in the computer system 27000, the program may be read from the disc 26000 and be transmitted to the computer system 26700 by using the disc drive 27000.

The program that executes at least one of a video encoding method and a video decoding method of the present disclosure may be stored not only in the disc 26000 illustrated in FIG. 21 or 22 but also in a memory card, a ROM cassette, or a solid state drive (SSD).

A system to which the video encoding method and a video decoding method described above are applied will be described below.

Figure 23:
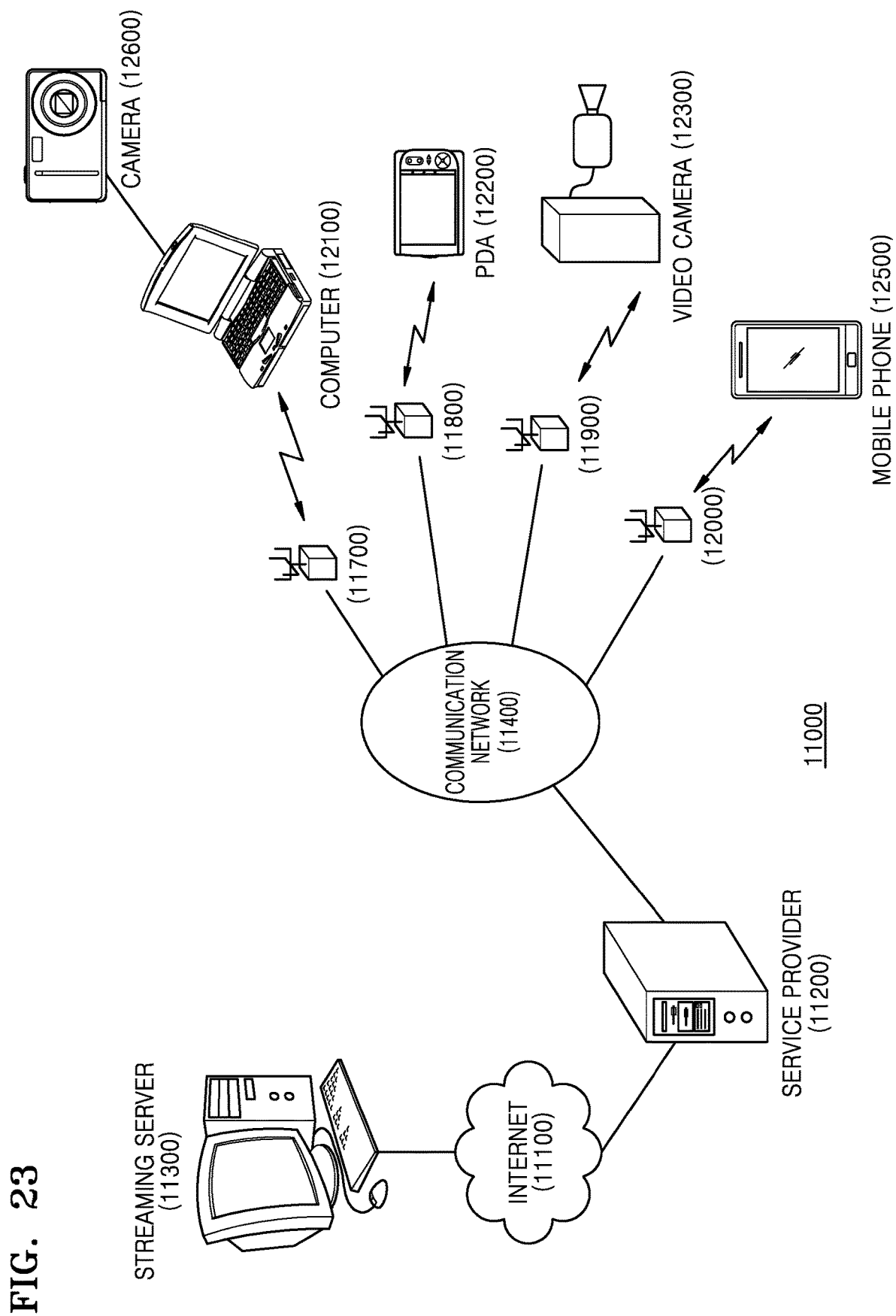
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
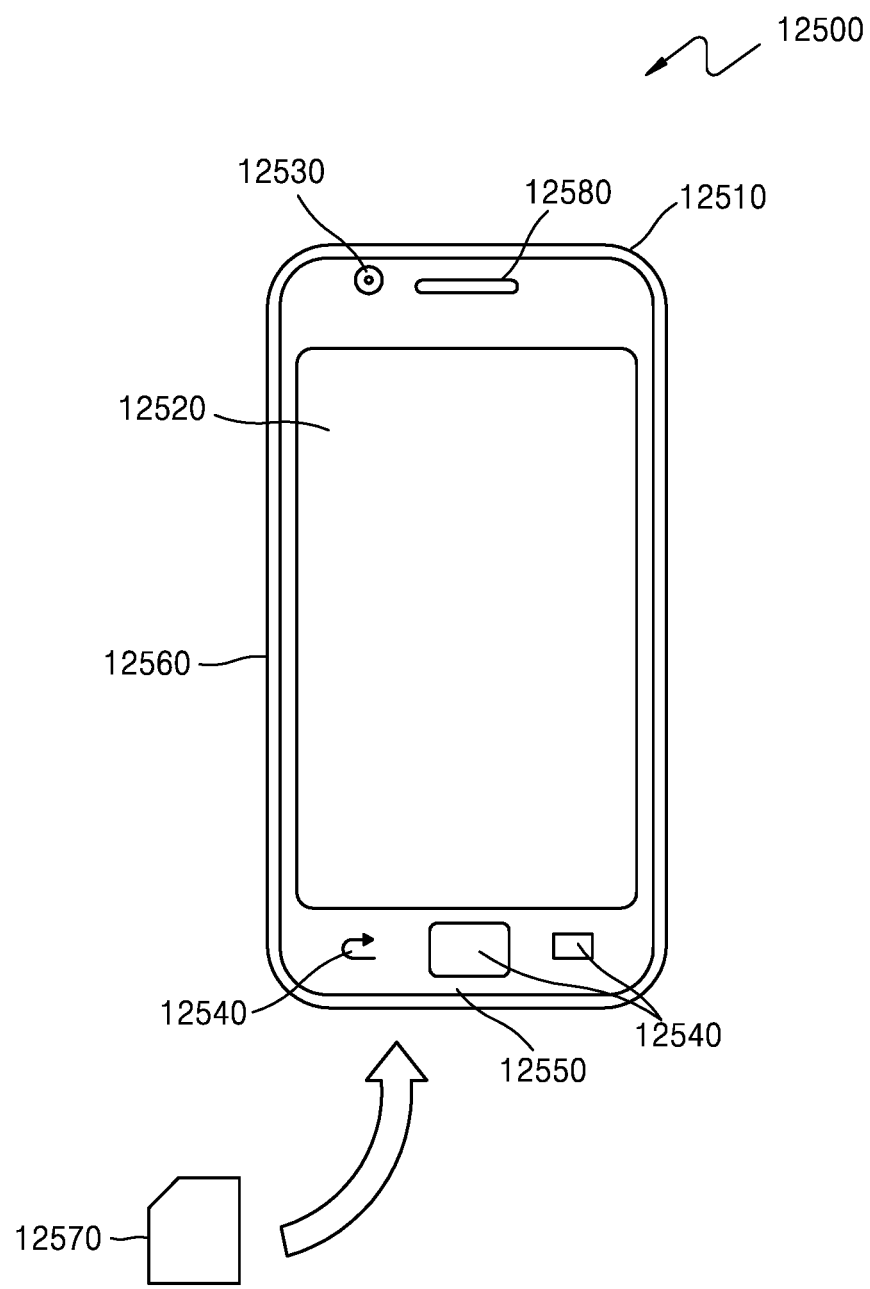
FIGS. 24 and 25 are diagrams respectively of an external structure and an internal structure of a mobile phone to which the video encoding method and video decoding method of the present disclosure are applied, according to various embodiments.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 according to various embodiments may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

The video encoding apparatus and the video decoding apparatus of the present invention may be applied to encoding and decoding operations of the plurality of independent devices included in the content supply system 11000.

The mobile phone 12500 included in the content supply system 11000 according to an embodiment will now be described in greater detail with referring to FIGS. 24 and 25.

FIG. 24 illustrates an external structure of the mobile phone 12500 to which the video encoding method and the video decoding method of the present disclosure are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
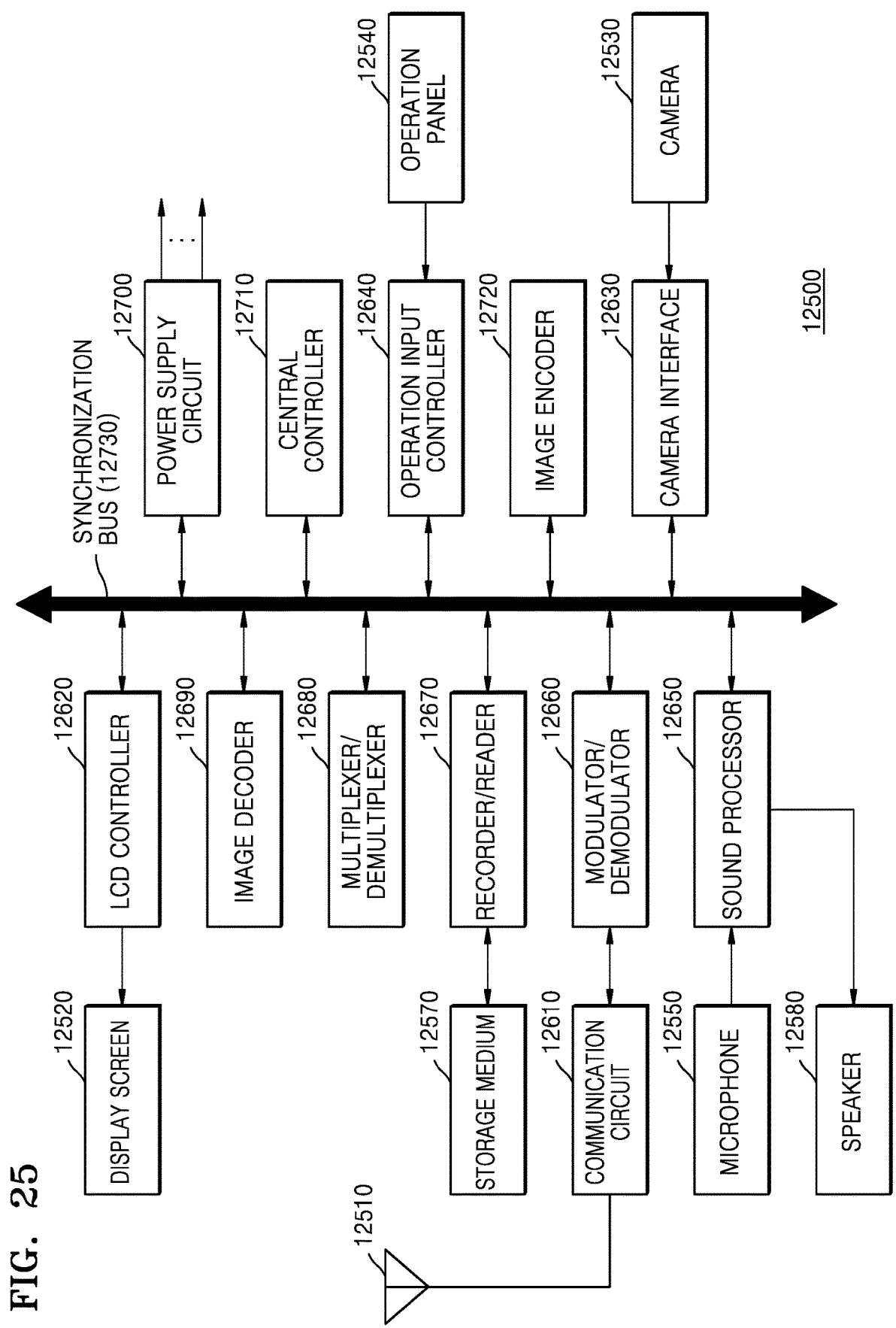

FIG. 25 illustrates an internal structure of the mobile phone 12500. To systemically control parts of the mobile phone 12500 including the display screen 12520 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

In order to transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to the video encoding method described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 12690 may decode the encoded video data to obtain reconstructed video data and provide the reconstructed video data to the display screen 12520 via the LCD controller 12620, according to a video decoding method employed by the video decoding apparatus 200 or the image decoder 500 described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus of the present disclosure, may be a transceiving terminal including only the video encoding apparatus, or may be a transceiving terminal including only the video decoding apparatus.

Figure 26:
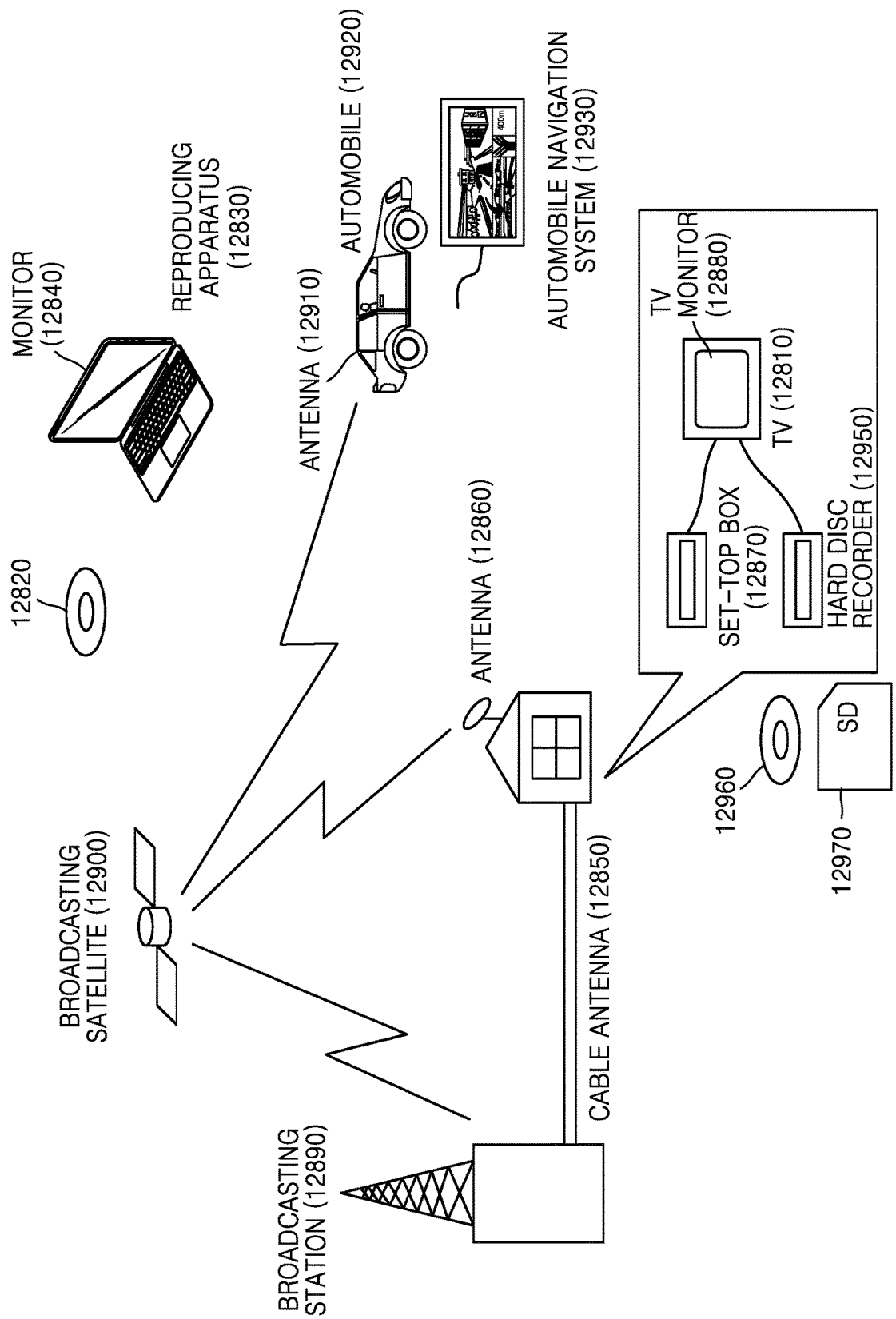
FIG. 26 is a diagram of a digital broadcast system to which a communication system is applied, according to the present disclosure.

A communication system according to the present disclosure is not limited to the communication system described above with reference to FIG. 24. For example, FIG. 26 illustrates a digital broadcasting system employing a communication system, according to various embodiments. The digital broadcasting system of FIG. 26 according to various embodiments may receive a digital broadcast transmitted via a satellite or a terrestrial network by using a video encoding apparatus and a video decoding apparatus of the present disclosure.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus of the present disclosure is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus of the present disclosure may be installed. Data output from the set-top box 12870 may also be reproduced on a TV monitor 12880.

As another example, a video decoding apparatus of the present disclosure may be installed in the TV receiver 12810 instead of the set-top box 12870.

An automobile 12920 that has an appropriate antenna 12910 may receive a signal transmitted from the satellite 12900 or the wireless base station 11700 of FIG. 23. A decoded video may be reproduced on a display screen of an automobile navigation system 12930 installed in the automobile 12920.

A video signal may be encoded by a video encoding apparatus of the present disclosure and may then be recorded to and stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus of the present disclosure according to various embodiments, a video signal recorded on the DVD disc 12960, the SD card 12970, or another storage medium may be reproduced on the TV monitor 12880. The automobile navigation system 12930 may not include the camera 12530, the camera interface 12630, and the image encoding unit 12720 of FIG. 26. For example, the computer 12100 and the TV receiver 12810 may not include the camera 12530, the camera interface 12630, and the image encoding unit 12720 of FIG. 26.

Figure 27:
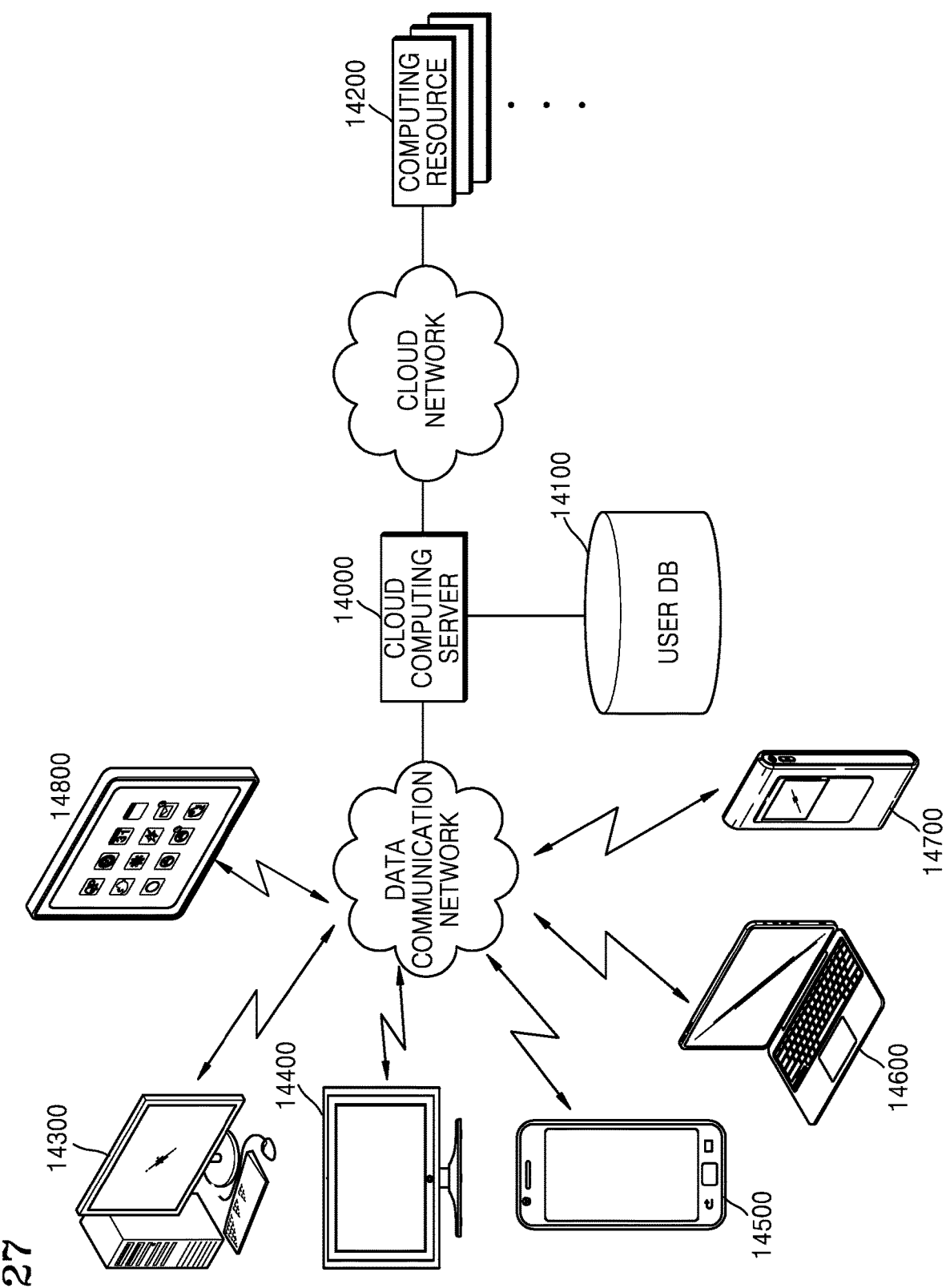
FIG. 27 is a diagram illustrating a network structure of a cloud computing system that uses the video encoding apparatus and video decoding apparatus according to various embodiments of the present disclosure.

FIG. 27 is a diagram illustrating a network structure of a cloud computing system using a video encoding apparatus and a video decoding apparatus, according to various embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus of the present disclosure as described above with reference to FIGS. 1A through 20. As another example, the user terminal may include a video encoding apparatus of the present disclosure as described above with reference to FIGS. 1A through 20. Alternatively, the user terminal may include both the video decoding apparatus and the video encoding apparatus of the present disclosure as described above with reference to FIGS. 1A through 20.

Various applications of a video encoding method, a video decoding method, a video encoding apparatus, and a video decoding apparatus according to various embodiments described above with reference to FIGS. 1A through 20 have been described above with reference to FIGS. 21 through 27. However, methods of storing the video encoding method and the video decoding method in a storage medium or methods of implementing the video encoding apparatus and the video decoding apparatus in a device, according to various embodiments, are not limited to the embodiments described above with reference to FIGS. 21 through 27.

It will be understood by one of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. An inter-layer video decoding method comprising:
   determining a size of a subblock of a current block by comparing at least one of a height and a width of a predetermined minimum size of the subblock of a first layer image with at least one of a height and a width of the current block of the first layer image;
   determining at least one subblock from the current block according to the size of the subblock of the current block;
   determining a candidate block that corresponds to the current block and is comprised in a second layer image;
   determining a candidate subblock from the candidate block of the second layer image, wherein the candidate subblock corresponds to the subblock of the current block and is comprised in the candidate block of the second layer image;
   determining motion information of the subblock comprised in the current block by using motion information of the candidate subblock comprised in the candidate block; and
   generating a prediction block of the current block by using the motion information of the subblock comprised in the current block,
   wherein the current block is one of at least one of prediction units obtained, based on partition type information, from a coding unit among coding units included in the first layer image,
   wherein the coding units are obtained by hierarchically splitting a maximum coding unit included in the first layer image based on split information, and
   wherein the determining of the size of the subblock of the current block by comparing at least one of the height and the width of the predetermined minimum size of the subblock with at least one of the height and the width of the current block of the first layer image comprises, when at least one of the height and the width of the current block is not an integer multiple of at least one of the height and the width of the predetermined minimum size of the subblock, determining the size of the subblock of the current block to be equal to the size of the current block.

2. The inter-layer video decoding method of claim 1, wherein the determining of the size of the subblock of the current block by comparing at least one of the height and the width of the predetermined minimum size of the subblock of the first layer image with at least one of the height and the width of the current block of the first layer image comprises:
   determining an inter-layer decoding mode from among a plurality of inter-layer decoding modes of predicting the current block, based on at least one subblock determined from the current block of the first layer image; and
   determining the size of the subblock of the current block by comparing at least one of a height and a width of a predetermined minimum size of the subblock of the first layer image in the determined inter-layer decoding mode with at least one of the height and the width of the current block of the first layer image.

3. The inter-layer video decoding method of claim 2, wherein the plurality of inter-layer decoding modes comprise at least one of a motion parameter inheritance mode and an inter-view motion prediction mode.

4. The inter-layer video decoding method of claim 1, wherein the current block is among one or more prediction units determined from a coding unit.

5. A non-transitory computer-readable recording medium having recorded thereon a program for performing the method of claim 1.

6. An inter-layer video encoding method comprising:
   determining a size of a subblock of a current block by comparing at least one of a height and a width of a predetermined minimum size of the subblock of a first layer image with at least one of a height and a width of the current block of the first layer image;
   determining at least one subblock from the current block according to the size of the subblock of the current block;
   determining a candidate block that corresponds to the current block and is comprised in a second layer image;

determining a candidate subblock from the candidate block of the second layer image, wherein the candidate subblock corresponds to the subblock of the current block and is comprised in the candidate block of the second layer image;

determining motion information of the subblock comprised in the current block by using motion information of the candidate subblock comprised in the candidate block;

generating a prediction block of the current block by using the motion information of the subblock comprised in the current block; and generating a bitstream comprising the current block encoded by using the prediction block of the current block, wherein the current block is one of at least one of prediction units determined from a coding unit among coding units included in the first layer image, and wherein the coding units are determined by hierarchically splitting a maximum coding unit included in the first layer image, wherein the determining of the size of the subblock of the current block by comparing at least one of the height and the width of the predetermined minimum size of the subblock with at least one of the height and the width of the current block of the first layer image comprises, when at least one of the height and the width of the current block is not an integer multiple of at least one of the height and the width of the predetermined minimum size of the subblock, determining the size of the subblock of the current block to be equal to the size of the current block.

7. The inter-layer video encoding method of claim 6, wherein the determining of the size of the subblock of the current block by comparing at least one of the height and the width of the predetermined minimum size of the subblock of the first layer image with at least one of the height and the width of the current block of the first layer image comprises:

determining an inter-layer encoding mode from among a plurality of inter-layer encoding modes of predicting the current block, based on at least one subblock determined from the current block of the first layer image; and determining the size of the subblock of the current block by comparing at least one of a height and a width of a predetermined minimum size of the subblock of the first layer image in the determined inter-layer encoding mode with at least one of the height and the width of the current block of the first layer image.

8. The inter-layer video encoding method of claim 7, wherein the plurality of inter-layer encoding modes comprise at least one of a motion parameter inheritance mode and an inter-view motion prediction mode.

9. The inter-layer video encoding method of claim 6, wherein the current block is among one or more prediction units determined from a coding unit.

10. A non-transitory computer-readable recording medium having recorded thereon a program for performing the method of claim 6.

11. An inter-layer video decoding apparatus comprising:
a first layer decoder configured to obtain a decoded first layer image; and
a second layer decoder configured to determine a size of a subblock of a current block by comparing at least one of a height and a width of a predetermined minimum size of the subblock of a second layer image with at least one of a height and a width of the current block of the second layer image, to determine at least one subblock from the current block according to the determined size of the subblock of the current block, to determine a candidate block that corresponds to the current block and is comprised in the first layer image, to determine a candidate subblock from the candidate block of the first layer image, wherein the candidate subblock corresponds to the subblock of the current block and is comprised in the candidate block of the first layer image, to determine motion information of the subblock comprised in the current block by using motion information of the candidate subblock comprised in the candidate block, and to generate a prediction block of the current block by using the motion information of the subblock comprised in the current block, wherein the current block is one of at least one of prediction units obtained, based on partition type information, from a coding unit among coding units included in the first layer image, and wherein the coding units are obtained by hierarchically splitting a maximum coding unit included in the first layer image based on split information, wherein, when the second layer decoder determines the size of the subblock of the current block by comparing at least one of the height and the width of the predetermined minimum size of the subblock with at least one of the height and the width of the current block of the first layer image, if at least one of the height and the width of the current block is not an integer multiple of at least one of the height and the width of the predetermined minimum size of the subblock, the second layer decoder determines the size of the subblock of the current block to be equal to the size of the current block.

* * * * *